US010812735B2

(12) United States Patent
Hirasawa et al.

(10) Patent No.: US 10,812,735 B2
(45) Date of Patent: Oct. 20, 2020

(54) IMAGE PROCESSING DEVICE AND IMAGE PROCESSING METHOD

(71) Applicant: SONY CORPORATION, Tokyo (JP)

(72) Inventors: Yasutaka Hirasawa, Tokyo (JP); Yuhi Kondo, Tokyo (JP); Hideki Oyaizu, Tokyo (JP); Shun Kaizu, Kanagawa (JP); Teppei Kurita, Tokyo (JP); Tuo Zhuang, Kanagawa (JP); Ying Lu, Kanagawa (JP); Hajime Mihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/340,604

(22) PCT Filed: Oct. 26, 2017

(86) PCT No.: PCT/JP2017/038644
§ 371 (c)(1),
(2) Date: Apr. 9, 2019

(87) PCT Pub. No.: WO2018/092540
PCT Pub. Date: May 24, 2018

(65) Prior Publication Data
US 2019/0273856 A1 Sep. 5, 2019

(30) Foreign Application Priority Data

Nov. 15, 2016 (JP) ................................. 2016-222403
Jun. 21, 2017 (JP) ................................. 2017-121663

(51) Int. Cl.
*H04N 5/238* (2006.01)
*H04N 5/217* (2011.01)
(Continued)

(52) U.S. Cl.
CPC ............. *H04N 5/238* (2013.01); *H04N 5/217* (2013.01); *H04N 5/225* (2013.01); *H04N 5/232* (2013.01)

(58) Field of Classification Search
CPC ........ H04N 5/238; H04N 5/225; H04N 5/232; H04N 5/217
See application file for complete search history.

(56) References Cited

U.S. PATENT DOCUMENTS 6,028,303 A * 2/2000 Suzuki ................. G02B 27/281
250/225
8,184,194 B2 * 5/2012 Sato ..................... G02B 27/283
348/335
(Continued)

FOREIGN PATENT DOCUMENTS

CN 101558282 A 10/2009
EP 2120007 A1 11/2009
(Continued)

OTHER PUBLICATIONS

International Search Report and Written Opinion of PCT Application No. PCT/JP2017/038644, dated Dec. 19, 2017, 09 pages of ISRWO.

(Continued)

*Primary Examiner* — Shahbaz Nazrul
(74) *Attorney, Agent, or Firm* — Chip Law Group

(57) ABSTRACT

An image processing device and a method that enable removal of reflection component light from images captured from various directions are provided. The image processing device includes: an image input unit that acquires at least three types of images formed with polarization images of different polarizing directions or non-polarization images; an angle input unit that outputs reflection angles that are the angles between the image capturing directions of the acquired images and the plane direction corresponding to the normal direction of the reflecting surface, to an intensity transmittance and intensity reflectance calculation unit; a calculation unit that calculates the respective intensity transmittances and the respective intensity reflectances of S waves and P waves, using the reflection angles; and a reflection component separation unit that removes the reflected light component from the images acquired by the image input unit, using the respective intensity transmittances and the respective intensity reflectances of the S (Continued)

waves and P waves. These processes enable removal of reflected light components from captured images having various reflection angles.

20 Claims, 36 Drawing Sheets

(51) Int. Cl.
*H04N 5/232* (2006.01)
*H04N 5/225* (2006.01)

(56) References Cited

U.S. PATENT DOCUMENTS

| | | | | |
|---|---|---|---|---|
| 9,626,767 | B2* | 4/2017 | Ida | G06T 7/586 |
| 2002/0164061 | A1* | 11/2002 | Paik | G06T 7/0012 |
| | | | | 382/131 |
| 2009/0279807 | A1* | 11/2009 | Kanamorl | G02B 5/3025 |
| | | | | 382/274 |
| 2010/0290713 | A1 | 11/2010 | Kanamori et al. | |
| 2015/0029389 | A1* | 1/2015 | Masanori | H04N 5/2254 |
| | | | | 348/373 |

FOREIGN PATENT DOCUMENTS

| | | |
|---|---|---|
| EP | 2202688 A2 | 6/2010 |
| JP | 10-145668 A | 5/1998 |
| JP | 2001-264848 A | 9/2001 |
| JP | 2007-086720 A | 4/2007 |
| JP | 4324238 B2 | 9/2009 |
| JP | 2014-074838 A | 4/2014 |
| JP | 2016-126410 A | 7/2016 |
| WO | 2008/099589 A1 | 8/2008 |

OTHER PUBLICATIONS

Extended European Search Report of EP Application No. 17871942.3, dated Sep. 9, 2019, 07 pages of EESR.

Atkinson, et al., "Recovery of surface orientation from diffuse polarization", IEEE Transactions on Image Processing, vol. 15, No. 6, Jun. 2006, pp. 1653-1664.

* cited by examiner

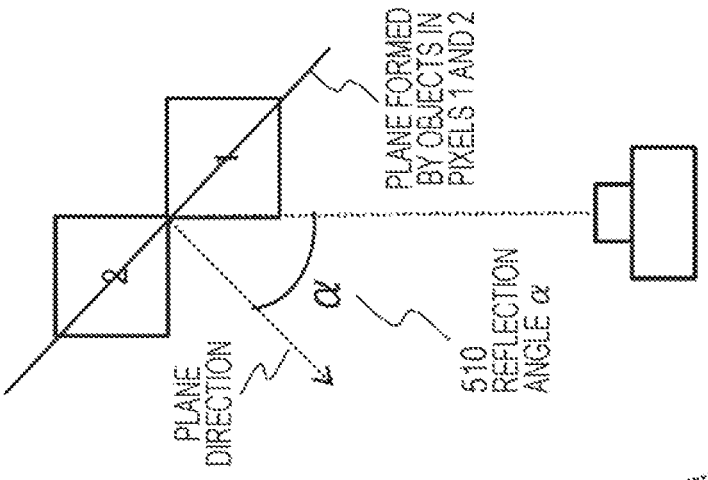
FIG. 16C
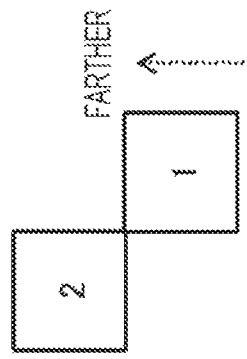
FIG. 16B
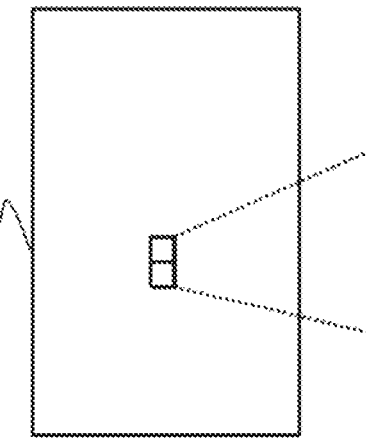
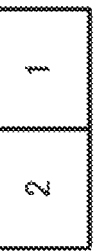
FIG. 16A

IMAGE PROCESSING DEVICE AND IMAGE PROCESSING METHOD

CROSS REFERENCE TO RELATED APPLICATIONS

This application is a U.S. National Phase of International Patent Application No. PCT/JP2017/038644 filed on Oct. 26, 2017, which claims priority benefit of Japanese Patent Application No. JP 2016-222403 filed in the Japan Patent Office on Nov. 15, 2016 and also claims priority benefit of Japanese Patent Application No. JP 2017-121663 filed in the Japan Patent Office on Jun. 21, 2017. Each of the above-referenced applications is hereby incorporated herein by reference in its entirety.

TECHNICAL FIELD

The present disclosure relates to image processing devices, image processing methods, and programs. More particularly, the present disclosure relates to an image processing device, an image processing method, and a program for generating a clear object image by removing the reflected light component from a captured image of an object on the inner side of a reflecting surface such as a water surface or glass, for example.

BACKGROUND ART

In a case where the object exists on the inner side of a reflecting surface such as glass or a water surface that passes part of light and reflects part of the light, when an image of the object on the inner side of the reflecting surface is captured with a camera, the reflection component from the reflecting surface is shown in the captured image, and a clear image of the object via the reflecting surface, or the object through glass or the object in water, cannot be captured.

As a technique to solve such a problem, there is a technique by which a polarizing filter (a polarizing plate) is disposed between the imaging element of the camera and the object, and the reflection component is removed by the polarizing filter, so that only the light component not including any reflection component is received by the imaging element, and a clear object image is captured.

For example, Patent Document 1 (Japanese Patent Application Laid-Open No. 2016-126410) discloses a configuration that uses a camera capable of acquiring two kinds of images, which are a polarizing-filter-applied image captured via a polarizing filter and a luminance image captured through a conventional image capturing process, and acquires a clearer image of the driver behind the front windshield of a vehicle by using the polarizing-filter-applied image in which the reflected light has been reduced.

Meanwhile, Patent Document 2 (Japanese Patent Application Laid-Open No. 2007-086720) discloses a configuration that acquires an image in which the reflected light from a reflecting surface such as a glass surface existing in front of the object has been reduced, by acquiring luminance information about the image capturing target in a plurality of different polarizing directions, fitting sinusoidal waves to the luminance in each polarizing direction, and selecting the smallest value of the sinusoidal waves.

CITATION LIST

Patent Documents

Patent Document 1: Japanese Patent Application Laid-Open No. 2016-126410

Patent Document 2: Japanese Patent Application Laid-Open No. 2007-086720

SUMMARY OF THE INVENTION

Problems to be Solved by the Invention

As described above, there is a method of capturing a clear image of the object, by using a polarizing filter to reduce the input of an image reflected from a reflecting surface such as glass existing in front of the subject to the imaging element.

However, according to the technique disclosed in the above mentioned Patent Document 1, the polarizing filter is secured, and the desired reflected light removal effect can be achieved with the polarizing filter only under a specific condition, or only at a particular image capturing angle at which inputs of reflected light components are blocked by the polarizing filter.

Specifically, in a case where an image of a vehicle is to be captured with a camera installed on the road, if the vehicle is traveling diagonally with respect to the camera, the blocking direction of the polarizing filter and the direction of the S waves of reflected light do not coincide with each other, and a sufficient reflected light removal effect cannot be achieved.

Furthermore, each of the configurations disclosed in the above mentioned Patent Document 1 and Patent Document 2 is a configuration that has effect only in a case where a particular condition is satisfied, or where the angle between the plane direction corresponding to a direction perpendicular to the reflecting surface and the line of sight of the camera coincides with or is close to a specific angle (Brewster's angle). In a case where this particular condition is not satisfied, the reflected light removal effect cannot be achieved.

In a case where an image from which light reflected from a water surface, a glass surface, or the like has been removed is to be captured by using a polarizing filter as described above, the image needs to be captured under the particular condition that the angle between the plane direction corresponding to a direction perpendicular to the reflecting surface and the line of sight of the camera coincides with or is close to a specific angle (Brewster's angle).

By this technique, however, it is necessary to capture the image capturing target from a specific direction, and images cannot be captured freely from various directions.

The present disclosure has been made in view of the above problems, for example, and aims to provide an image processing device, an image processing method, and a program that enable removal of a reflected light component not only from an image captured from a specific direction limited by the above mentioned Brewster's angle, but also images captured from various directions.

Solutions to Problems

A first aspect of the present disclosure lies in an image processing device that includes:

an image input unit that acquires at least three kinds of images formed with polarization images of different polarizing directions or non-polarization images;

an angle input unit that acquires a reflection angle, the reflection angle being an angle between an image capturing direction of an image acquired by the image input unit and a plane direction corresponding to a normal direction of a reflecting surface; and a reflection component separation unit that removes a reflected light component from an image acquired by the image input unit, on the basis of the at least three kinds of the images acquired by the image input unit and the reflection angle acquired from the angle input unit.

Further, a second aspect of the present disclosure lies in an image processing method implemented in an image processing device, the image processing method including:

an image input step of an image input unit acquiring at least three kinds of images formed with polarization images of different polarizing directions or non-polarization images;

an angle input step of an angle input unit outputting a reflection angle to a reflection component separation unit, the reflection angle being an angle between an image capturing direction of an image acquired in the image input step and a plane direction corresponding to a normal direction of a reflecting surface; and a reflection component separation step of a reflection component separation unit removing a reflected light component from an image acquired by the image input unit, on the basis of the at least three kinds of the images acquired by the image input unit and the reflection angle acquired from the angle input unit.

Furthermore, a third aspect of the present disclosure lies in a program causing an image processing device to perform image processing, the image processing including:

an image input step of causing an image input unit to acquire at least three kinds of images formed with polarization images of different polarizing directions or non-polarization images;

an angle input step of causing an angle input unit to output a reflection angle to a reflection component separation unit, the reflection angle being an angle between an image capturing direction of an image acquired in the image input step and a plane direction corresponding to a normal direction of a reflecting surface; and a reflection component separation step of causing a reflection component separation unit to remove a reflected light component from an image acquired by the image input unit, on the basis of the at least three kinds of the images acquired by the image input unit and the reflection angle acquired from the angle input unit.

Note that, the program according to the present disclosure is a program that can be provided in a computer-readable format from a storage medium or a communication medium to an image processing device or a computer system that can execute various program codes, for example. As such a program is provided in a computer-readable format, processes in accordance with the program are performed in an information processing device or a computer system.

Other objects, features, and advantages of the present disclosure will be made apparent by the embodiments of the present invention described below and the detailed descriptions with reference to the accompanying drawings. Note that, in this specification, a system is a logical assembly of a plurality of devices, and does not necessarily mean devices with different configurations incorporated into one housing.

Effects of the Invention

A configuration according to an embodiment of the present disclosure embodies an image processing device and a method that enable removal of reflection component light from images captured from various directions.

Specifically, the image processing device includes: an image input unit that acquires at least three types of images formed with polarization images of different polarizing directions or non-polarization images; an angle input unit that outputs reflection angles that are the angles between the image capturing directions of the acquired images and the plane direction corresponding to the normal direction of the reflecting surface, to an intensity transmittance and intensity reflectance calculation unit; a calculation unit that calculates the respective intensity transmittances and the respective intensity reflectances of S waves and P waves, using the reflection angles; and a reflection component separation unit that removes the reflected light component from the images acquired by the image input unit, using the respective intensity transmittances and the respective intensity reflectances of the S waves and P waves, for example. These processes enable removal of reflected light components from captured images having various reflection angles.

This configuration embodies an image processing device and a method that enable removal of reflection component light from images captured from various directions.

It should be noted that the advantageous effects described in this specification are merely examples, and the advantageous effects of the present technology are not limited to them and may include additional effects.

BRIEF DESCRIPTION OF DRAWINGS

FIGS. 16A, 16B, and 16C are diagrams for explaining a process of calculating a plane direction at each point on the object, using a depth map.

MODES FOR CARRYING OUT THE INVENTION

Figure 1:
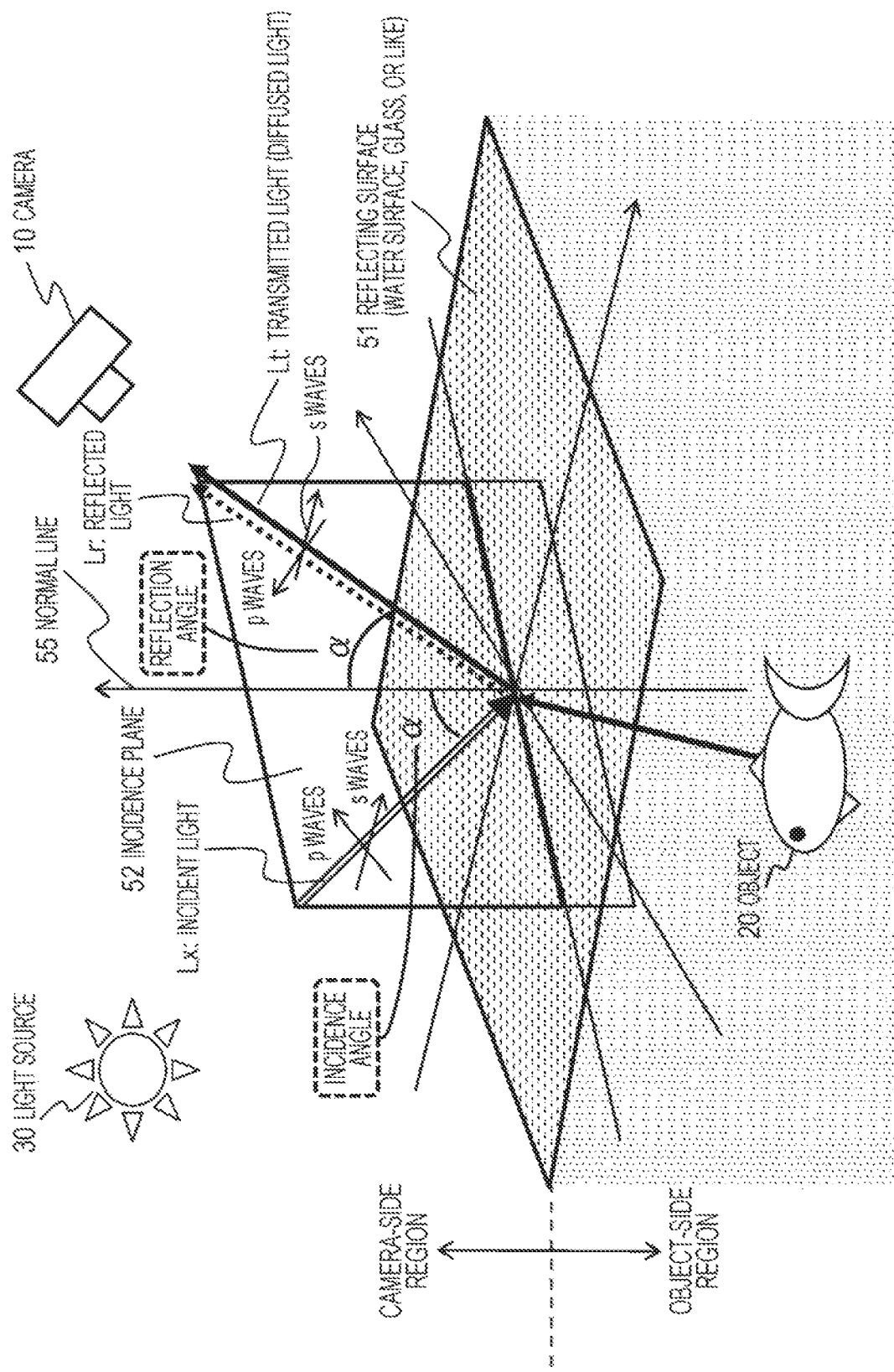
FIG. 1 is a diagram for explaining an example of an image capturing configuration in which influence of reflected light from a reflecting surface occurs.

The following is a detailed description of image processing devices, image processing methods, and programs of the present disclosure, with reference to the drawings. Note that explanation will be made in the following order.

1. An example of an image capturing configuration in which influence of reflected light from a reflecting surface occurs, and the definitions of terms 2. Principles and problems of a process of removing light reflected by a reflecting surface by using a polarizing filter 3. A reflected light removal process through image processing depending on reflection angles 4. An image processing device and an image processing method for generating an image with reflected light components removed from images of image capturing directions 5. Other embodiments 5-1. An example configuration not including a refractive Index Input unit 5-2. An example of an angle input unit using a gyroscope sensor 5-3. An example of an angle input unit that performs an angle input process depending on the object 5-4. An example of an angle input unit that includes a depth sensor 5-5. An embodiment including a reflection removal result presentation unit 5-6. An embodiment for estimating a reflection angle on the basis of the luminances of pixels of a generated image 5-7. An embodiment for calculating zenith angles by using camera posture information acquired from a camera mounted sensor, and using the zenith angles as incidence angles (=reflection angles)

6. An example hardware configuration of an image processing device

7. Example applications of an image processing device of the present disclosure

8. Summary of the configuration of the present disclosure

1. An Example of an Image Capturing Configuration in which Influence of Reflected Light from a Reflecting Surface Occurs, and the Definitions of Terms First, referring to FIG. 1, an example of an image capturing configuration in which influence of reflected light from a reflecting surface occurs, and definitions of terms are described.

FIG. 1 is a diagram for explaining an example of an image capturing configuration in which reflected light from a reflecting surface is generated.

In FIG. 1, a camera 10 captures an image of a fish as an object 20 on the back side of a reflecting surface 51 such as a water surface or a glass surface.

In FIG. 1, the region on the upper side of the reflecting surface 51 such as a water surface or a glass surface is shown as a camera-side region in which the camera 10 exists, and the region on the lower side of the reflecting surface 51 is shown as an object-side region in which the object (=a fish) 20 exists.

An image capturing process is performed under a light source 30 of the camera-side region. The light source 30 is the sun, a room light, or the like, for example.

The reflecting surface 51 is a surface such as a water surface or a glass surface. The reflecting surface 51 transmits part of the light from the light source 30, and reflects part of the light. Note that the reflecting surface 51 is formed with a transparent material or an antireflective material, for example.

In a case where an image is to be captured by the camera 10 with such settings, two kinds of lights (a) and (b) shown below enter the camera 10 whose image capturing direction is directed toward the reflecting surface 51.

(a) Transmitted light (diffused light) Lt corresponding to an object image of the object 20

(b) Reflected light Lr corresponding to a reflected surface image of the reflecting surface 51

(a) The transmitted light (diffused light) Lt corresponding to the object image of the object 20 is the light corresponding to an image of the object 20 formed with light (incident light Lx) of the light source 30 that has passed through the reflecting surface 51 such as a water surface or glass and been reflected from the object 20 (=a fish) on the inner side of the reflecting surface 51.

(b) The reflected light Lr corresponding to the reflecting surface image of the reflecting surface 51 is the light corresponding to a landscape image of the outside such as a light source reflected on the reflecting surface 51 such as a water surface or glass.

These two types of lights enter the camera 10.

As a result, the camera 10 captures a superimposed image of these two lights.

Therefore, the image captured by the camera 10 is an image in which the reflected light image from the reflecting surface 51 such as a water surface or glass is superimposed on the image of the object 20 (=a fish) as the original target to be captured. In a case where the amount of the component of the reflected light image from the reflected light is large, the image of the object 20 (=a fish) is blurred.

In FIG. 1, the light corresponding to the image of the object 20 (=a fish) is shown as a solid line extending from the inner side (the lower side in the drawing) of the reflecting surface 51 such as a water surface or glass toward the outer side (the upper side in the drawing=the camera side).

In FIG. 1, it is transmitted light (or diffused light) Lt is shown as light input to the camera 10.

On the other hand, the light corresponding to the reflected light image from the reflecting surface 51 such as a surface or glass is the reflected light Lr (=the reflection component) indicated by a dotted line as the light input to the camera 10 in FIG. 1.

Note that the state before the light beam corresponding to the reflected light Lr (=the reflection component) is reflected by the reflecting surface 51 is called the incident light Lx, and the light corresponding to the reflection component reflected by the reflecting surface 51 is the reflected light Lr.

Further, the plane formed by the path through which the reflected light Lr (=the reflection component) enters the reflecting surface 51 and is reflected is called the "incidence plane 52".

The incident light Lx, the reflected light Lr, and the transmitted light Lt shown in the drawing each have two light components: P waves (or P-polarized light) and S waves (or S-polarized light).

Light is electromagnetic waves, and is formed with an electric field and a magnetic field oscillating orthogonal to the traveling direction.

A light component whose electric field oscillates parallel to the incidence plane, or light having a polarizing direction parallel to the incidence plane 51, is called P waves (P-polarized light).

Meanwhile, a light component whose electric field oscillates perpendicularly to the incidence plane, or light having a polarizing direction perpendicular to the incidence plane 51 is called S waves (S-polarized light).

A line orthogonal to the reflecting surface 51 is called the normal line 55, and a direction toward the reflected light Lr side of the normal line 55 is called the normal direction or a plane direction. The normal direction (plane direction) is the direction of an arrow in the vertically upward direction in FIG. 1.

The angle formed by the normal line 55 and the incident light Lx is called the incidence angle.

The angle formed by the normal line 55 and the reflected light Lr is called the reflection angle. As shown in FIG. 1, the reflection angle and the incidence angle are the same angle α.

As described above, an image captured by the camera 10 is an image in which the reflected light image reflected on the reflecting surface 51 such as a water surface or glass is superimposed on the object image of the object 20 (=a fish) as the original target to be captured. Therefore, if the amount of the reflected light component is large, a clear image of the object 20 (=a fish) cannot be obtained.

Note that it is possible to capture an image from which reflected light is removed by capturing an image using a polarizing filter, under a specific condition that the angle between the plane direction equivalent to the direction perpendicular to the reflecting surface and the line of sight of the camera is set to a specific angle (Brewster's angle) or is set to an angle close to the specific angle.

By this technique, however, it is necessary to capture the image capturing target from a specific direction, and images cannot be captured freely from various directions.

In the description below, an image capturing process using a polarizing filter and its problems are described.

2. Principles and Problems of a Process of Removing Light Reflected by a Reflecting Surface by Using a Polarizing Filter Next, referring to FIG. 2 and other drawings, the principles and problems of a process of removing light reflected by a reflecting surface by using a polarizing filter are described.

Figure 2:
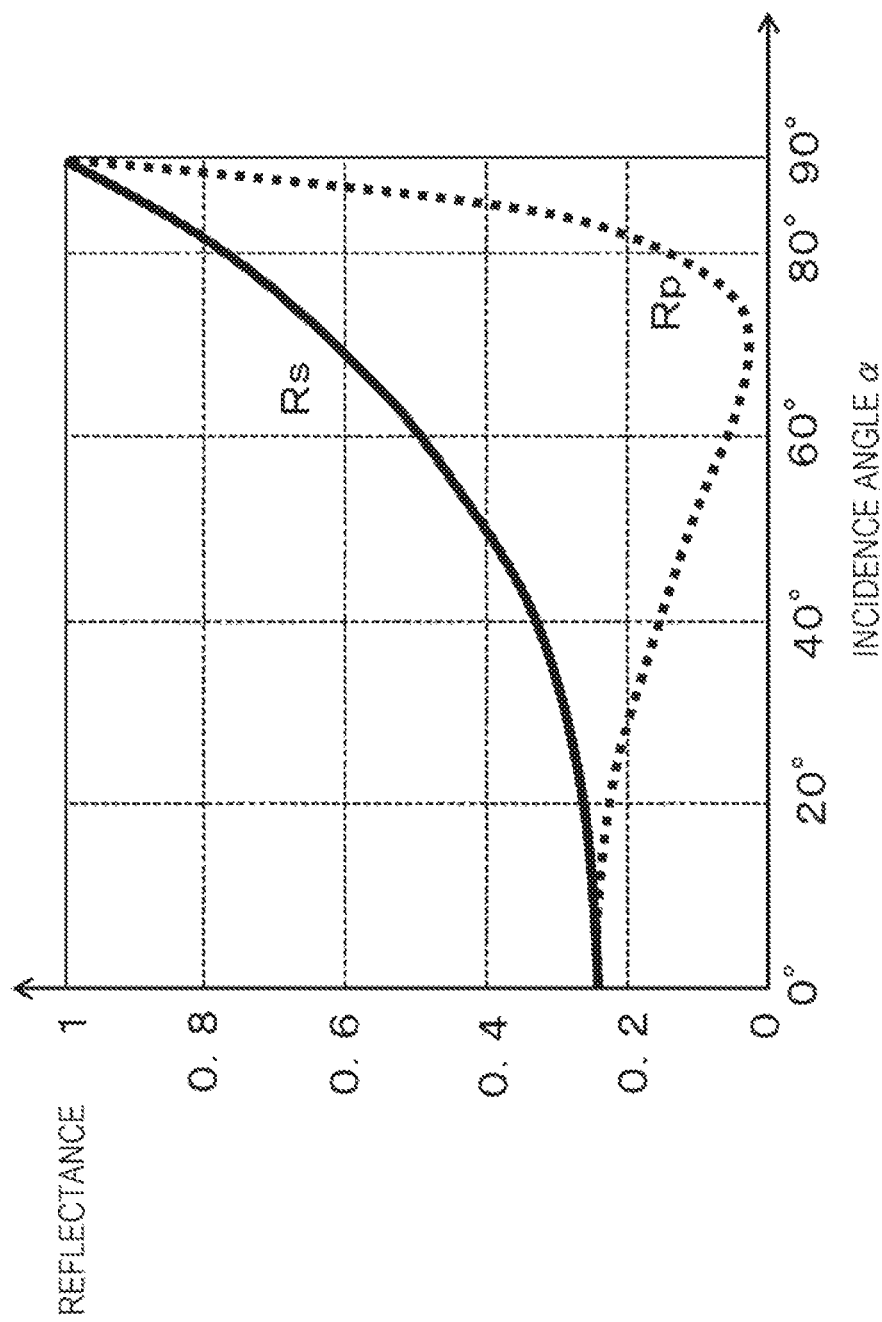
FIG. 2 is a graph for explaining the reflectances of the S waves and the P waves constituting incident light when a reflection component is reflected by a reflecting surface.

FIG. 2 is a graph showing the reflectances of the S waves and the P waves constituting the incident light Lx when the reflection component is reflected by the reflecting surface.

The abscissa axis is the incidence angle α (=the reflection angle) of the incident light Lx, and the ordinate axis is the reflectance (reflected light intensity/incident light intensity).

Rs represents the reflectance of the S waves, and Rp represents the reflectance of the P waves.

Rs and Rp can also be regarded as the amounts of the S waves and the P waves contained in the reflected light Lr.

It is apparent that the reflectance shown on the ordinate axis of the graph in FIG. 2 varies depending on the incidence angle (a) shown on the abscissa axis. Note that the reflectance also varies depending on the refractive index of the reflecting surface 51. FIG. 2 shows an example case where the reflecting surface 51 shown in FIG. 1 has a specific refractive index.

As can be seen from the graph shown in FIG. 2, when attention is paid to the neighborhood of 70 degrees in the incidence angle (=the reflection angle) a, the reflectance of the P waves is almost zero.

The incidence angle with which the reflectance of the P waves becomes almost 0 as above is called the Brewster's angle.

In other words, when the incidence angle (=the reflection angle) a is set to the Brewster's angle, the reflected light does not contain any P wave component but contains only the S waves.

Therefore, the direction of the camera 10 with respect to the reflecting surface 51 is made to form the Brewster's angle to eliminate the P waves of the reflected light, and a polarizing filter is further attached to the camera 10 and is rotated in such a direction as to block the S waves of the reflected light. In this manner, the S waves of the reflected light can also be removed with the polarizing filter.

In other words, when an image is captured with such settings, the P waves and the S waves of the light reflected by the reflecting surface 51, or all the reflection components, can be removed, and thus, a clear image formed only with transmitted light components (a transmission component image) can be captured.

In the example shown in FIG. 1, a clear image of the object (a fish) can be captured.

Note that such a reflection component removing technique using the Brewster's angle and a polarizing filter is a well-known conventional technique, and is also disclosed in Patent Document 1 (Japanese Patent Application Laid-Open No. 2016-126410) mentioned above.

Note that, according to this method, it is necessary to adjust the polarizing filter attached to the camera 10 to block the S waves of the reflected light. However, it is also possible to generate an image from which the reflection component is removed by acquiring images of three or more polarizing directions and combining these images, using a method of capturing a plurality of images by rotating the polarizing filter, for example.

Figure 3:
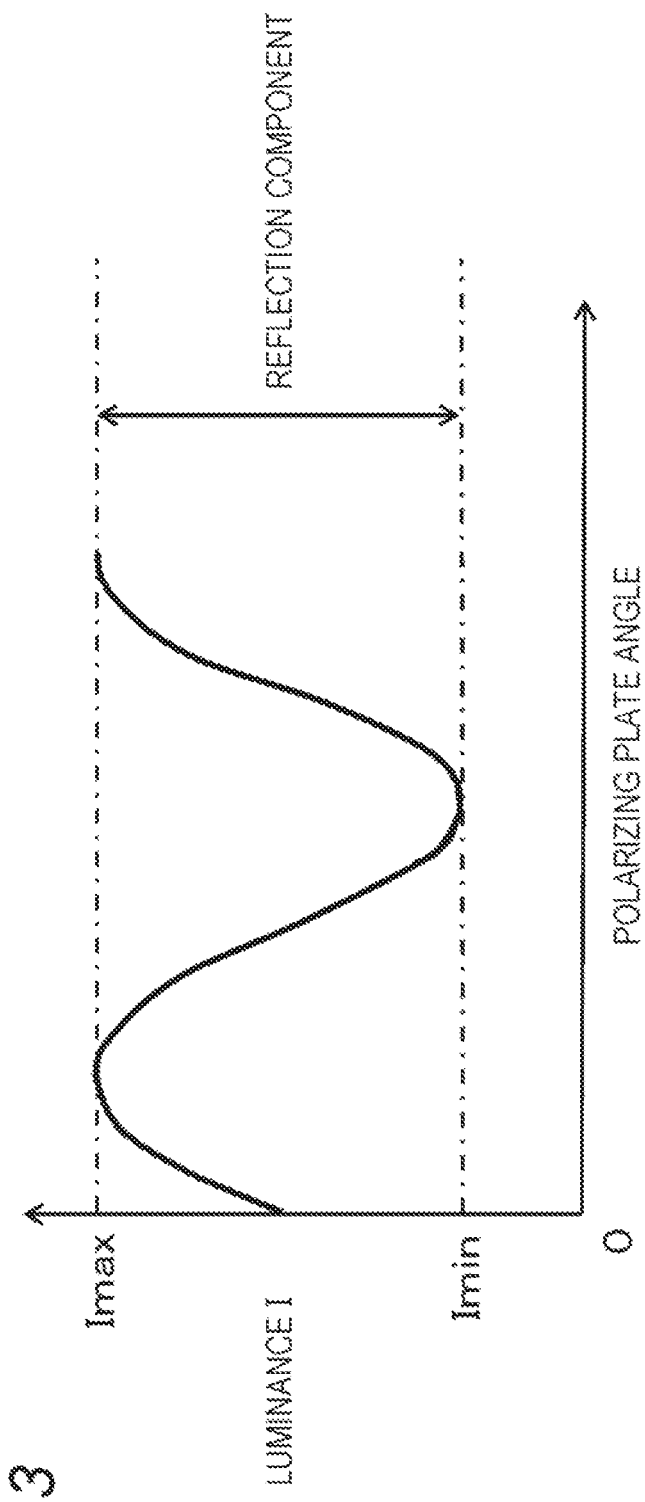
FIG. 3 is a graph showing the relationship between a polarizing plate angle that is the set angle of a polarizing filter and the luminance of transmitted light passing through the polarizing filter.

FIG. 3 is a graph showing the relationship between a polarizing plate angle that is the set angle of the polarizing filter and the luminance of the transmitted light passing through the polarizing filter.

As shown in this graph, the luminance I varies with the polarizing plate angle, and the luminance variation depending on the polarizing plate angle forms sinusoidal waves.

Where the observed luminance of the transmitted light through the polarizing filter (polarizing plate) is represented by $I_{pol}$.

the observed luminance $I_{pol}$ is expressed by the following (Expression 1).

[Mathematical Formula 1]

$$I_{pol} = \frac{I_{max} + I_{min}}{2} + \frac{I_{max} - I_{min}}{2} \cos 2(\theta_{pol} - \varphi) \quad \text{(Expression 1)}$$

Note that, in the above (Expression 1), the respective parameters have the following meanings.

$I_{pol}$: the observed luminance via the polarizing filter (polarizing plate)

$\theta_{pol}$: the angle of the rotated polarizing filter (polarizing plate)

$\varphi$: the phase of the observation light

Imax, Imin: the upper and lower limits of the amplitude of the cos function

In the graph shown in FIG. 3, the angle with which the luminance is Imin is the angle of the polarizing filter that blocks the S waves, which is the Brewster's angle.

There are the following three kinds of unknown numbers included in the above (Expression 1).

$\varphi$: the phase of the observation light

Imax, Imin: the upper and lower limits of the amplitude of the cos function

To calculate these three unknown parameters, the polarizing filter is rotated, to acquire luminances, or ($I_{pol}$), at three or more angles.

By fitting sinusoidal waves to these three luminances, it is possible to acquire the three unknowns, which are the sinusoidal model parameters Imin, Imax, and cp.

This is equivalent to a process of setting three simultaneous equations for the above (Expression 1) and calculating three unknowns.

In other words, it is possible to calculate the unknown parameters Imin, Imax, and $\Phi$ of the above (Expression 1) by rotating the polarizing filter attached to the camera 10 and acquiring images captured at three or more different angles.

Here, the luminance Imin is equivalent to the luminance obtained by blocking the S waves.

As described above, by a method of capturing an image once by adjusting the polarizing filter attached to the camera 10 so as to block the S waves, or by a method of capturing a plurality of images by rotating the polarizing filter, for example, images of three or more polarizing directions are acquired, and unknown parameter calculations using these images are performed, so that an image from which the reflection component has been removed can be generated.

However, these processes can be used only in cases where images are captured with a reflection angle set to an angle close to the Brewster's angle.

In other words, an image from which the reflection component has been removed by the above described process is an image of a specific direction captured with the camera that is oriented in a specific direction.

In a case where the reflection angle is an angle greatly different from the Brewster's angle, the reflected light contains both S-wave and P-wave components, as can be seen from FIG. 2. Therefore, the reflected light cannot be completely removed, regardless of how the polarizing filter is rotated.

As described above, where a clear object image having all the reflected light components removed is to be captured, the image capturing direction of the camera is limited to one direction by the Brewster's angle.

In other words, an image needs to be captured under a specific condition that the angle between the plane direction equivalent to the direction perpendicular to the reflecting surface and the line of sight of the camera is set to a specific angle (Brewster's angle) or is set to an angle close to the specific angle.

Therefore, according to this technique, it is necessary to capture an image of the image capturing target from a specific direction, and images cannot be captured freely from various directions.

An image processing device according to the present disclosure solves this problem, and performs a process of acquiring a clear object image (a transmitted light image, or a transmitted light component image), by removing or reducing the reflected light components not only from an image captured from the specific direction limited by the Brewster's angle but also from images captured from various directions.

In the description below, this process is explained in detail.

3. A Reflected Light Removal Process Through Image Processing Depending on Reflection Angles The following is a description of a process of removing reflection components from images captured from various directions, by performing image processing depending on reflection angles.

Figure 4:
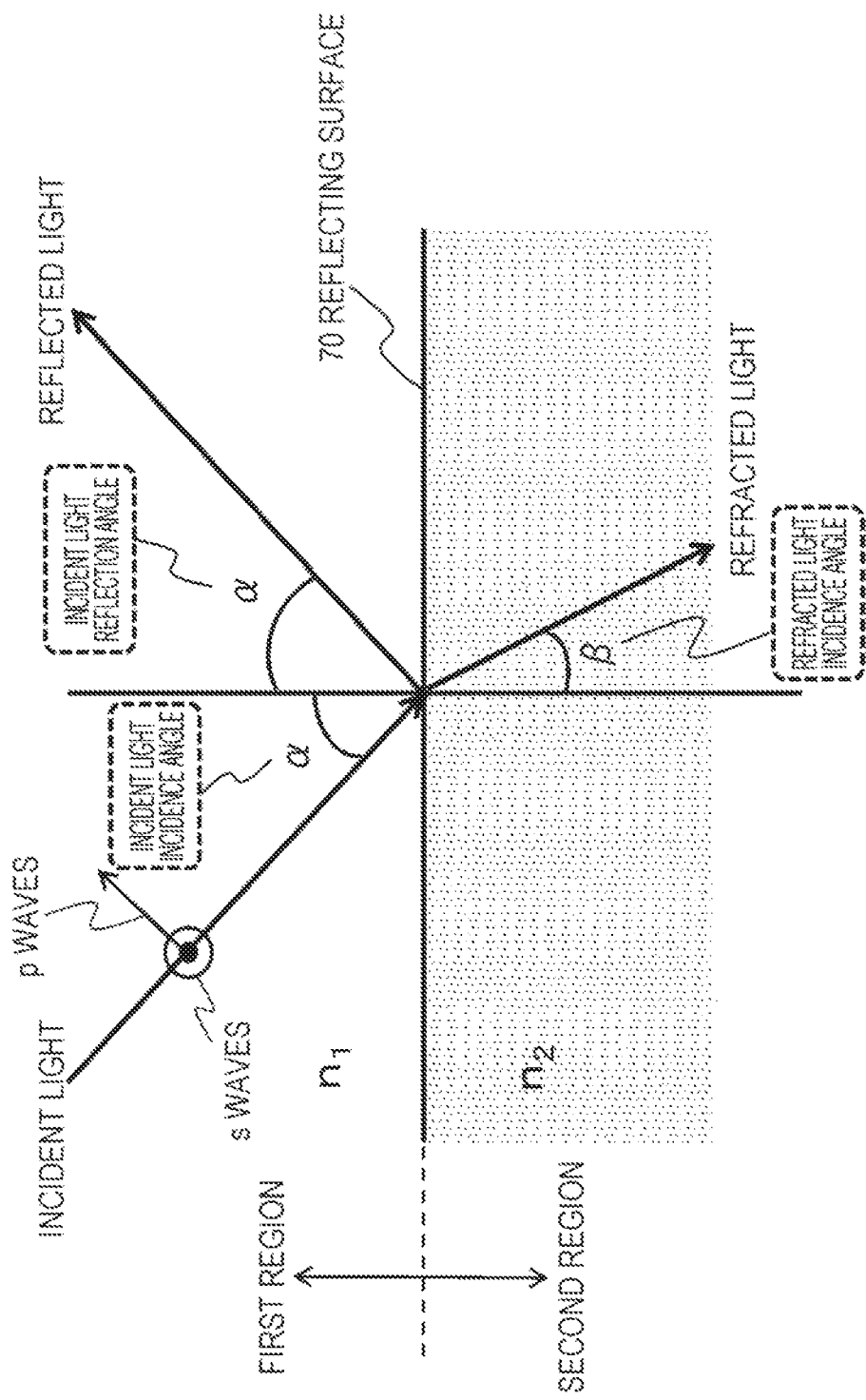
FIG. 4 is a diagram for explaining how light enters and reflected by an interface having different refractive indexes.

FIG. 4 is a diagram showing how light enters and reflected by an interface having different refractive indexes.

In FIG. 4, the region above a reflecting surface 70 is a first region, and the region below the reflecting surface 70 is a second region.

The incidence plane 52 described above with reference to FIG. 1 is equivalent to the plane of FIG. 4 (the plane of the paper).

The P waves of incident light shown in FIG. 4 is a light component whose electric field oscillates parallel to the incidence plane (the plane of FIG. 4), and the S waves of the incident light shown in FIG. 4 is a light component whose electric field oscillates perpendicularly to the incidence plane.

The first region and the second region partitioned by the reflecting surface 70 shown in FIG. 4 are regions having different refractive indexes.

The refractive index of the first region is represented by $n_1$, and the refractive index of the second region is represented by $n_2$. Further, the incidence angle of the incident light (=the incident light reflection angle) is represented by $\alpha$, and the incidence angle of the diffused light is represented by $\beta$.

It is known that, in such a case, each value satisfies the following (Expression 2) according to Snell's law.

[Mathematical Formula 2]

$$n_1 \sin \alpha = n_2 \sin \beta \quad \text{(Expression 2)}$$

Further, according to the Fresnel formula, the amplitude reflectances indicating the behaviors of the S waves and the P waves in specular reflection can be expressed as in (Expression 3) shown below.

[Mathematical Formula 3]

$$s \text{ waves: } r_s = \frac{n_1 \cos \alpha - n_2 \cos \beta}{n_1 \cos \alpha + n_2 \cos \beta} \quad \text{(Expression 3)}$$

$$p \text{ waves: } r_p = \frac{n_2 \cos \alpha - n_1 \cos \beta}{n_2 \cos \alpha + n_1 \cos \beta}$$

In the above (Expression 3), rs represents the S-wave amplitude reflectance of the reflection component, and rp represents the P-wave amplitude reflectance of the reflected component.

In addition to that, the intensity reflectance indicating the reflectance corresponding to the light intensity of the reflected light can be expressed by the square of the amplitude reflectance calculated according to the above (Expression 3).

Here, the relative refractive index n of the second region relative to the first region is set as $$n = n_2/n_1,$$

and the above (Expression 3) is converted to express the light intensities of the respective waves in the reflection component, according to Snell's law. In other words, the following values are obtained:

the light intensity Rs of the S waves contained in the reflection component, and the light intensity Rp of the P waves contained in the reflection component.

The calculation formulas of these values can be expressed by (Expression 4) shown below.

[Mathematical Formula 4]

$$s \text{ waves: } R_s = |r_s|^2 = \left( \frac{\cos \alpha - \sqrt{n^2 - \sin^2 \alpha}}{\cos \alpha + \sqrt{n^2 - \sin^2 \alpha}} \right)^2 \quad \text{(Expression 4)}$$

$$p \text{ waves: } R_p = |r_p|^2 = \left( \frac{n^2 \cos \alpha - \sqrt{n^2 - \sin^2 \alpha}}{n^2 \cos \alpha + \sqrt{n^2 - \sin^2 \alpha}} \right)^2$$

Next, polarization of transmitted light (diffused light) that travels from the second region shown in FIG. 4 into the first region by passing through the reflecting surface 70 is described.

The transmitted light is light for forming an object image in the second region. This light is equivalent to the light forming an image of the object 20 (a fish) in the example shown in FIG. 1.

Figure 5:
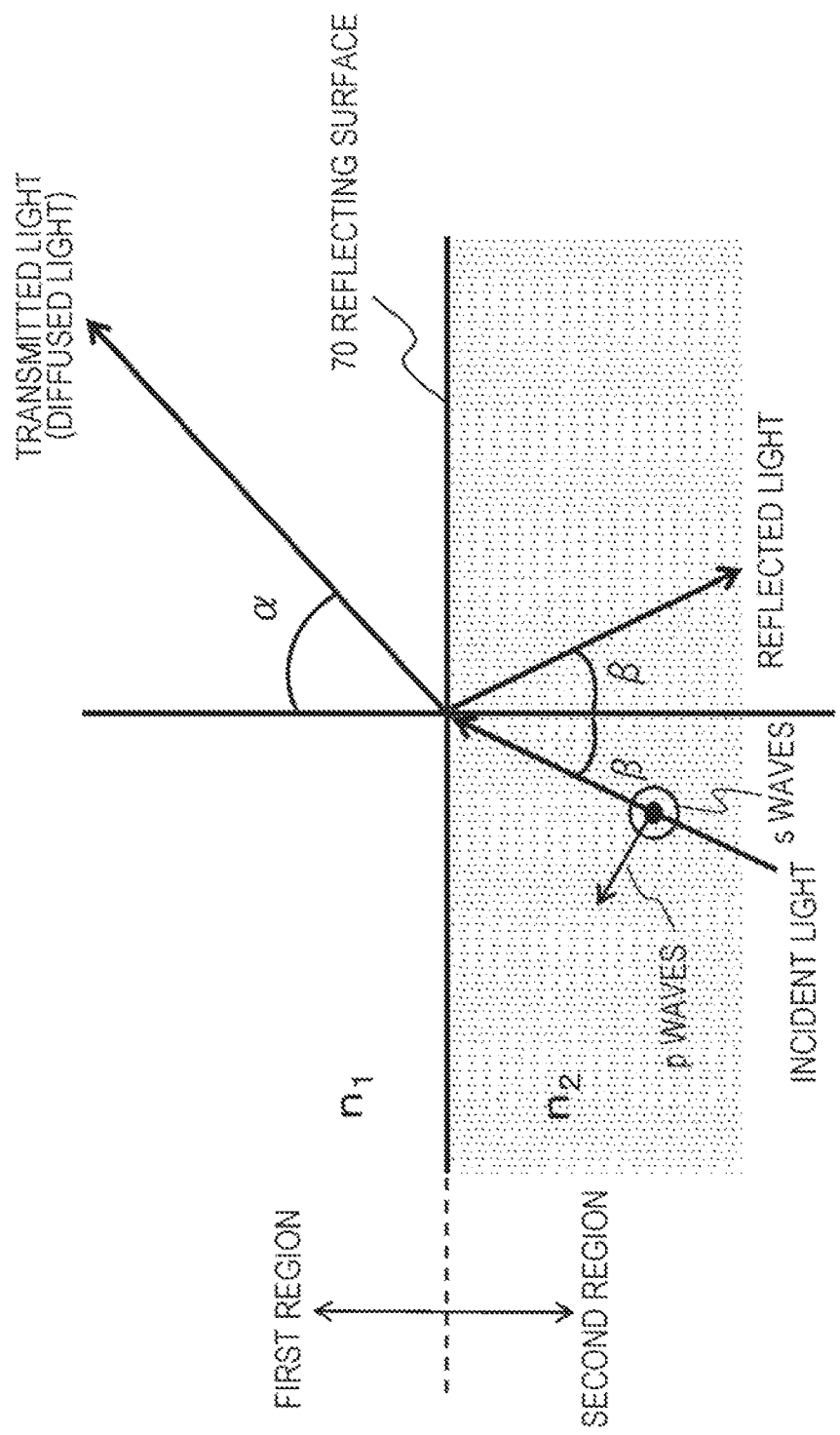
FIG. 5 is a diagram for explaining polarization of transmitted light (diffused light) that travels from a second region into a first region by passing through a reflecting surface.

FIG. 5 is a diagram for explaining polarization of transmitted light (diffused light) that travels from the second region into the first region by passing through the reflecting surface 70.

The region settings and the refractive indexes of the respective regions are similar to those shown in FIG. 4.

The refractive index of the first region is represented by $n_1$, and the refractive index of the second region is represented by $n_2$.

Further, the incidence angle of incident light emitted from the second region (=the incident light reflection angle) is represented by $\beta$, and the refraction angle of the transmitted light (diffused light) travelling into the first region by passing through the reflecting surface 70 is represented by $\alpha$.

At this stage, the respective parameters $n_1$, $n_2$, $\alpha$, and $\beta$, satisfy Snell's law (Expression 2) described above.

Further, according to the Fresnel formula, the amplitude transmittances indicating the behaviors of the S waves and the P waves in the transmitted light (diffused light) can be expressed as in (Expression 5) shown below.

[Mathematical Formula 5]

$$s \text{ waves: } t_s = \frac{2n_1 \cos \alpha}{n_1 \cos \alpha + n_2 \cos \beta} \quad \text{(Expression 5)}$$

$$p \text{ waves: } t_p = \frac{2n_1 \cos \alpha}{n_2 \cos \alpha + n_1 \cos \beta}$$

In the above (Expression 5), ts represents the S-wave amplitude transmittance of the transmitted light (diffused light), and tp represents the P-wave amplitude transmittance of the transmitted light (diffused light).

Further, the intensity transmittances Ts and Tp indicating the transmittances corresponding to the light intensity of the transmitted light can be expressed by (Expression 6) shown below.

[Mathematical Formula 6]

$$s \text{ waves: } T_s = \frac{n_2 \cos \beta}{n_1 \cos \alpha} |t_s|^2 \quad \text{(Expression 6)}$$

$$p \text{ waves: } T_p = \frac{n_2 \cos \beta}{n_1 \cos \alpha} |t_p|^2$$

Here, the relative refractive index n of the second region relative to the first region is set as $$n = n_2/n_1,$$

and the above (Expression 5) is converted to express the light intensities of the respective waves in the transmission component, according to Snell's law. In other words, the following values are obtained:

the light intensity Ts of the S waves contained in the transmitted light, and the light intensity Tp of the P waves contained in the transmitted light.

The calculation formulas of these values can be expressed by (Expression 7) shown below.

[Mathematical Formula 7]

$$s \text{ waves}: T_s = \frac{n_2 \cos \beta}{n_1 \cos \alpha}|t_s|^2 = \frac{4 \cos \alpha \sqrt{n^2 - \sin^2 \alpha}}{\left(\cos \alpha + \sqrt{n^2 - \sin^2 \alpha}\right)^2} \quad \text{(Expression 7)}$$

$$p \text{ waves}: T_p =$$

$$\frac{n_2 \cos \beta}{n_1 \cos \alpha}|t_p|^2 = \frac{4 n^2 \cos \alpha \sqrt{n^2 - \sin^2 \alpha}}{\left(n^2 \cos \alpha + \sqrt{n^2 - \sin^2 \alpha}\right)^2}$$

Figure 6:
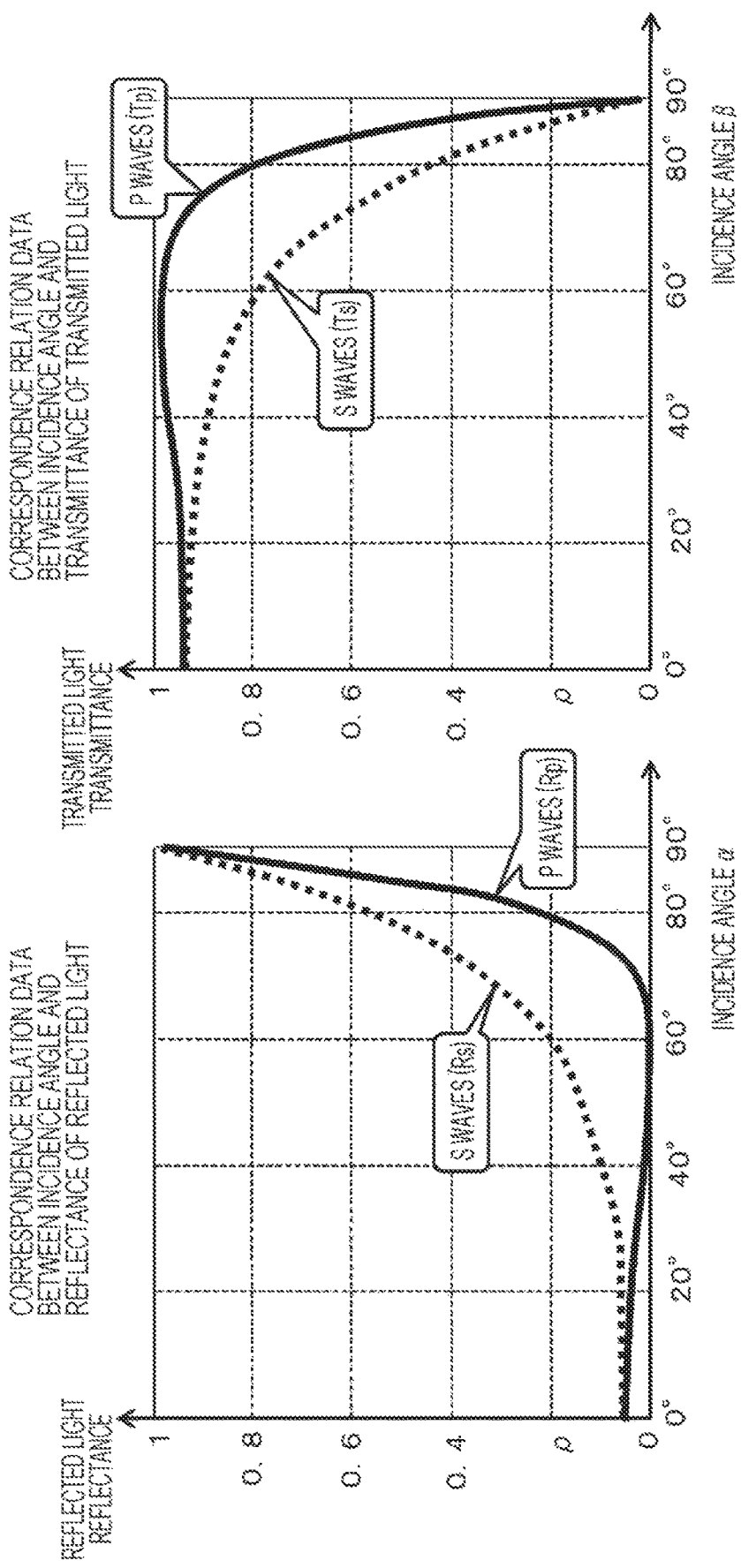
FIGS. 6A and 6B are graphs showing the relationship between the respective values of the S waves and the P waves of reflected light and transmitted light, and the incidence angle.

When the values of the S waves and the P waves of the reflected light and the transmitted light are plotted for each incidence angle, the graphs shown in FIGS. 6A and 6B are obtained. FIGS. 6A and 6B show the following two graphs.

FIG. 6A Correspondence relation data between the incidence angle the reflectance of reflected light FIG. 6B Correspondence relation data between the incidence angle and the transmittance of transmitted light Note that the graphs shown in FIGS. 6A and 6B are examples obtained in a case where the relative refractive index (n=n2/n1) between the first region and the second region is 1.6.

It should be understood that, in each of the two graphs shown in FIGS. 6A and 6B, the manner of the intensity variation with respect to the incidence angle differs between the S waves and the P waves.

In other words, this difference in behavior is a factor for the unpolarized light in reflected light to polarize. This difference in polarized light cannot be detected by human eyes or conventional image sensors. To observe the state of polarization of light, a polarizer or a polarizing filter is used. The following is a description of the intensity of light observed when a polarizing filter is placed in front of the camera.

First, the intensities of reflected light that is reflected by a boundary surface (a reflecting surface) at the boundary between two regions having different refractive indexes, transmitted light that passes through the boundary surface (reflecting surface), and incident light prior to reflection and prior to transmission are defined as shown below.

These light intensities are:

$I^r$ representing the light intensity of the incident light prior to reflection of the reflected light, and $I^t$ representing the light intensity of the incident light prior to transmission of the transmitted light.

At this stage, the intensities of the S waves and P waves in the reflected light and the transmitted light are values obtained by multiplying half of each of the intensities of the S waves and the P waves by the intensity reflectance and the intensity transmittance described above. Therefore, these values can be expressed by (Expression 8) shown below.

[Mathematical Formula 8]

$$I_s^r = \frac{R_s}{2}I^r, I_p^r = \frac{R_p}{2}I^r \quad \text{(Formula 8)}$$

$$I_s^t = \frac{T_s}{2}I^t, I_p^t = \frac{T_p}{2}I^t$$

Figure 7:
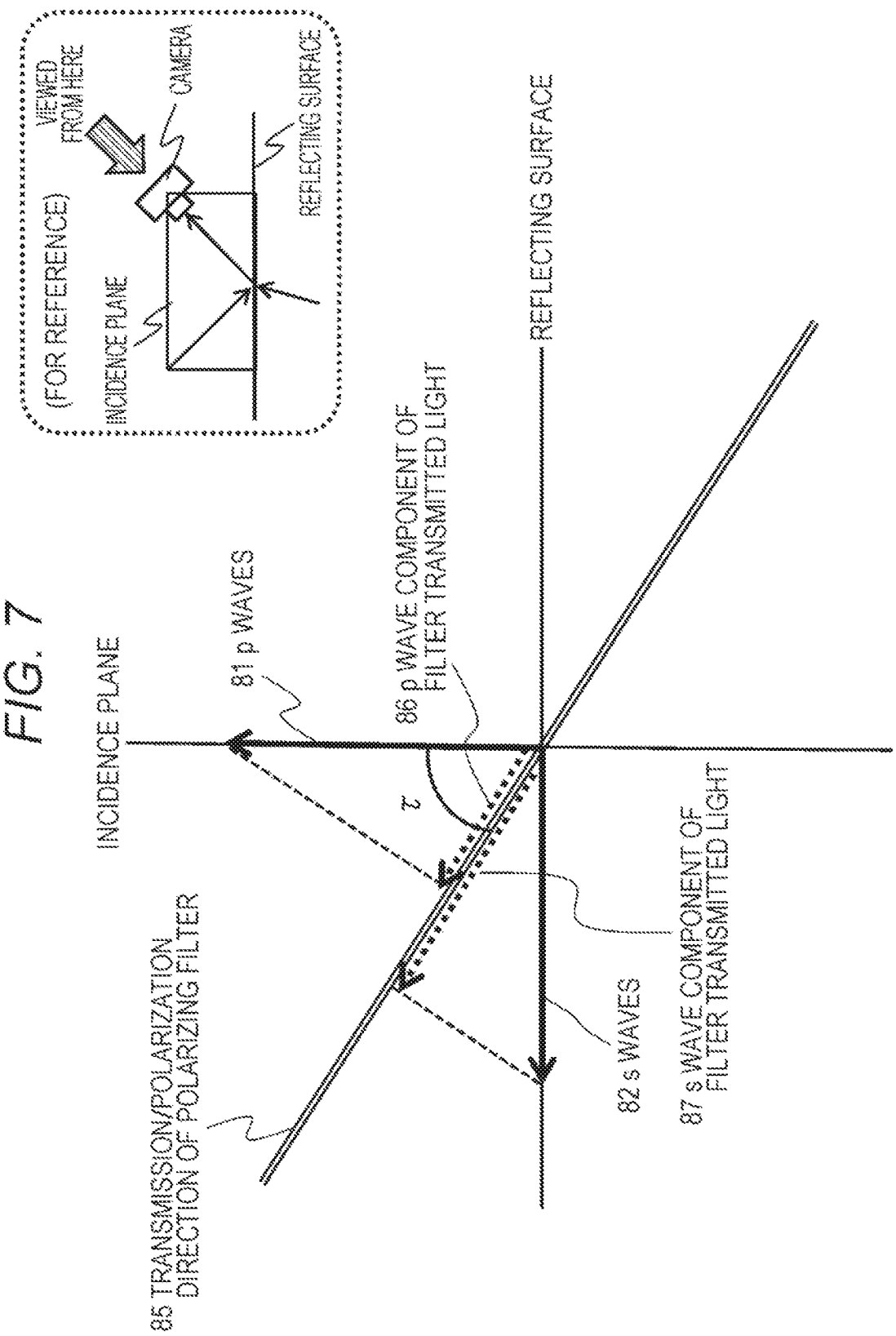
FIG. 7 is a diagram for explaining the polarization that occurs when both reflected light and transmitted light are observed from the viewpoint of the camera to which light is input.

FIG. 7 illustrates the polarization that occurs when both the reflected light and the transmitted light are observed from the viewpoint of the camera to which light is input.

FIG. 7 is an analysis diagram of light incident on the camera viewed from the camera side, as shown in FIG. 7 (reference drawing).

The camera is located on the front side of the plane FIG. 7, and observation light including both transmitted light and reflected light is input from the back side of the plane of FIG. 7 to the camera. The observation light travels along the incidence plane that is perpendicular to the camera.

The line of the incidence plane shown in FIG. 7 indicates a plane spreading in a direction perpendicular to the plane of FIG. 7, and light travels along the incidence plane from the back side of FIG. 7 toward the front side (the camera side).

The observation light, which is the light that is to enter the camera, contains both the transmitted light and the reflected light.

In FIG. 7, the intensities of the P waves and the S waves contained in the observation light formed with the transmitted light and the reflected light are indicated by solid arrows.

The waves with these intensities are P waves 81 and S waves 82 shown in FIG. 7.

The transmitting/polarizing direction in a case where a polarizing filter is placed in front of the camera is assumed to be a transmitting/polarizing direction 85 indicated by a double line in FIG. 7.

Note that the tilt angle of the transmitting/polarizing direction 85 with respect to the incidence plane is represented by T.

The intensities of the P waves and the S waves that have passed through the polarizing filter and are observed by the camera are the intensities indicated by dotted lines in FIG. 7.

These intensities are a P wave component 86 of the filter transmitted light, and an S wave component 87 of the filter transmitted light shown in FIG. 7.

The P wave component 86 of the filter transmitted light shown in FIG. 7 is equivalent to the component in the transmitting/polarizing direction 85 of the polarizing filter of the vector of the P waves 81 parallel to the incidence plane.

Meanwhile, the S wave component 87 of the filter transmitted light shown in FIG. 7 is equivalent to the component in the transmitting/polarizing direction 85 of the polarizing filter of the vector of the S waves 82 perpendicular to the incidence plane.

On the basis of this relationship, the intensity $I^r_{pol}$ of the reflected light that passes through the polarizing filter and is observed can be expressed by (Expression 9) shown below.

[Mathematical Formula 9]

$$I^r_{pol} = I_s^r \sin^2 \tau + I_p^r \cos^2 \tau \quad \text{(Formula 9)}$$

$$= (I_p^r - I_s^r) \cos^2 \tau + I_s^r$$

$$= \frac{I_s^r + I_p^r}{2} - \frac{I_s^r - I_p^r}{2} \cos 2\tau$$

$$= \frac{R_s + R_p}{4}I^r - \frac{R_s - R_p}{4}I^r \cos 2\tau$$

Likewise, the intensity $I^t_{pol}$ of the transmitted light that passes through the polarizing filter and is observed can be expressed by (Expression 10) shown below.

[Mathematical Formula 10]

$$I^t_{pol} = \frac{T_p + T_s}{4}I^t + \frac{T_p - T_s}{4}I^t \cos 2\tau \quad \text{(Formula 10)}$$

Further, since the intensity of the light observed by the camera is the sum of the transmitted light and the reflected light, the intensity $I_{pol}$ of the camera observation light containing the transmitted light and the reflected light can be expressed by (Expression 11) shown below.

[Mathematical Formula 11]

$$I_{pol} = I_{pol}^t + I_{pol}^r \quad \text{(Formula 11)}$$
$$= \frac{R_s + R_p}{4} I^r + \frac{T_p + T_s}{4} I^t +$$
$$\left( \frac{T_p - T_s}{4} I^t - \frac{R_s - R_p}{4} I^r \right) \cos 2\tau$$

Here, the relationship among the camera, the transmitting/polarizing direction of the polarizing filter, and the direction of the incidence plane is described.

Where the horizontal direction of the image plane acquired by the camera is the X-axis, and the vertical direction is the Y-axis, the relative angle between the Y-axis and the transmitting/polarizing direction of the polarizing filter can be easily acquired, but the direction of the incidence plane cannot be easily acquired.

In other words, the angle τ between the "incidence plane" described with reference to FIG. 7 and the "transmitting/polarizing direction of the polarizing filter" is unknown.

In view of this, where the relative angle between the vertical direction "Y-axis" of a camera-acquired image and the transmitting/polarizing direction of the polarizing filter is represented by θ, and the relative unknown angle between the Y-axis and the direction of the incidence plane is represented by Φ, the above (Expression 11) can be rewritten as (Expression 12) shown below.

[Mathematical Formula 12]

$$I_{pol} = \frac{R_s + R_p}{4} I^r + \frac{T_p - T_s}{4} I^t + \quad \text{(Formula 12)}$$
$$\left( \frac{T_p - T_s}{4} I^t - \frac{R_s - R_p}{4} I^r \right) \cos 2(\theta - \phi)$$

In a case where the reflection angle and the relative refractive index are known, the intensity reflectances Rs and Rp indicating the reflectances corresponding to the light intensities of reflected light, and the intensity transmittances Ts and Tp indicating the transmittances corresponding to the light intensities of transmitted light can be calculated according to (Expression 4) and (Expression 7) shown above, as already described.

Meanwhile, the relative angle θ between the vertical direction "Y-axis" of the camera-acquired image and the transmitting/polarizing direction of the polarizing filter is an angle determined in accordance with the set angle of the polarizing filter attached to the camera, and can be calculated on the basis of the set angle of the polarizing filter.

Therefore, the above (Expression 12) can be regarded as a function of three variables with the following three unknowns:

$I^r$: the light intensity of the incident light prior to reflection of the reflected light, $I^t$: the light intensity of the incident light prior to transmission of the transmitted light, and Φ: the relative angle between the vertical direction "Y-axis" of the camera-acquired image and the direction of the incidence plane.

To derive three unknowns from an expression including three unknowns, a system of equations including three kinds of equations should be obtained.

For this purpose, images are captured at three different set angles θ, through polarizing direction control that involves rotation or the like of the polarizing filter attached to the camera. In other words, an image capturing process is performed by setting at least three different relative angles θ between the vertical direction "Y-axis" of the camera-acquired image and the transmitting/polarizing direction of the polarizing filter, and the value of $I_{pol}$ in the above (Expression 12), which is the value of the observation light intensity $I_{pol}$ of the camera, is acquired.

Through this process, a system of equations including three kinds of equations can be acquired, and the three unknowns in the above (Expression 12)) can be calculated by solving this system of equations. That is, it becomes possible to calculate the following unknowns:

$I^r$: the light intensity of the incident light prior to reflection of the reflected light, $I^t$: the light intensity of the incident light prior to transmission of the transmitted light, and Φ: the relative angle between the vertical direction "Y-axis" of the camera-acquired image and the direction of the incidence plane.

Here, the light intensity of the incident light prior to transmission of the transmitted light is represented by $I^t$, and $I^t$ is equivalent to the transmitted light component contained in the camera-captured image. Accordingly, an image in which the value of $I^t$ is set as the pixel value is generated, so that it becomes possible to generate an image formed only with transmitted light, or an image that is formed by removing the reflected light component from an observation image containing reflected light and transmitted light, and contains only the transmitted light.

Note that the intensity reflectances Rs and Rp indicating the reflectances corresponding to the light intensities of reflected light, and the intensity transmittances Ts and Tp indicating the transmittances corresponding to the light intensities of transmitted light, are calculated according to the above (Expression 4) and (Expression 7), which include the relative refractive index $n=n_2/n_1$ and the reflection angle α.

The respective values of the relative refractive index n and the reflection angle α are preferably acquired in accordance with image capturing environments.

Alternatively, since the relative refractive indexes n of many substances relative to air is 1.5 to 1.6, calculations may be performed with the relative refractive index n set at n=1.5 to 1.6.

For example, the value of the relative refractive index $n=n_2/n_1$, which is the ratio between the refractive index $n_1$ of air and the refractive index $n_2$ of a substance such as water or glass, is 1.5 to 1.6. In a case where an image of an object in water or glass is to be captured, even if calculations are performed with the relative refractive index n set in the range of 1.5 to 1.6, significant errors do not occur.

In a case where the reflecting surface is horizontal, the reflection angle α can be acquired from a sensor such as a gyroscope that detects the image capturing angle of the camera, for example.

Specific examples of image processing devices and image processing methods are described below.

4. An Image Processing Device and an Image Processing Method for Generating an Image with Reflected Light Components Removed from Images of Image Capturing Directions Referring now to FIG. 8 and other drawings, an image processing device and an image processing method for generating an image with reflected light components removed from images of image capturing directions are described.

Figure 8:
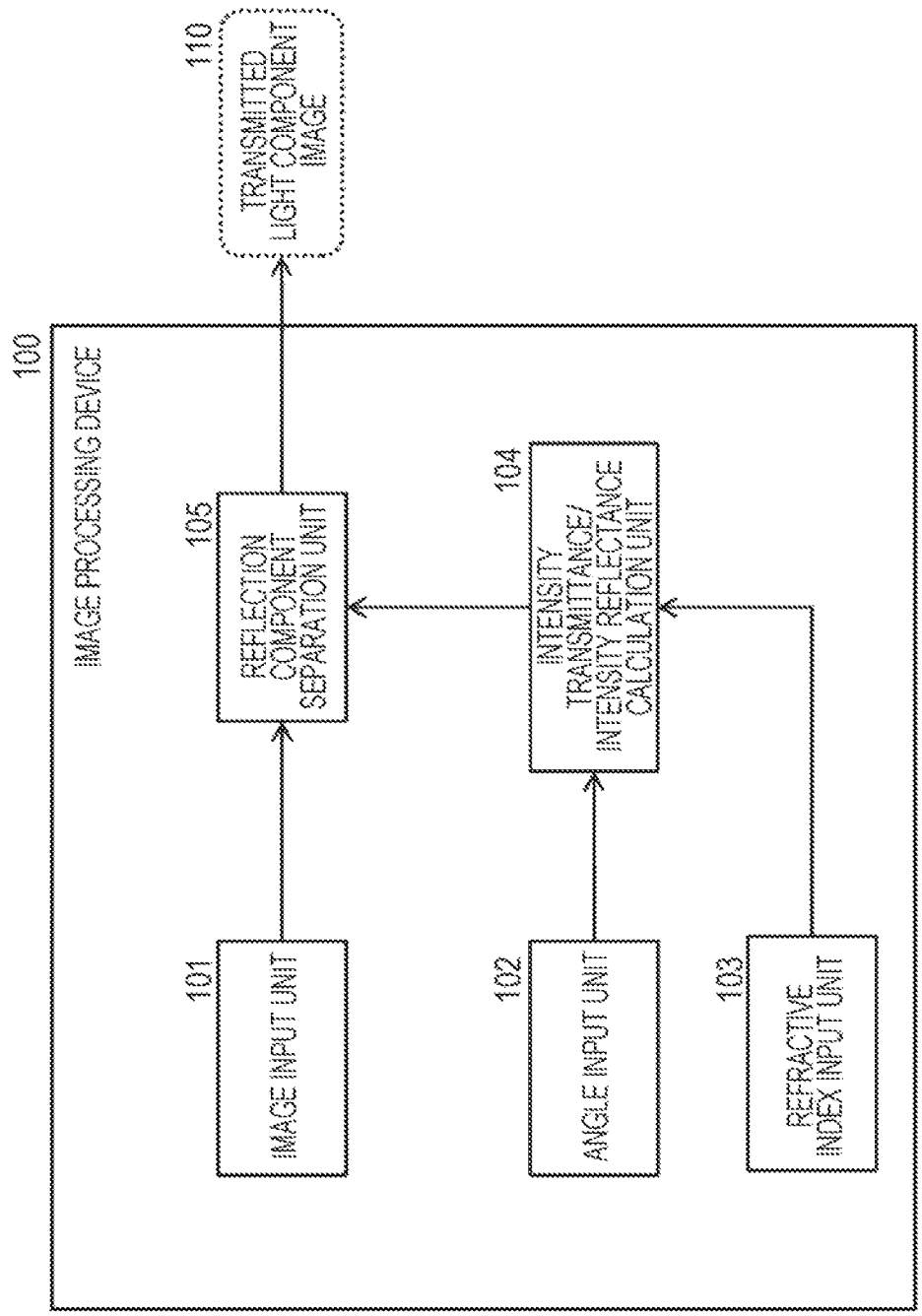
FIG. 8 is a diagram showing the configuration of an embodiment of an image processing device of the present disclosure.

FIG. 8 is a diagram showing the configuration of an embodiment of an image processing device of the present disclosure.

An image processing device 100 shown in FIG. 8 includes an image input unit 101, an angle input unit 102, a refractive index input unit 103, an intensity transmittance/intensity reflectance calculation unit 104, and a reflection component separation unit 105.

The image processing device 100 inputs images captured in the environment shown in FIG. 1, for example, or images formed with observation light including reflected light and transmitted light, and generates a transmitted light component image 110 formed only with the transmitted light component, with the reflected light component removed from the input images.

The image input unit 101 inputs different polarization images in a plurality of directions.

Specifically, three or more different polarization images captured by rotating a polarizing filter set on the camera set are input, for example.

Alternatively, one captured image for which an imaging element having different polarizing filters stacked is used on a pixel-by-pixel basis may be input. The configuration of this imaging element will be described later.

The process described below is to be performed in a case where three or more different polarization images captured by rotating the polarizing filter set on the camera are input.

The image input unit 101 inputs different polarization images of a plurality of polarizing directions, and inputs the input images to the reflection component separation unit 105.

The reflection component separation unit 105 separates the reflection components from the acquired images, on the basis of intensity transmittances and intensity reflectances calculated by the intensity transmittance/intensity reflectance calculation unit 104. The reflection component separation unit 105 then generates and outputs the transmitted light component image 110 formed only with the transmitted light component.

The intensity transmittance/intensity reflectance calculation unit 104 calculates the respective intensity transmittances Ts and Tp, and the respective intensity reflectances Rs and Rp of the S waves and the P waves, on the basis of the reflection angles α of the object and the relative refractive indexes $n=n_2/n_1$ in the respective captured images (scenes), which have been input from the angle input unit 102 and the refractive index input unit 103.

Note that the intensity transmittance/intensity reflectance calculation unit 104 is not necessarily a component independent of the reflection component separation unit 105, but may be one component in the reflection component separation unit 105.

In such a configuration, the intensity transmittance/intensity reflectance calculation unit 104 in the reflection component separation unit 105 inputs the reflection angles α and the relative refractive indexes $n=n_2/n_1$ from the angle input unit 102 and the refractive index input unit 103, and calculates the respective intensity transmittances Ts and Tp, the respective intensity reflectances Rs and Rp of the S waves and the P waves. Further, the same reflection component separation unit 105 separates the reflection components from the images acquired from the image input unit 101 on the basis of the calculation results, and generates and outputs the transmitted light component image 110 formed only with the transmitted light component.

In the description below, the respective components are explained in detail.

The image input unit 101 acquires polarization images of a plurality of different directions. Polarization images of a plurality of directions means a plurality of images obtained when a plurality of images are captured by rotating a polarizing filter in different directions in a case where the polarizing filter is placed in front of the camera.

Various means can be considered as methods of acquiring a plurality of polarization images.

Figure 9:
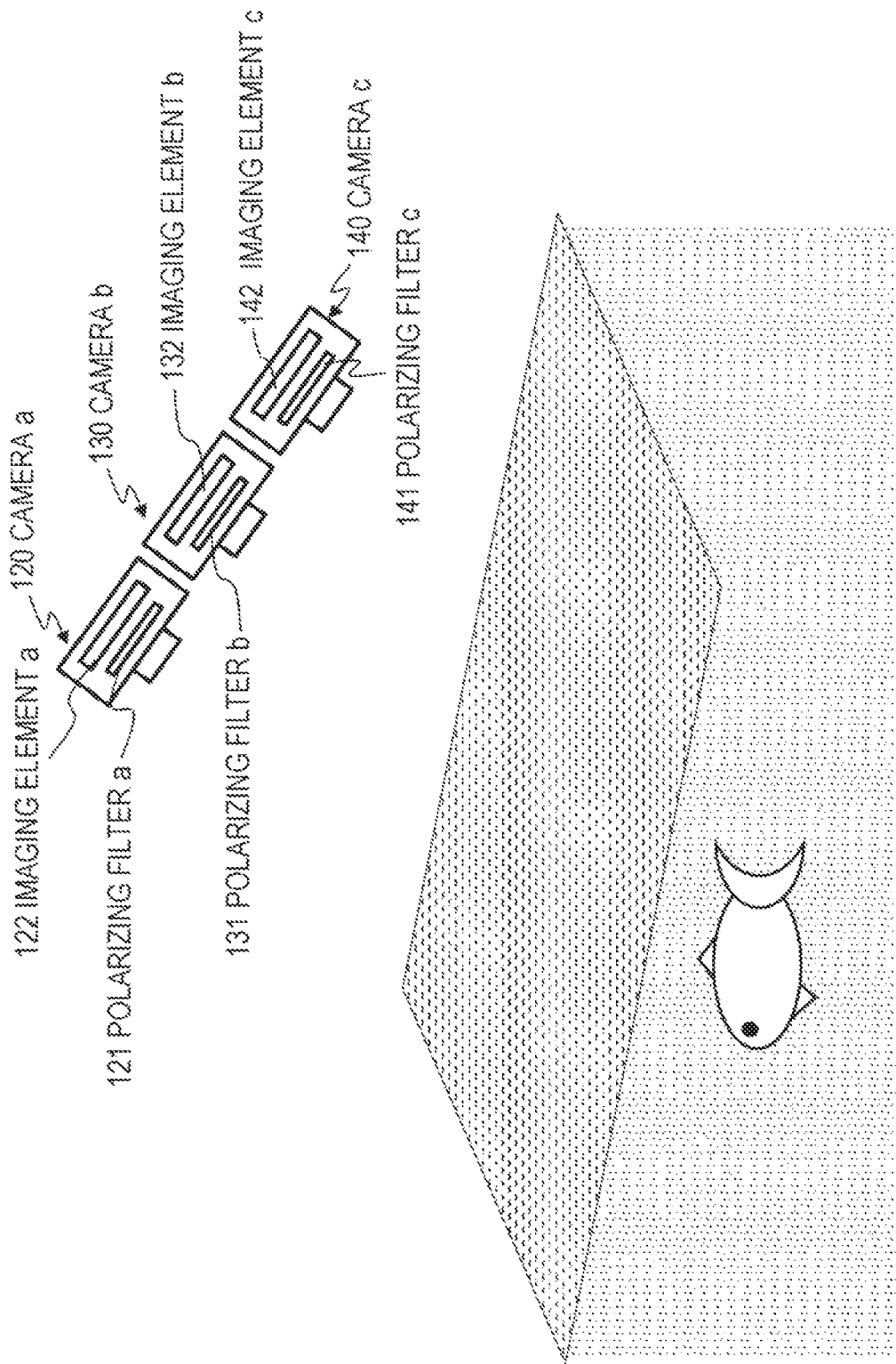
FIG. 9 is a diagram for explaining an example of an image input unit that acquires polarization images.

An example of a method for acquiring a plurality of polarization images is now described, with reference to FIG. 9.

For example, as shown in FIG. 9, three or more cameras such as a camera a 120, a camera b 130, and a camera c 140 are provided. Further, polarizing filters 121a, 131a, and 141a of different directions are disposed in front of the respective cameras a through c 120 through 140, and images are captured so that polarization images of a plurality of different directions are captured by imaging elements 122a through 142c of the respective cameras a through c 120 through 140.

In this case, for example, the set angle (corresponding to the transmitting/polarizing direction) of the polarizing filter a 121 of the camera a 120 is set to 0 degrees, the set angle of the polarizing filter b 131 of the camera b 130 is set to 60 degrees, and the polarizing filter c 141 of the camera c 140 is set to 120 degrees. Images are then captured at the same time. By this image capturing process, it is possible to capture polarization images of three different polarizing directions.

Note that the above described set angles of the polarizing filters are an example, and any combination of angles may be used as long as all the three angles are different. Further, four or more cameras may be used.

Figure 10:
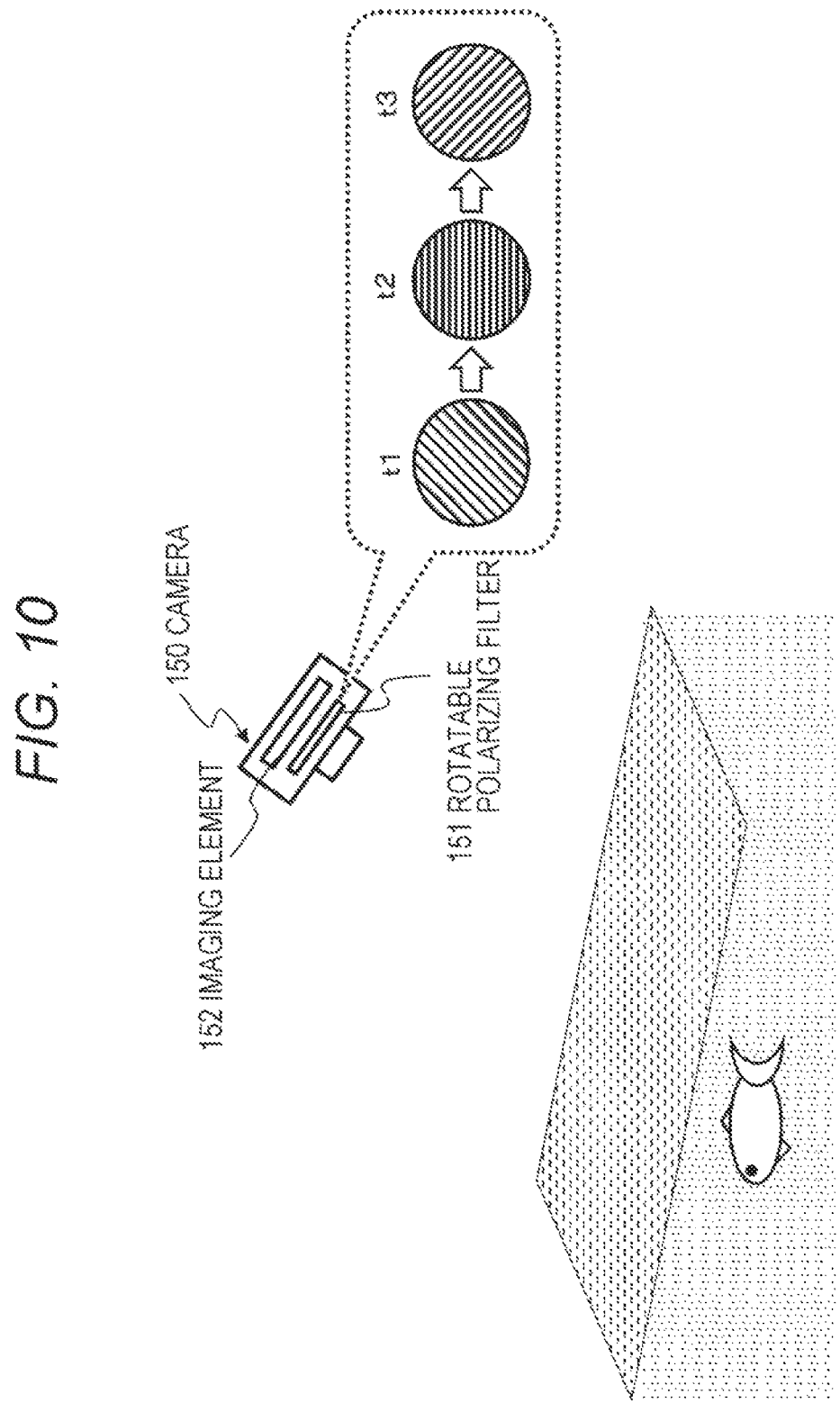
FIG. 10 is a diagram for explaining an example of an image input unit that acquires polarization images.

A method using a camera 150 shown in FIG. 10 can also be considered as a means for acquiring polarization images of a plurality of directions.

The camera 150 captures an image a plurality of times in a time-division manner. A rotatable polarizing filter 151 capable of rotating is provided in the camera 150.

The rotatable polarizing filter 151 rotates a predetermined angle every time the camera 150 captures an image.

For example, the rotatable polarizing filter 151 is set at different angles at respective image capturing times t1, t2, and t3, as shown in the drawing. For example, the rotatable polarizing filter 151 rotates 45 degrees at a time. As an image is captured three times with this camera 150, polarization images of a plurality of directions can be acquired.

In this embodiment, a case where polarization images of three directions are acquired by such the above method is considered.

Specifically, the pixel value of each pixel i in the polarization image acquired from a transmitting/polarizing direction=0 degrees is represented by $I_i^0$, the pixel value of each pixel i in the polarization image acquired from a transmitting/polarizing direction=45 degrees is represented by $I_i^{45}$, and the pixel value of each pixel i in the polarization image acquired from a transmitting/polarizing direction 0 90 degrees is represented by $I_i^{90}$.

Figure 11:
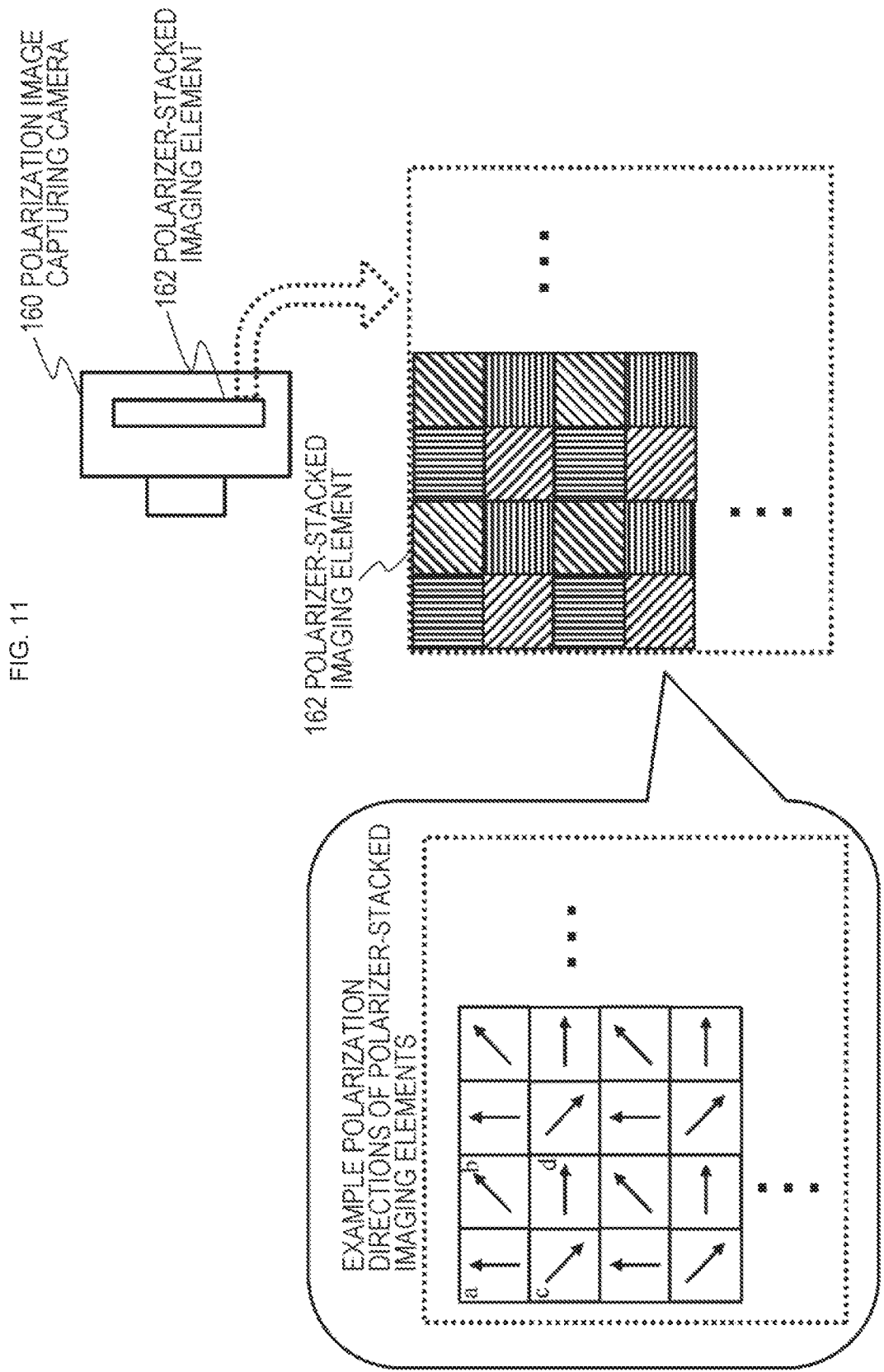
FIG. 11 is a diagram for explaining an example of an image input unit that acquires polarization images.

Further, images may be captured with a polarization image capturing camera 160 as shown in FIG. 11.

The polarization image capturing camera 160 shown in FIG. 11 is equipped with a special image sensor, which is a polarizer-stacked imaging element 162.

The polarizer-stacked imaging element 162 has a configuration in which polarizing filters (polarizers) having different polarizing directions for the respective pixels constituting the imaging element are stacked.

Each of the pixels constituting the polarizer-stacked imaging element 162 is equipped with a polarizer that functions as an optical filter that passes only light polarized in a specific direction. A photoelectric conversion element that receives light having passed through the polarizer is provided under the polarizer.

The polarizer set for each of the pixels constituting the polarizer-stacked imaging element 162 has a configuration in which 2×2=4 pixels are set as one unit, for example, and these four pixels pass only light of different polarizing directions from one another.

The hatching shown in each pixel of the polarizer-stacked imaging element 162 shown in a lower right portion of FIG. 11 indicates a polarizing direction.

An example of the polarization directions of a polarizer-stacked imaging element in FIG. 11 is a diagram in which the polarizing directions of the respective pixels of the polarizer-stacked imaging element 162 are indicated by arrows.

For example, the polarizing directions of the four pixels a, b, c, and d at the upper left edge are set as follows.

The polarizing direction of the pixel a is a vertical direction (0 degrees), and the pixel a receives only vertically polarized light.

The polarizing direction of the pixel b is an upwardly oblique direction (45 degrees), and the pixel b receives only light polarized in the upwardly oblique direction.

The polarizing direction of the pixel c is a downwardly oblique direction (135 degrees), and the pixel c receives only light polarized in the downwardly oblique direction.

The polarizing direction of the pixel d is a horizontal direction (90 degrees), and the pixel d receives only horizontally polarized light.

Note that, in the above description, the vertical direction, the upwardly oblique direction, the downwardly oblique direction, and the horizontal direction are directions relative to the camera, and are directions in a case where the lateral direction of the camera is defined as the horizontal direction, and the vertical direction of the camera is defined as the vertical direction. Therefore, the polarizing directions of the respective pixels change with the tilt of the camera.

Figure 12:
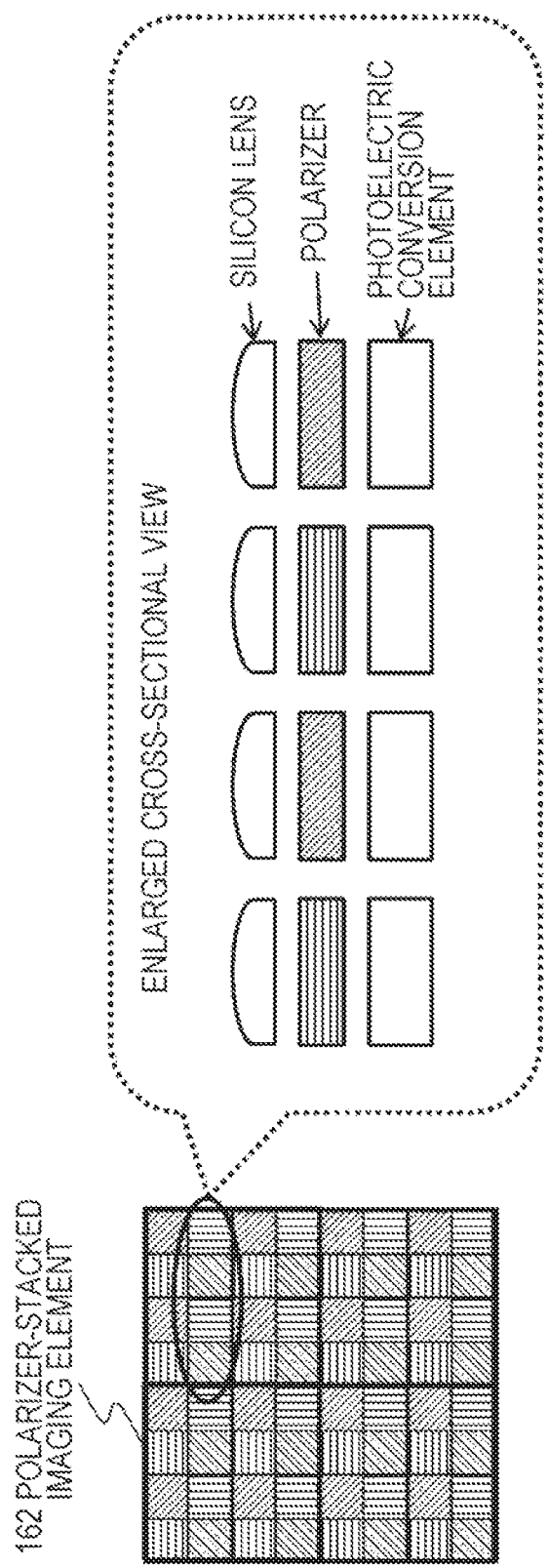
FIG. 12 is a diagram for explaining an example of an image input unit that acquires polarization images.

FIG. 12 shows an example cross-sectional configuration of the polarizer-stacked imaging element 162 described above with reference to FIG. 11. As shown in FIG. 12, a cross-section of the polarizer-stacked imaging element 162 has a stack structure in which the layers mentioned below are formed in the direction from the upper side (the imaging element surface) toward the lower side (the inside of the imaging element):

(1) silicon lenses;
(2) polarizers; and
(3) photoelectric conversion elements.

The stack structure includes these layers (1) through (3).

Light entering the imaging element when an image is to be captured passes through the polarizers via the silicon lenses, and is received by the photoelectric conversion elements.

Note that, in the example described above with reference to FIGS. 11 and 12, the polarizer-stacked imaging element 162 is designed to have 2×2=4 pixels as one unit, and passes light of different polarizing directions from one another. Such four-pixel units are repeatedly set, so that all the pixels of the polarizer-stacked imaging element 162 are formed.

The polarizer-stacked imaging element 162 is designed to capture polarization images of four different polarizing directions with a unit of 2×2=4 pixels, and can obtain four different polarization images.

Note that one polarization image has only one pixel value for a unit of four pixels, and therefore, the same pixel value is set in the other three pixels. Through this process, four different polarization images can be obtained in one image capturing process, though the resolution becomes lower.

Note that, although the example shown in FIG. 11 is the configuration of an imaging element capable of acquiring four polarization images with a four-pixel unit, the number of polarization directions may be any number not smaller than three. Further, the settings of the polarizing directions are not limited to the example shown in FIG. 11, and various directions can be set.

The image input unit 101 of the image processing device 100 shown in FIG. 8 acquires three or more different polarization images captured by the camera described above with reference to FIG. 9, FIG. 10, or FIGS. 11 and 12, for example, and inputs the polarization images to the reflection component separation unit 105.

The angle input unit 102 acquires the reflection angles (a) corresponding to the respective pixels of the input images input by the image input unit 101, and inputs the reflection angles (a) to the intensity transmittance/intensity reflectance calculation unit 104.

Various methods can be considered as methods of acquiring the reflection angles corresponding to the respective pixels of images. For example, angle data that is input by the user (operator) in accordance with the image capturing angle of the camera that captures the input images is stored into a memory, for example, and the stored data is used in calculating the reflection angles corresponding to the respective pixels of the images.

Alternatively, information about an angle sensor or the like included in the camera is set as attribute information about the input images, and is input and stored together with the images into a memory. The stored data may be used in calculating the reflection angles corresponding to the respective pixels of the images.

Alternatively, prescribed angle information indicating 45 degrees, for example, may be stored beforehand into a memory, and the angle information may be used as the reflection angles corresponding to the respective pixels of the images.

Note that it is possible to calculate the strictly pixel-by-pixel reflection angles that differ for each of the pixels constituting an image, but it is also possible to simply set and use the same reflection angle for all the pixels constituting an image or in a pixel group unit in a predetermined region.

The angle input unit 102 acquires the reflection angles (a) corresponding to the respective pixels of the input images input by the image input unit 101 by one of the above described methods, for example, and inputs the reflection angles (a) to the intensity transmittance/intensity reflectance calculation unit 104.

The refractive index input unit 103 acquires the relative refractive indexes corresponding to the respective pixels of the input images input by the image input unit 101, and inputs the relative refractive indexes to the intensity transmittance/intensity reflectance calculation unit 104.

Note that the same relative refractive index may be used as a value common to all the pixels constituting the images.

Various methods may be considered as methods of acquiring a relative refractive index. For example, the data of a relative refractive index ($n=n_2/n_1$) input by the user (operator) who captures input images can be stored into a memory, and the stored data may be used.

Alternatively, relative refractive index ($n=n_2/n_1$) data such as 1.5 can be stored beforehand into a memory, and the stored data may be used, for example.

As described above, since the relative refractive indexes n of many substances with respect to air range from 1.5 to 1.6, fixed relative refractive index data that is set as n=1.5 or n=1.6 can be stored into a memory, and the stored data may be used.

The refractive index of air is about 1.0, the refractive index of water is about 1.33, and the refractive index of glass is about 1.4 to 2.0, for example. The refractive index varies among substances in this manner, but most of the substances other than air have refractive indexes ranging from 1.3 to 1.6.

The user may set the relative refractive index corresponding to the refractive index of the region in which the object exists, depending on whether the region is in water or glass.

The refractive index input unit 103 acquires the relative refractive indexes corresponding to the respective pixels of the input images input by the image input unit 101 by one of the above described methods, for example, and inputs the relative refractive indexes to the intensity transmittance/intensity reflectance calculation unit 104.

The intensity transmittance/intensity reflectance calculation unit 104 acquires the reflection angles and the relative refractive indexes corresponding to the respective pixels of the input images input by the image input unit 101, and calculates the intensity transmittances and the intensity reflectances corresponding to the respective pixels of the images.

Specifically, where the reflection angle corresponding to each pixel i of the input images input by the image input unit 101 is represented by $\alpha_i$, and the relative refractive index corresponding to each pixel is represented by $n_1$, the intensity transmittance/intensity reflectance calculation unit 104 performs a process of calculating each of the following values:

(a) the intensity reflectance $Rs_i$ of the S waves of the reflected light at the pixel i;

(b) the intensity reflectance $Rp_i$ of the P waves of the reflected light at the pixel i;

(c) the intensity transmittance $Ts_i$ of the S waves of the transmitted light at the pixel i; and (d) the intensity transmittance of the P waves of the transmitted light at the pixel i $Tp_i$.

(a) The intensity reflectance $Rs_i$ of the S waves of the reflected light at the pixel i, and (b) the intensity reflectance $Rp_i$ of the P waves of the reflected light at the pixel i are calculated according to (Expression 4) described above.

Further, (c) the intensity transmittance $Ts_i$ of the S waves of the transmitted light at the pixel i, and (d) the intensity transmittance of the P waves of the transmitted light at the pixel i $Tp_i$ are calculated according to (Expression 7) described above.

Note that the values input from the angle input unit 102 and the refractive index input unit 103 are used as the respective values of the reflection angles ($\alpha$) and the relative refractive indexes ($n=n_2/n_1$), which are required in (Expression 4) and (Expression 7).

The values of the intensity reflectances $Rs_i$ and $Rp_i$ and the intensity transmittances $Ts_i$ and $Tp_i$ corresponding to the respective pixels i of the input images, which are calculated by the intensity transmittance/intensity reflectance calculation unit 104, are input to the reflection component separation unit 105.

The reflection component separation unit 105 corrects the pixel values of the input images input from the image input unit 101, calculates pixel values from which the reflection components of the respective pixels have been removed, and generates the transmitted light component image 110.

In this pixel value calculation process, the reflection component separation unit 105 uses the intensity transmittances and the intensity reflectances of the respective pixels input from the intensity transmittance/intensity reflectance calculation unit 104. In other words, the reflection component separation unit 105 calculates pixel values from which the reflection components of the respective pixels have been removed, using the following values:

(a) the intensity reflectance $Rs_i$ of the S waves of the reflected light at the pixel i;

(b) the intensity reflectance $Rp_i$ of the P waves of the reflected light at the pixel i;

(c) the intensity transmittance $Ts_i$ of the S waves of the transmitted light at the pixel i; and (d) the intensity transmittance of the P waves of the transmitted light at the pixel i $Tp_i$.

A specific example process to be performed by the reflection component separation unit 105 is now described.

Note that the input images input from the image input unit 101 are assumed to be the following three kinds of polarization images:

a polarization image $I^0$ acquired from a transmitting/polarizing direction=0 degrees;

a polarization image $I^{45}$ acquired from a transmitting/polarizing direction=45 degrees; and a polarization image $I^{90}$ acquired from a transmitting/polarizing direction=90 degrees.

These three types of polarization images are the input images input from the image input unit 101.

Further, the pixel values of the pixels i of these three polarization images are defined as follows.

The pixel value of each pixel i in the polarization image acquired from the transmitting/polarizing direction=0 degrees is represented by $I_i^0$, the pixel value of each pixel i in the polarization image acquired from the transmitting/polarizing direction=45 degrees is represented by $I_i^{45}$, and the pixel value of each pixel i in the polarization image acquired from the transmitting/polarizing direction=90 degrees is represented by $I_i^{90}$.

Note that each of these pixel values is an observation pixel value including a reflected light component and a transmitted light component.

The reflection component separation unit 105 first acquires the pixel values $I_i^0$, $I_i^{45}$, and $I_i^{90}$ at the respective pixels i of the three polarization images $I^0$, $I^{45}$, and $I^{90}$ input from the image input unit 101, and further acquires the following values:

(a) the intensity reflectance $Rs_i$ of the S waves of the reflected light at each pixel i;

(b) the intensity reflectance $Rp_i$ of the P waves of the reflected light at each pixel i;

(c) the intensity transmittance $Ts_i$ of the S waves of the transmitted light at each pixel i; and (d) the intensity transmittance $Tp_i$ of the P waves of the transmitted light at each pixel i.

These values are the values input from the intensity transmittance/intensity reflectance calculation unit 104.

On the basis of these acquired values, the reflection component separation unit 105 sets a system of equations (Expression 13) including the three observation pixel value calculation equations shown below.

[Mathematical Formula 13]

$$I_i^0 = \frac{R_{si} + R_{pi}}{4} I_i^r + \frac{T_{pi} + T_{si}}{4} I_i^t +$$
$$\left(\frac{T_{pi} - T_{si}}{4} I_i^t - \frac{R_{si} - R_{pi}}{4} I_i^r\right) \cos 2(0 - \phi)$$

$$I_i^{45} = \frac{R_{si} + R_{pi}}{4} I_i^r + \frac{T_{pi} + T_{si}}{4} I_i^t +$$
$$\left(\frac{T_{pi} - T_{si}}{4} I_i^t - \frac{R_{si} - R_{pi}}{4} I_i^r\right) \cos 2(45 - \phi)$$

$$I_i^{90} = \frac{R_{si} + R_{pi}}{4} I_i^r + \frac{T_{pi} + T_{si}}{4} I_i^t +$$
$$\left(\frac{T_{pi} - T_{si}}{4} I_i^t - \frac{R_{si} - R_{pi}}{4} I_i^r\right) \cos 2(90 - \phi)$$

(Formula 13)

The above (Expression 13) is similar to the observation pixel value calculation formula described above with reference to (Expression 12), and, as described above, is formulas for calculating observation pixel values including reflected light components and transmitted light components.

In the above formula (13), the pixel value (observation pixel value) of each pixel i in the polarization image acquired from the transmitting/polarizing direction=0 degrees is represented by $I_i^0$, the pixel value (observation pixel value) of each pixel i in the polarization image acquired from the transmitting/polarizing direction=45 degrees is represented by $I_i^{45}$, and the pixel value (observation pixel value) of each pixel i in the polarization image acquired from the transmitting/polarizing direction=90 degrees is represented by $I_i^{90}$.

These pixel values are the pixels values (observation pixel values) obtained from the input polarization images and are known values.

Further, (a) the intensity reflectance of the S waves of the reflected light at each pixel i is represented by $Rs_i$, (b) the intensity reflectance of the P waves of the reflected light at each pixel i is represented by $Rp_i$, (c) the intensity transmittance of the S waves of the transmitted light at the pixel i is represented by $Ts_i$, and (d) the intensity transmittance of the P waves of the transmitted light at each pixel i is represented by $Tp_i$.

Each of these values is a value input from the intensity transmittance/intensity reflectance calculation unit 104 and is a known value.

Accordingly, the unknowns included in the above (Expression 13) are the following three values:

$I_i^r$: the light intensity of the incident light prior to reflection of the reflected light at each pixel i;

$I_i^t$: the light intensity of the incident light prior to transmission of the transmitted light at each pixel i; and Φ: the relative angle between the vertical direction "Y-axis" of the camera-acquired image and the direction of the incidence plane.

The above (Expression 13) is a system of equations having these three variables (unknowns).

(Expression 13) is a system of equations in which three equations exist for these three variables, and it is possible to calculate the three variables, $I_i^r$, $I_i^t$, and Φ by solving this system of equations.

Here, the light intensity of the incident light prior to transmission of the transmitted light is represented by $I_i^t$, and $I_i^t$ is equivalent to the transmitted light component contained in the camera-captured image.

The reflection component separation unit 105 generates an image in which the value of $I_i^t$ is set as a pixel value, and outputs the image as the transmitted light component image 110.

This transmitted light component image 110 is an image that is formed by removing the reflected light components from an observation image containing reflected light and transmitted light, and is formed only with the transmitted light component.

By performing such a process, the image processing device shown in FIG. 8 can remove reflection components from images captured from various directions not only in a case where the set angle of the camera or the angle with respect to the reflecting surface is a particular angle (Brewster's angle). Thus, the image processing device can generate and output a clear object image (=a transmitted light component image).

Note that, in the embodiment described above, polarization images of three different polarizing directions are input from the image input unit 101, and processing is then performed. However, processing according to the above embodiment can also be performed in a case where a non-polarization image that is a conventional image captured without any polarizing filter is combined with polarization images of two different polarizing directions.

In other words, even if a non-polarization image is included among the input images from the image input unit 101, it is possible to remove the reflection components, and generate and output a clear object image (=a transmitted light component image).

Further, as described above, the intensity transmittance/intensity reflectance calculation unit 104 may be a component included in the reflection component separation unit 105. In other words, the reflection component separation unit 105 inputs the reflection angles α and the relative refractive indexes $n=n_2/n_1$ from the angle input unit 102 and the refractive index input unit 103, and calculates the respective intensity transmittances Ts and Tp, and the respective intensity reflectances Rs and Rp of the S waves and the P waves. Further, the same reflection component separation unit 105 may separate the reflection components from the images acquired from the image input unit 101 on the basis of the calculation results, and generate and output the transmitted light component image 110 formed only with the transmitted light component.

5. Other Embodiments

Next, embodiments that have different configurations and perform different processes from the above embodiment are described.

(5-1. An Example Configuration not Including the Refractive Index Input Unit)

The image processing device 100 described above with reference to FIG. 8 includes the angle input unit 102 that inputs reflection angles α, and the refractive index input unit 103 that inputs relative refractive indexes (n=$n_2/n_1$).

These parameter input units may exclude the refractive index input unit 103.

Figure 13:
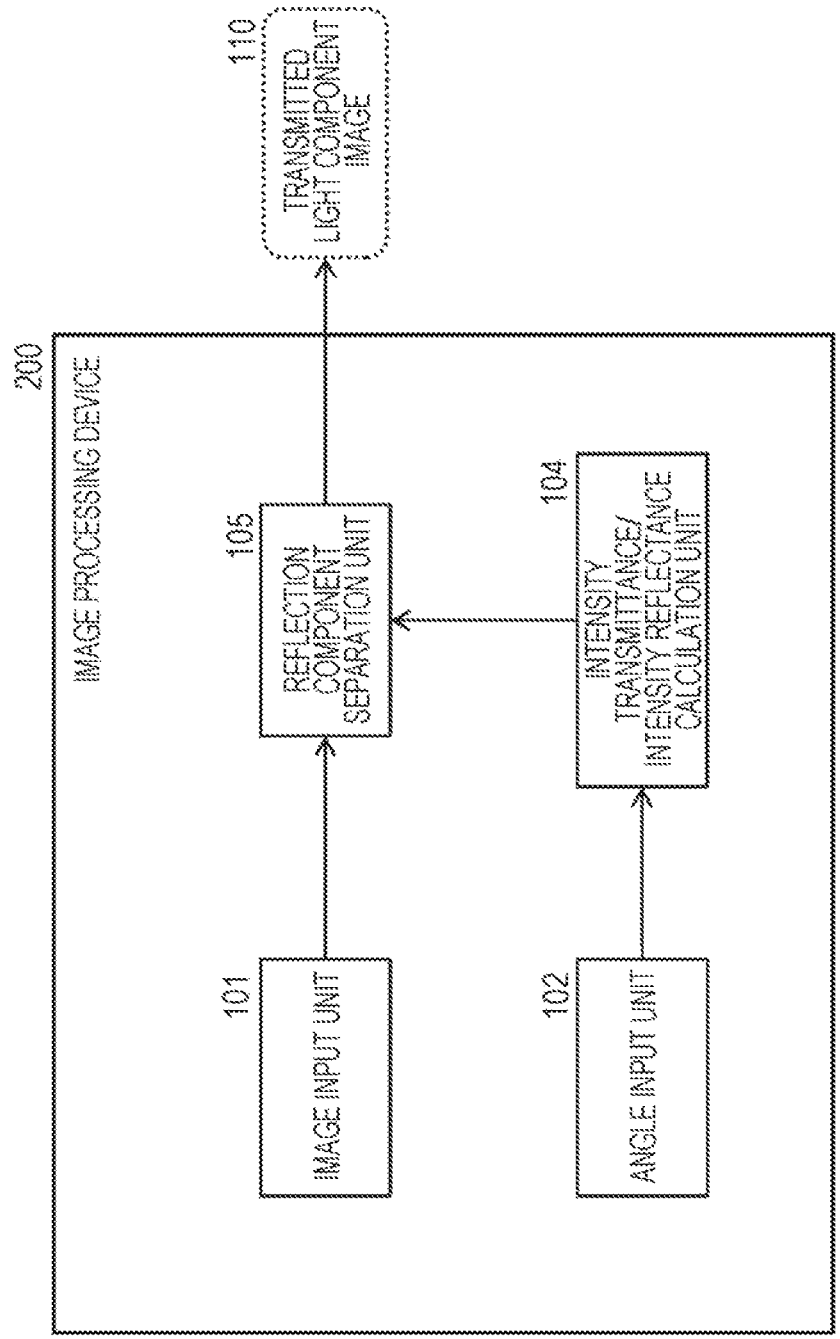
FIG. 13 is a diagram showing the configuration of an embodiment of an image processing device of the present disclosure.

FIG. 13 shows an example configuration of an image processing device 200 that excludes the refractive index input unit 103.

The image processing device 200 shown in FIG. 13 includes an image input unit 101, an angle input unit 102, an intensity transmittance/intensity reflectance calculation unit 104, and a reflection component separation unit 105.

This configuration does not include the refractive index input unit 103 included in the image processing device 100 described above with reference to FIG. 8.

Like the image processing device 100 shown in FIG. 8, the image processing device 200 shown in FIG. 13 also inputs images captured in the environment shown in FIG. 1, for example, or images formed with observation light including reflected light and transmitted light, and generates a transmitted light component image 110 formed only with the transmitted light component, with the reflected light component removed from the input images.

The intensity transmittance/intensity reflectance calculation unit 104 of the image processing device 200 shown in FIG. 13 calculates intensity transmittances and intensity reflectances on the basis of a preset fixed relative refractive index n.

The refractive index of air is about 1.0, the refractive index of water is about 1.33, and the refractive index of glass is about 1.4 to 2.0, for example. The refractive index slightly varies among substances in this manner, but most of the substances other than air have refractive indexes ranging from 1.3 to 1.6.

Taking these facts into consideration, the intensity transmittance/intensity reflectance calculation unit 104 of the image processing device 200 shown in FIG. 13 calculates intensity transmittances and intensity reflectances, using a preset fixed relative refractive index n, such as a fixed relative refractive index n=1.45, for example.

Note that, in this configuration, the relative refractive index data corresponding to the substance in the region that outputs transmitted light may be stored into a memory, and the relative refractive index data corresponding to the substance may be selected and used when images are captured.

For example in a case where the region that outputs transmitted light is water, the relative refractive index n is 1.33. In a case where the region that outputs transmitted light is glass, the relative refractive index n is 1.5, for example. In this manner, the relative index data corresponding to the substance may be used.

Further, the intensity transmittance/intensity reflectance calculation unit 104 may be a component included in the reflection component separation unit 105, as in the embodiment described above. In other words, the reflection component separation unit 105 inputs the reflection angles α and the relative refractive indexes n=$n_2/n_1$ from the angle input unit 102 and the refractive index input unit 103, and calculates the respective intensity transmittances Ts and Tp, and the respective intensity reflectances Rs and Rp of the S waves and the P waves. Further, the same reflection component separation unit 105 may separate the reflection components from the images acquired from the image input unit 101 on the basis of the calculation results, and generate and output the transmitted light component image 110 formed only with the transmitted light component.

(5-2. An Example of an Angle Input Unit Using a Gyroscope Sensor)

The angle input unit 102 set in the image processing device shown in FIG. 8 or 13 inputs reflection angles α to the intensity transmittance/intensity reflectance calculation unit 104.

As described above with reference to FIG. 8, the angle input unit 102 acquires the reflection angles (α) corresponding to the respective pixels of input images input by the image input unit 101, and inputs the reflection angles (α) to the intensity transmittance/intensity reflectance calculation unit 104.

As described above, various methods can be considered as methods of acquiring the reflection angles corresponding to the respective pixels of images. For example, data that is input by the user (operator) in accordance with the image capturing angle of the camera that captures the input images is stored into a memory, for example, so that the stored data can be used.

Alternatively, information about an angle sensor or the like included in the camera is set as attribute information about the input images, and is input and stored together with the images into a memory, so that the stored data can be used.

Alternatively, a prescribed angle such as 45 degrees may be stored beforehand into a memory, so that the angle information can be used.

The angle input unit 102 acquires the reflection angles (α) corresponding to the respective pixels of the input images input by the image input unit 101 by one of the above described methods, for example, and outputs the reflection angles (α) to the intensity transmittance/intensity reflectance calculation unit 104.

The angle input unit 102 may include a gyroscope capable of measuring the posture of the camera that captures images. In a case where the plane direction of the object is known, the plane direction of the object can be calculated on the basis of the camera posture measured by the gyroscope.

For example, in a case where only removal of reflection from a water surface is to be achieved, it is possible to assume that the plane direction (normal direction) of the water surface is always vertical.

Figure 14:
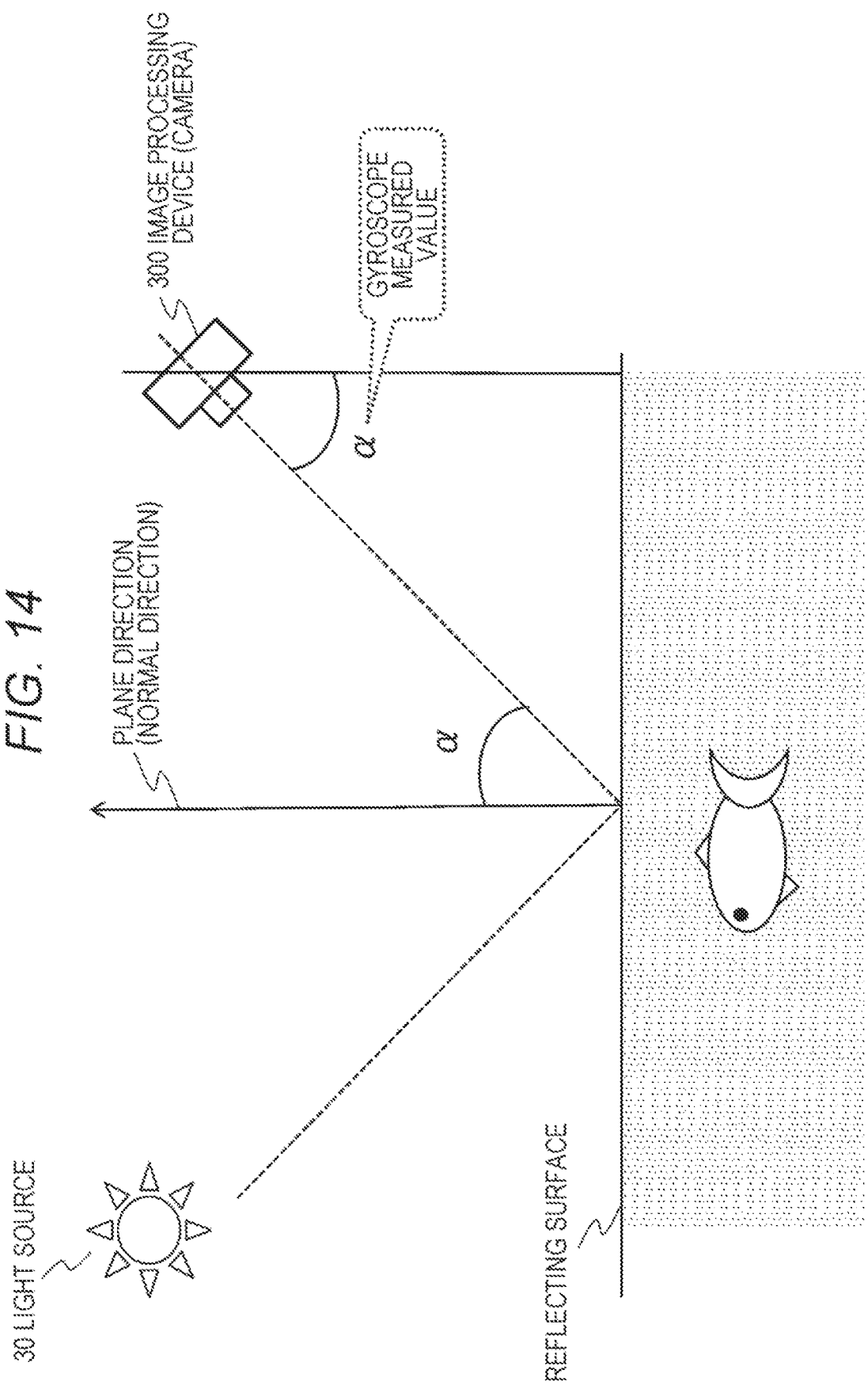
FIG. 14 is a diagram for explaining an example of a camera equipped with a gyroscope that performs reflection angle calculation.

For example, as shown in FIG. 14, the tilt of an image processing device (camera) 300 measured by a gyroscope mounted on the image processing device (camera) 300 that captures images has a value equal to the reflection angle α.

The tilt of the image processing device (camera) 300 measured by the gyroscope can be used as the reflection angle α to be output from the angle input unit 200 to the intensity transmittance/intensity reflectance calculation unit 104.

(5-3. An Example of an Angle Input Unit that Performs an Angle Input Process Depending on the Object)

Next, an example of the angle input unit 102 that performs an angle input process depending on the object is described.

As described above, the angle input unit 102 set in the image processing device shown in FIG. 8 or 13 outputs reflection angles α to the intensity transmittance/intensity reflectance calculation unit 104.

In the example process described below, in a case where the object to be captured in images is a predetermined specific object, the angle input unit 102 estimates the plane direction of the object for each pixel in an image on the basis of the model of the shape of a specific object held by the image processing device, calculates the reflection angle α corresponding to each pixel on the basis of the estimated plane direction, and outputs the calculated reflection angle α to the intensity transmittance/intensity reflectance calculation unit 104.

Figure 15:
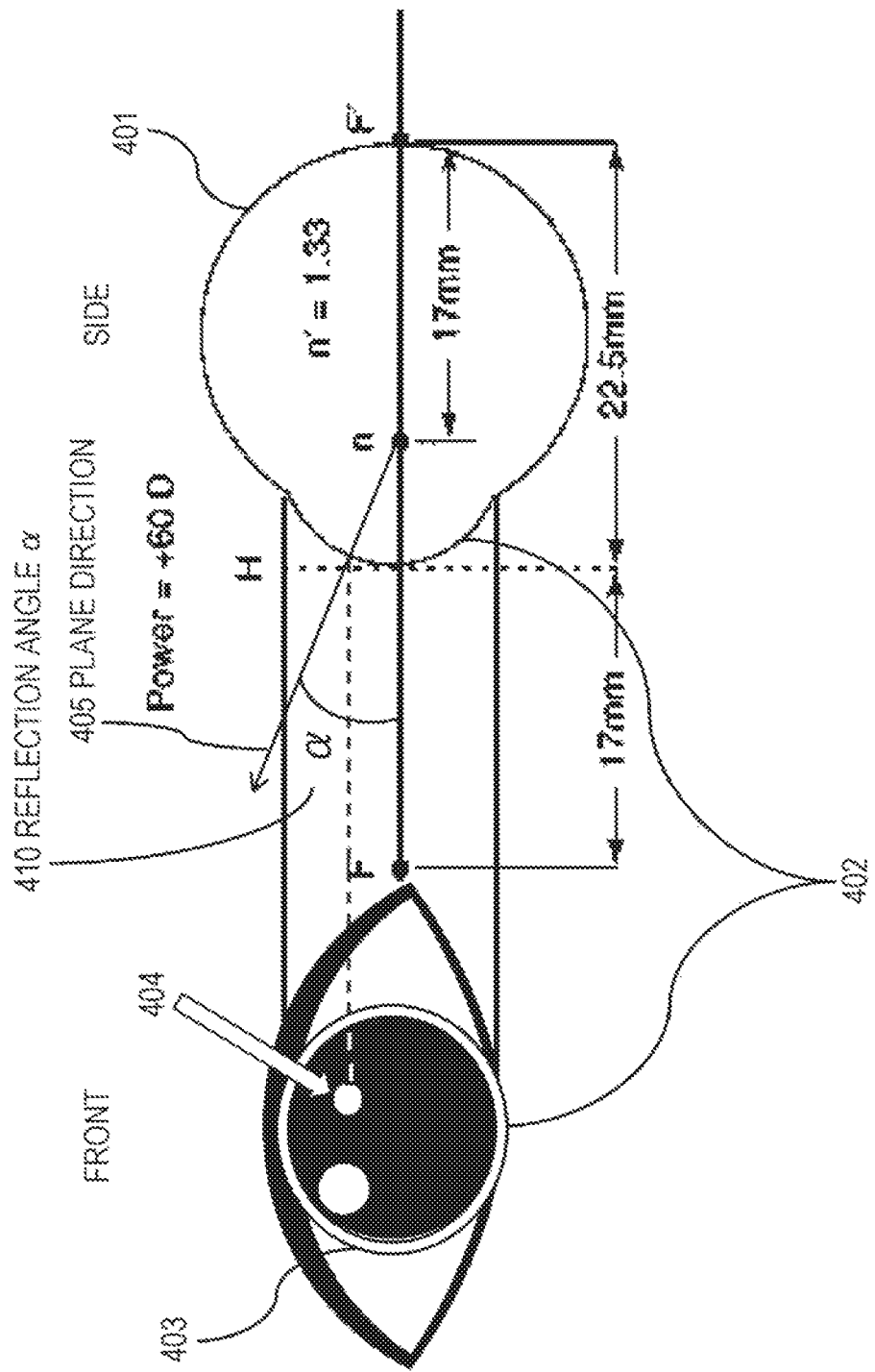
FIG. 15 is a diagram for explaining an example in which a camera that is an image processing device captures images of a human eye, and removes reflection on the iris.

Referring now to FIG. 15, this embodiment is described.

FIG. 15 is a diagram for explaining an example in which a camera that is an image processing device captures images of a human eye, and removes reflection on the iris.

In other words, the image processing device holds an eyeball model as the shape model of a specific object in a memory.

A Gullstrand model 401 shown in FIG. 15 can be used as the eyeball model. In this model, the eyeball is formed with two spheres, and the smaller sphere corresponds to the cornea 402. The cornea 402 is a small sphere having a center n. As the region corresponding to the iris 403 (the region surrounded by a circle 403 in the drawing) is recognized from the eyeball image, the model can be applied. Accordingly, as shown in FIG. 15, the plane direction at the position of a partial iris region 404 in the iris 403 in FIG. 15 can be determined to be a plane direction (normal direction) 405 shown as a straight line extending from the center n of the iris, for example.

The angle between this plane direction (normal direction) and the image capturing direction of the camera is equivalent to the reflection angle α.

The image capturing direction of the camera is the front direction of the eye, and the reflection angle α shown in the drawing is the reflection angle at the pixel position of the partial iris region 404.

The angle input unit 102 calculates this angle α, and outputs this angle as the reflection angle α corresponding to the pixel position of the partial iris region 404, to the intensity transmittance/intensity reflectance calculation unit 104.

In a case where the shape of the object included in a captured image can be specified in this manner, the plane direction at each pixel position in the object image can be estimated, and the reflection angles corresponding to the respective pixels can be calculated.

In this manner, the angle input unit 102 can output the results of calculation of the reflection angles corresponding to the respective pixels, to the intensity transmittance/intensity reflectance calculation unit 104.

(5-4. An Example of an Angle Input Unit that Includes a Depth Sensor)

Next, an example of the angle input unit 102 including a depth sensor is described.

As described above, the angle input unit 102 set in the image processing device shown in FIG. 8 or 13 outputs reflection angles α to the intensity transmittance/intensity reflectance calculation unit 104.

In the configuration of the embodiment described below, the angle input unit 102 includes a depth sensor.

As the depth sensor, a stereo camera, a time-of-flight (TOF) camera, a depth sensor of a structured light type, or the like can be used, for example.

The angle input unit 102 including a depth sensor generates a depth map containing object distance information obtained by the depth sensor, and differentiates the distance data recorded in the depth map, to calculate the plane directions at the respective points on the object.

Further, the reflection angles at the respective points on the object are calculated from the calculated plane directions.

Referring now to FIGS. 16A, 16B, and 16C, this embodiment is described.

FIG. 16A shows an example of an image captured by an image processing device (a camera). Here, pixels 1 and 2 in a captured image 501 are described as an example.

The angle input unit 102 of the image processing device includes a depth sensor that measures the distance of the object from the camera at each pixel of the captured image.

FIG. 16B shows an example of distance information measured with respect to the pixels 1 and 2.

As for the distance of the pixel 2 and the distance of the pixel 1, the pixel 2 is located farther than the pixel 1 as shown in FIG. 16B, and is disposed as shown in the drawing, as can be seen from a depth map generated from measurement information from the depth sensor.

On the basis of the distance information about the respective pixels as shown in FIG. 16B, the angle input unit 102 of the image processing device can estimate the plane formed by the pixel 1 and the pixel 2 as shown in FIG. 16C.

The angle input unit 102 of the image processing device estimates a direction perpendicular to this plane as the plane direction (normal direction).

The angle between the normal direction and the image capturing direction of the camera is equivalent to the reflection angle α.

This angle is the reflection angle α 510 shown in FIG. 16C.

The angle input unit 102 calculates this angle α, and outputs this angle as the reflection angle α corresponding to the pixels 1 and 2, to the intensity transmittance/intensity reflectance calculation unit 104.

(5-5. An Embodiment Including a Reflection Removal Result Presentation Unit)

Next, an embodiment in which an image processing device includes a reflection removal result presentation unit is described.

Figure 17:
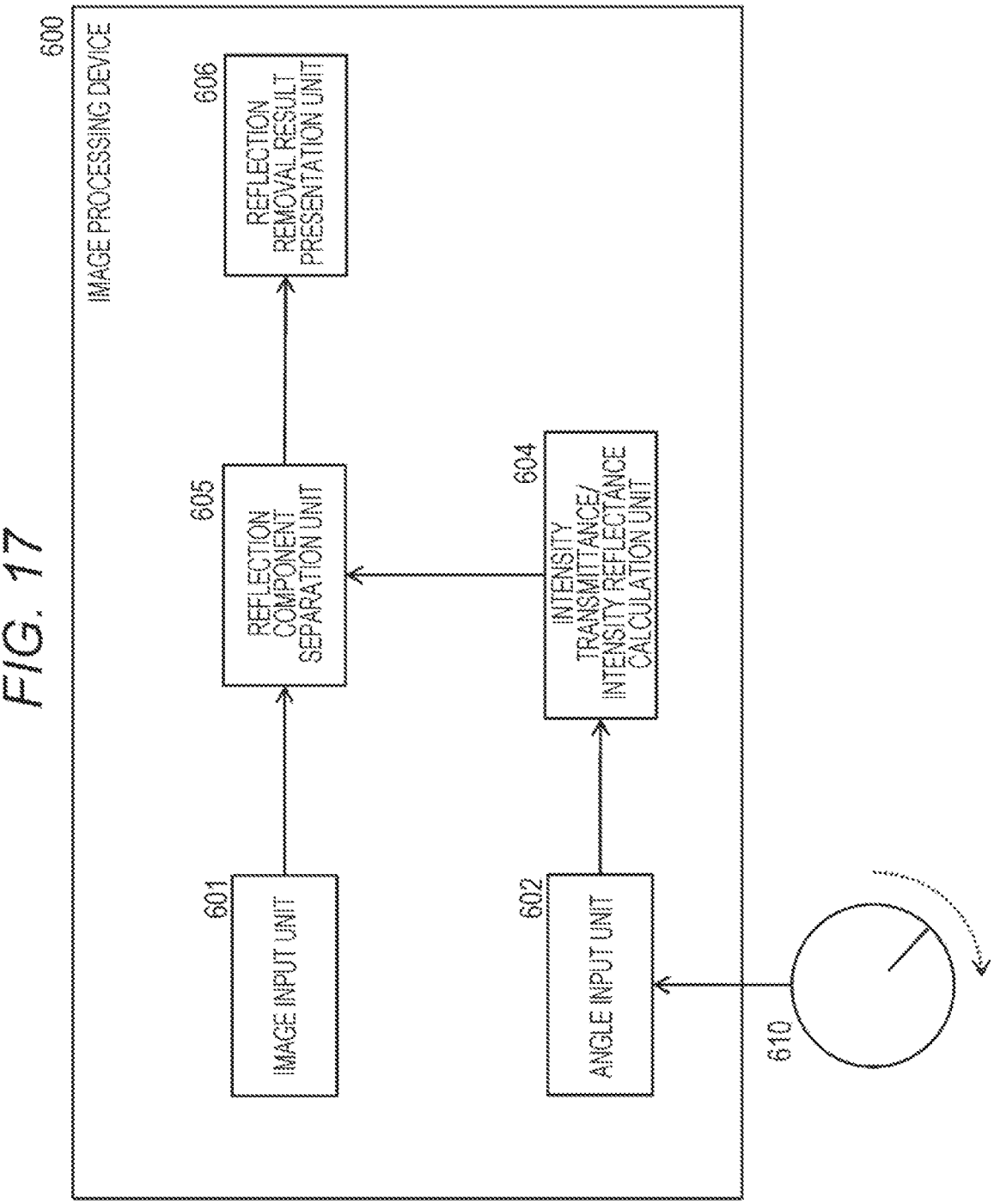
FIG. 17 is a diagram showing the configuration of an embodiment of an image processing device of the present disclosure.

FIG. 17 is a diagram showing an example configuration of an image processing device 600 that includes a reflection removal result presentation unit.

The image processing device 600 shown in FIG. 17 includes an image input unit 601, an angle input unit 602, an intensity transmittance/intensity reflectance calculation unit 604, and a reflection component separation unit 605, which are similar to those described above with reference to FIG. 8 or 13. The image processing device 600 further includes a reflection removal result presentation unit 606.

The reflection removal result presentation unit 606 presents an image generated by the reflection component separation unit 605, or a transmission component image generated by removing reflection components from input images.

For example, an operator who operates the image processing device 600 inputs any appropriate angle to the angle input unit 602, checks the image presented on the reflection removal result presentation unit 606, and searches for the angle at which reflection has been removed in the most preferred manner.

Note that it is possible to adopt a configuration as an angle input method using a user interface that adjusts angle by turning an angle operation unit 610 such as a knob shown in the drawing, for example.

(5-6. An Embodiment for Estimating a Reflection Angle on the Basis of the Luminances of Pixels of a Generated Image)

Next, an embodiment for estimating a reflection angle on the basis of the luminances of pixels of a generated image is described.

Figure 18:
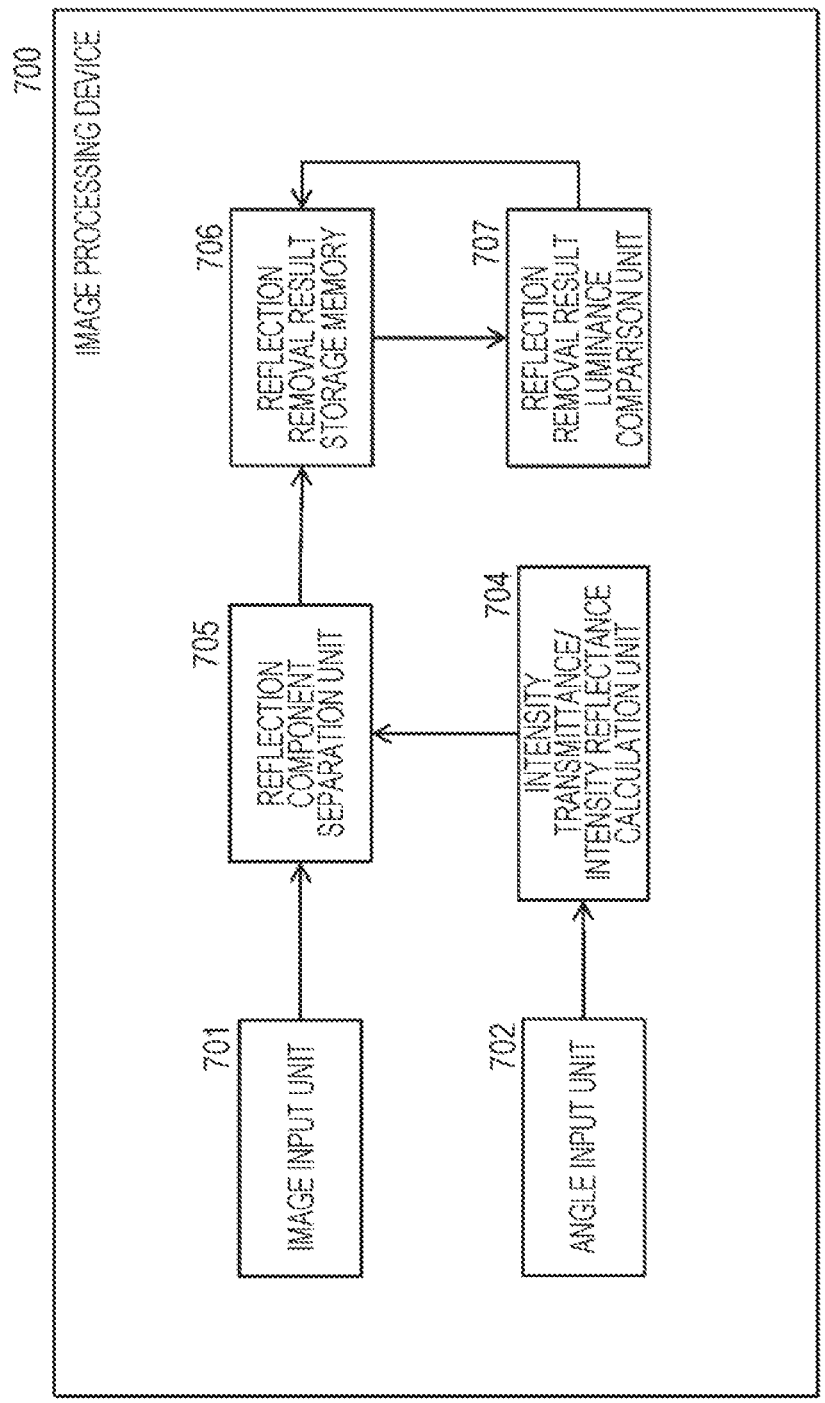
FIG. 18 is a diagram showing the configuration of an embodiment of an image processing device of the present disclosure.

FIG. 18 is a diagram showing an example configuration of an image processing device of this embodiment.

An image processing device 700 shown in FIG. 18 includes an image input unit 701, an angle input unit 702, an intensity transmittance/intensity reflectance calculation unit 704, and a reflection component separation unit 705, which are similar to those described above with reference to FIG. 8 or 13. The image processing device 700 further includes a reflection removal result storage memory 706 and a reflection removal result comparison unit 707.

The reflection component separation unit 705 of the image processing device 700 shown in FIG. 18 performs a reflection component removal process in which the reflection angles of the respective pixels of input images are set at various angles, and generates a reflection removal result image A.

The generated reflection removal result image A is stored into the reflection removal result storage memory 706.

The angle input unit 702 then updates the reflection angle to be input to the intensity transmittance/intensity reflectance calculation unit 704. For example, the angle input unit 702 performs a reflection angle update process to replace α with α+Δα, and inputs the updated reflection angle α to the intensity transmittance/intensity reflectance calculation unit 704.

The intensity transmittance/intensity reflectance calculation unit 704 calculates intensity transmittances and intensity reflectances on the basis of the updated new reflection angle α, and outputs the calculated values to the reflection component separation unit 705.

The reflection component separation unit 705 generates a new reflection removal result image B by using the intensity transmittances and the intensity reflectances based on the new reflection angle α input from the intensity transmittance/intensity reflectance calculation unit 704, and stores the reflection removal result image B into the reflection removal result storage memory 706.

The reflection removal result comparison unit 707 extracts the reflection removal result image A and the reflection removal result image B from the reflection removal result storage memory 706, and compares the luminances of the corresponding pixels of these two images with different reflection angle settings. The reflection removal result comparison unit 707 selects the image having the pixel value with the lower luminance as the image with the greater reflection removal effect, and stores the selected image as the reflection removal result image A into the reflection removal result storage memory 706 in an overwriting manner.

This process is repeatedly performed, to generate an image formed with pixels having the lowest luminance.

As this process is performed, the transmission component image formed with pixels from which the maximum amount of the reflection component has been removed is eventually stored into the reflection removal result storage memory 706.

Luminances calculated by combining the transmission component and the reflection component are set in the pixels of input images.

Therefore, the pixel value of an image generated with the setting of the reflection angle at which the pixel value with the lowest luminance is obtained has the maximum amount of the reflection component removed therefrom, and is assumed to be the pixel value formed with only a transmission component.

In this embodiment, a transmission component image is generated through this estimation process.

Figure 19:
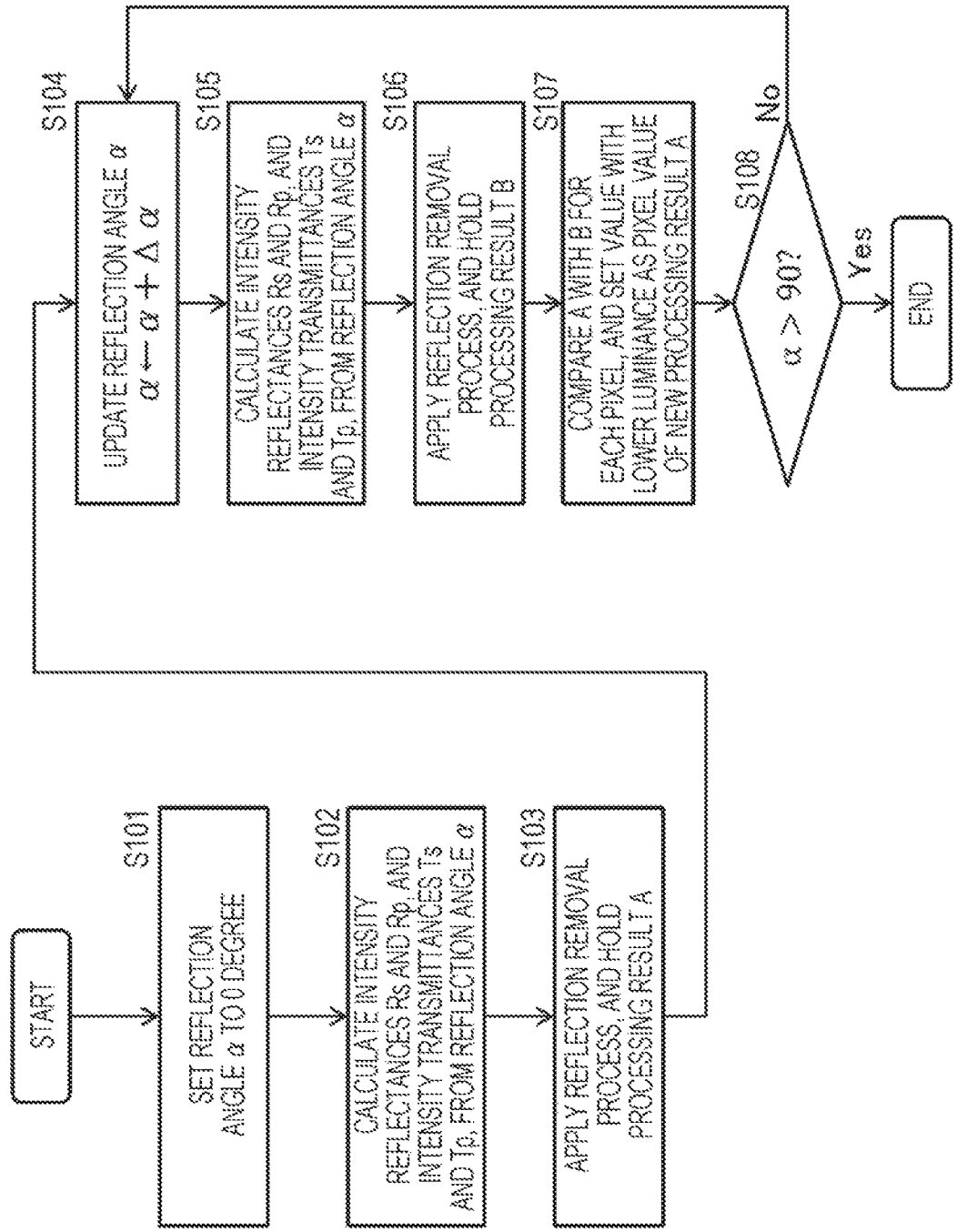
FIG. 19 shows a flowchart for explaining a process sequence to be carried out by an image processing device of the present disclosure.

Referring now to the flowchart shown in FIG. 19, a sequence of processes to be performed by the image processing device 700 shown in FIG. 18 is described.

(Step S101)

First, in step S101, the angle input unit 702 sets the reflection angle α of the initial value to 0 degree, and inputs the reflection angle α to the intensity transmittance/intensity reflectance calculation unit 704.

(Step S102)

Next, in step S102, the intensity transmittance/intensity reflectance calculation unit 704 calculates the values shown below, on the basis of the reflection angle α input from the angle input unit 702:

the intensity reflectances Rs and Rp indicating the reflectances corresponding to the light intensity of the reflected light; and the intensity transmittances Ts and Tp indicating the transmittances corresponding to the light intensity of the transmitted light.

The intensity transmittance/intensity reflectance calculation unit 704 calculates these values according to (Expression 4) and (Expression 7) described earlier.

The intensity transmittance/intensity reflectance calculation unit 704 outputs the calculated values to the reflection component separation unit 705.

(Step S103)

Next, in step S103, the reflection component separation unit 705 uses the input values (Rs, Rp, Ts, and Tp) from the intensity transmittance/intensity reflectance calculation unit 704 to calculate pixel values from which reflection components have been removed for the respective pixels constituting the image, and stores the pixel values as a processing result A into the reflection removal result storage memory 706.

Note that this pixel value calculation process is performed through a process according to (Expression 13) described earlier, using three kinds of different polarization images input from the image input unit 701.

(Step S104)

In step S104, the angle input unit 702 then increments the reflection angle α by a prescribed update angle Δα, to calculate a new reflection angle α=α+Δα.

Note that Δα is set to one degree or the like, for example.

The angle input unit 702 inputs this updated angle α to the intensity transmittance/intensity reflectance calculation unit 704.

(Step S105)

Next, in step S105, the intensity transmittance/intensity reflectance calculation unit 704 calculates the values shown below, on the basis of the updated reflection angle α input from the angle input unit 702:

the intensity reflectances Rs and Rp indicating the reflectances corresponding to the light intensity of the reflected light; and the intensity transmittances Ts and Tp indicating the transmittances corresponding to the light intensity of the transmitted light.

The intensity transmittance/intensity reflectance calculation unit 704 calculates these values according to (Expression 4) and (Expression 7) described earlier.

The intensity transmittance/intensity reflectance calculation unit 704 outputs the calculated values to the reflection component separation unit 705.

(Step S106)

Next, in step S106, the reflection component separation unit 705 uses the input values (Rs, Rp, Ts, and Tp) from the intensity transmittance/intensity reflectance calculation unit 704 to calculate pixel values from which reflection components have been removed for the respective pixels constituting the image, and stores the pixel values as a processing result B into the reflection removal result storage memory 706.

Note that this pixel value calculation process is performed through a process according to (Expression 13) described earlier, using three kinds of different polarization images input from the image input unit 701.

(Step S107)

Next, in step S107, the reflection removal result luminance comparison unit 707 compares the pixel values (luminances) of the corresponding pixels of the processing result A and the processing result B that have been generated under the different reflection angle settings and are stored in the reflection removal result storage memory 706. The reflection removal result luminance comparison unit 707 determines that the pixel values with the smaller pixel values (luminances) are the pixel values with the higher reflection component removal rate, and overwrites the processing result A already stored in the reflection removal result storage memory 706 with these pixels values as the processing result A.

(Step S108)

Next, in step S108, the angle input unit 702 determines whether or not the reflection angle α is smaller than 90 degrees. If the reflection angle α is smaller than 90 degrees, the process returns to step S104, the process of updating the reflection angle α is performed, and the processes in steps S104 through S107 are then repeated.

If the reflection angle α is determined not to be smaller than 90 degrees in step S108, the process comes to an end.

At the end of the process, the processing result A stored in the reflection removal result storage memory 706 is the image having the smallest pixel value (luminance) among the reflection component removed images generated with the settings of the reflection angle α=0 to 90 degrees. This image is the transmission component image formed by removing the reflection components from the input images (observation images).

Note that the flow shown in FIG. 19 is executed for all the pixels of the input images.

As this process is performed, it is possible to generate a transmission component image formed by removing the reflection components from the input images (observation images).

Note that, in this embodiment, the intensity transmittance/intensity reflectance calculation unit 704 may be a component included in the reflection component separation unit 705, as in the embodiment described above. In other words, the reflection component separation unit 705 sequentially inputs the updated reflection angle α from the angle input unit 702, and calculates the respective intensity transmittances Ts and Tp, and the respective intensity reflectances Rs and Rp of the S waves and the P waves. Further, the same reflection component separation unit 705 may separate the reflection components from the images acquired from the image input unit 701 on the basis of the calculation results, sequentially generate the transmitted light component image corresponding to the updated reflection angle α, and store the transmitted light component image into the reflection removal result storage memory 706.

(5-7. An Embodiment for Calculating Zenith Angles by Using Camera Posture Information Acquired from a Camera Mounted Sensor, and Using the Zenith Angles as Incidence Angles (=Reflection Angles))

The following is a description of an embodiment for calculating zenith angles by using camera posture information acquired from a camera mounted sensor, and using the zenith angles as incidence angles (=reflection angles).

Figure 20:
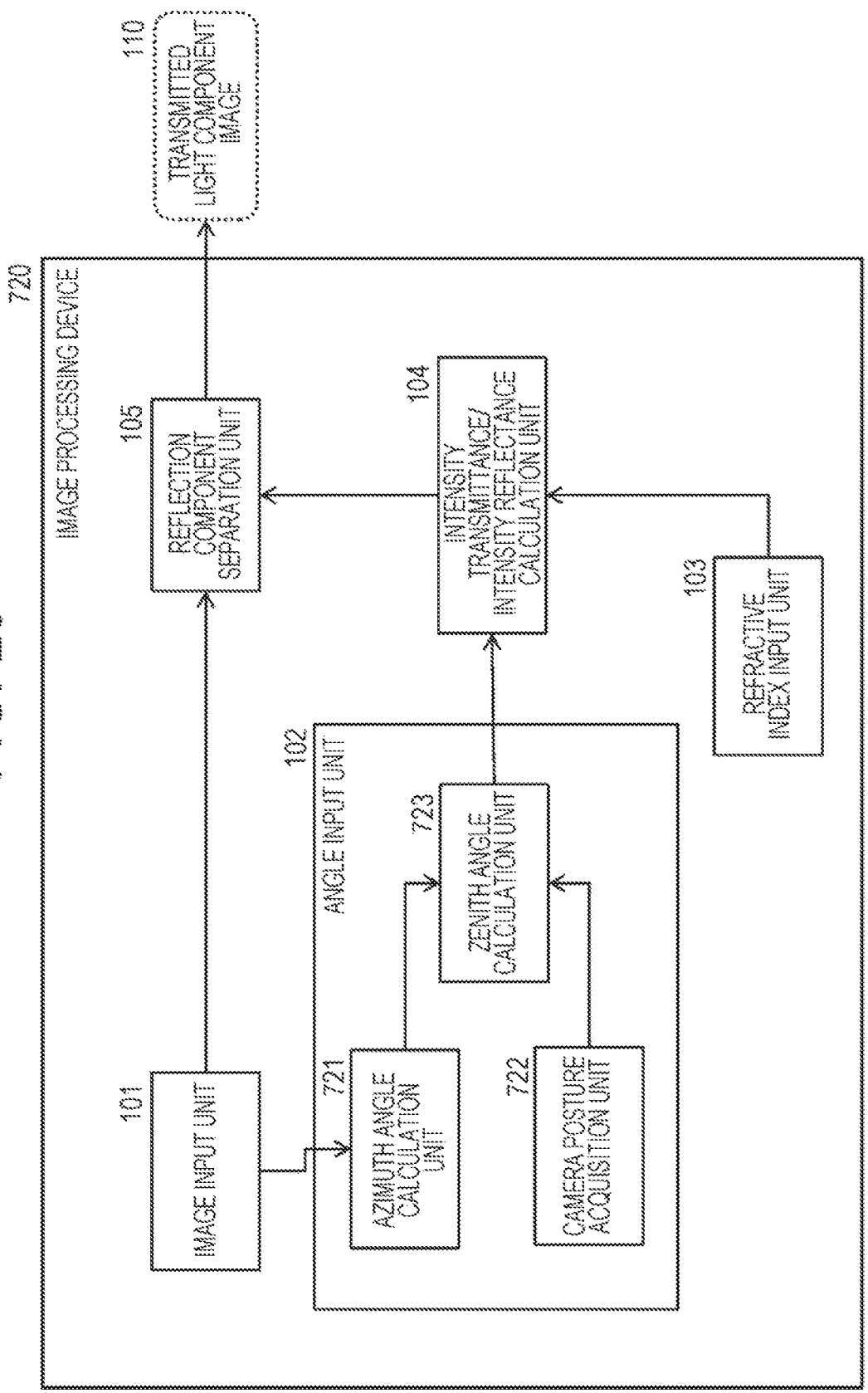
FIG. 20 is a diagram showing the configuration of an embodiment of an image processing device of the present disclosure.

FIG. 20 is a diagram showing an example configuration of an image processing device 720 of this embodiment.

The image processing device 720 shown in FIG. 20 has a configuration similar to that of the image processing device 100 described with reference to FIG. 8, except for the configuration of the angle input unit 102.

As shown in FIG. 20, the angle input unit 102 includes an azimuth angle calculation unit 721, a camera posture acquisition unit 722, and a zenith angle calculation unit 723.

The angle input unit 102 of the image processing device 720 shown in FIG. 20 calculates zenith angles, and inputs the calculated zenith angles to the intensity transmittance/intensity reflectance calculation unit 104.

The intensity transmittance/intensity reflectance calculation unit 104 performs a process using the zenith angles input from the angle input unit 102 as the incidence angles (=the reflection angles) a described in the above embodiments.

In other words, the intensity transmittance/intensity reflectance calculation unit 104 calculates the respective intensity transmittances Ts and Tp, and the respective intensity reflectances Rs and Rp of the S waves and the P waves, on the basis of the zenith angles θv (=the incidence angles=the reflection angles α) of the object and the relative refractive indexes $n=n_2/n_1$ in the respective captured images (scenes), which have been input from the angle input unit 102 and the refractive index input unit 103.

As described above, the angle input unit 102 of this embodiment includes the azimuth angle calculation unit 721, the camera posture acquisition unit 722, and the zenith angle calculation unit 723. The zenith angle calculation unit 723 calculates zenith angles, using azimuth angles calculated by the azimuth angle calculation unit 721 and camera posture information input from the camera posture acquisition unit 722.

In this manner, a process using zenith angles, azimuth angles, and camera postures is performed in this embodiment.

First, these pieces of information are described with reference to FIG. 21.

Figure 21:
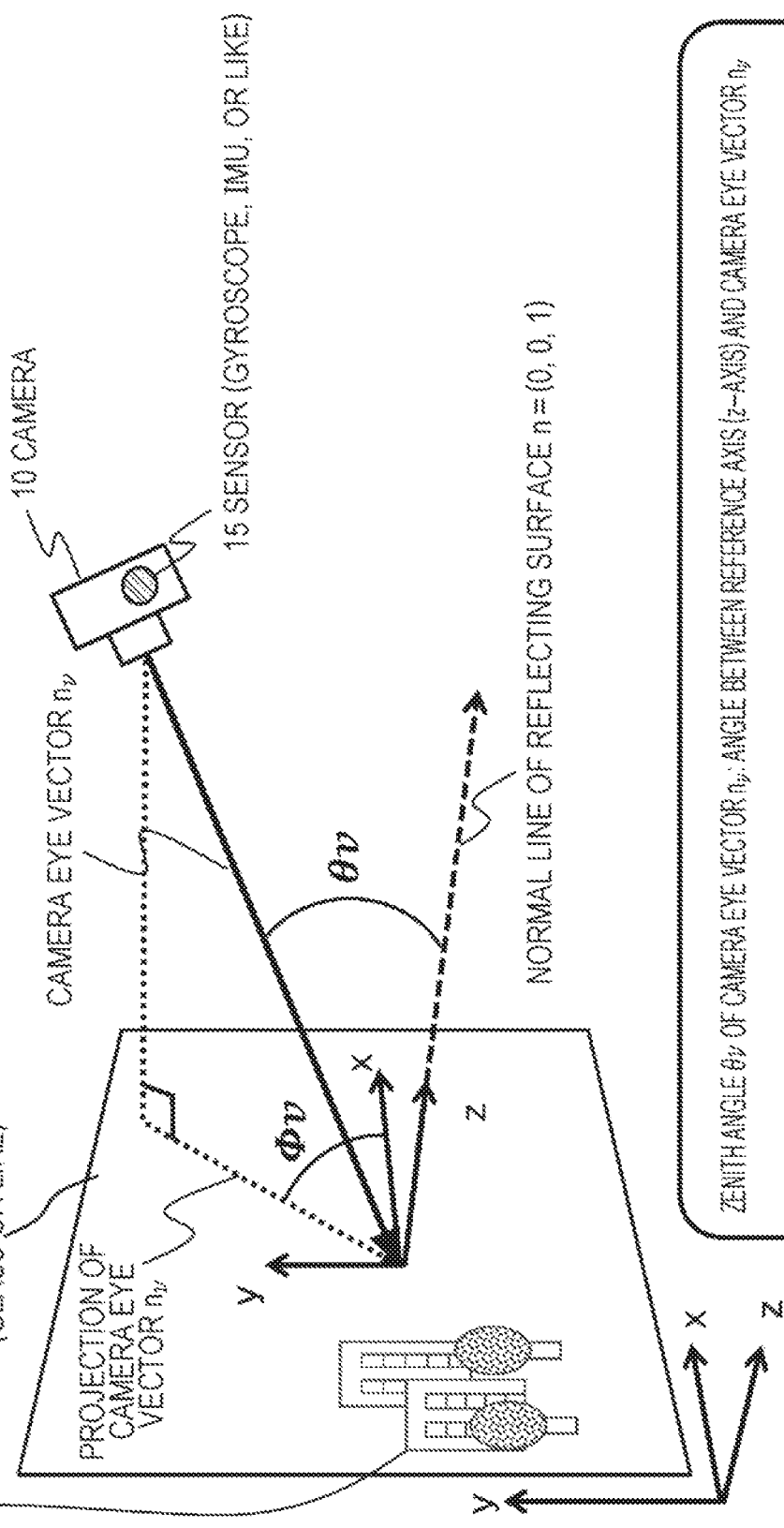
FIG. 21 is a diagram for explaining azimuth angle and zenith angle.

In FIG. 21, a reflecting surface 70 is a surface of transparent or translucent glass or the like.

A camera 10 captures images of an object (the image capturing target) 20 via the reflecting surface 70.

The vector indicating the image capturing direction of the camera 10 is referred to as the camera eye vector nv.

The camera 10 is equipped with a sensor 15 that detects the posture of the camera. The sensor 15 is formed with a gyroscope, an IMU, an acceleration sensor, a tilt sensor, or the like, for example, and is used for obtaining the camera eye vector nv.

Note that an inertial measurement unit (IMU) is a sensor that detects angles in three axial directions, or angular velocity and acceleration.

In FIG. 21, the plane of the reflecting surface 70 is the x-y plane, and the direction perpendicular to the reflecting surface 70 is the z-axis. In other words, the z-axis direction, which is the direction perpendicular to the reflecting surface 70, is the normal line of the reflecting surface.

The direction of the normal vector n is defined as n=(x, y, z)=(0, 0, 1).

As shown in FIG. 21, the camera eye vector nv is the vector indicating the image capturing direction by the camera, and is a vector starting from the position of the camera 10 and ending at a point on the reflecting surface 70 on the line of sight of the camera 10.

The zenith angle θv and the azimuth angle Φv of the camera eye vector nv are defined as described below in (a) and (b).

(a) The zenith angle θv of the camera eye vector nv is the angle formed by a zenith-corresponding reference axis (z-axis) and the camera eye vector nv.

(b) The azimuth angle Φv of the camera eye vector nv is the angle formed by a projection of the camera eye vector nv onto the reflecting surface (x-y plane) and an azimuth-corresponding reference axis (x-axis).

The zenith angle θv and the azimuth angle Φv of the camera eye vector nv are defined as described above in (a) and (b).

As can be understood from comparison between FIG. 21 and FIG. 1 described earlier, the zenith angle θv of the camera eye vector nv shown in FIG. 21 and the reflection angle α (=the incidence angle α) shown in FIG. 1 described earlier are angles with the same definition.

Therefore, as described above with reference to FIG. 20, the zenith angle θv calculated by the zenith angle calculation unit 723 of the angle input unit 102 shown in FIG. 20 is input to the intensity transmittance/intensity reflectance calculation unit 104, so that the intensity transmittance/intensity reflectance calculation unit 104 can perform a process using the zenith angle θv input from the angle input unit 102 as the incidence angle (=the reflection angle) a described in the above embodiment.

The zenith angle calculation unit 723 of the angle input unit 102 shown in FIG. 20 calculates the zenith angle θv of the camera eye vector nv, using the azimuth angle calculated by the azimuth angle calculation unit 721 and the camera posture information input from the camera posture acquisition unit 722.

In the description below, a specific example of the process of calculating the zenith angle θv of the camera eye vector nv is explained.

Figure 22:
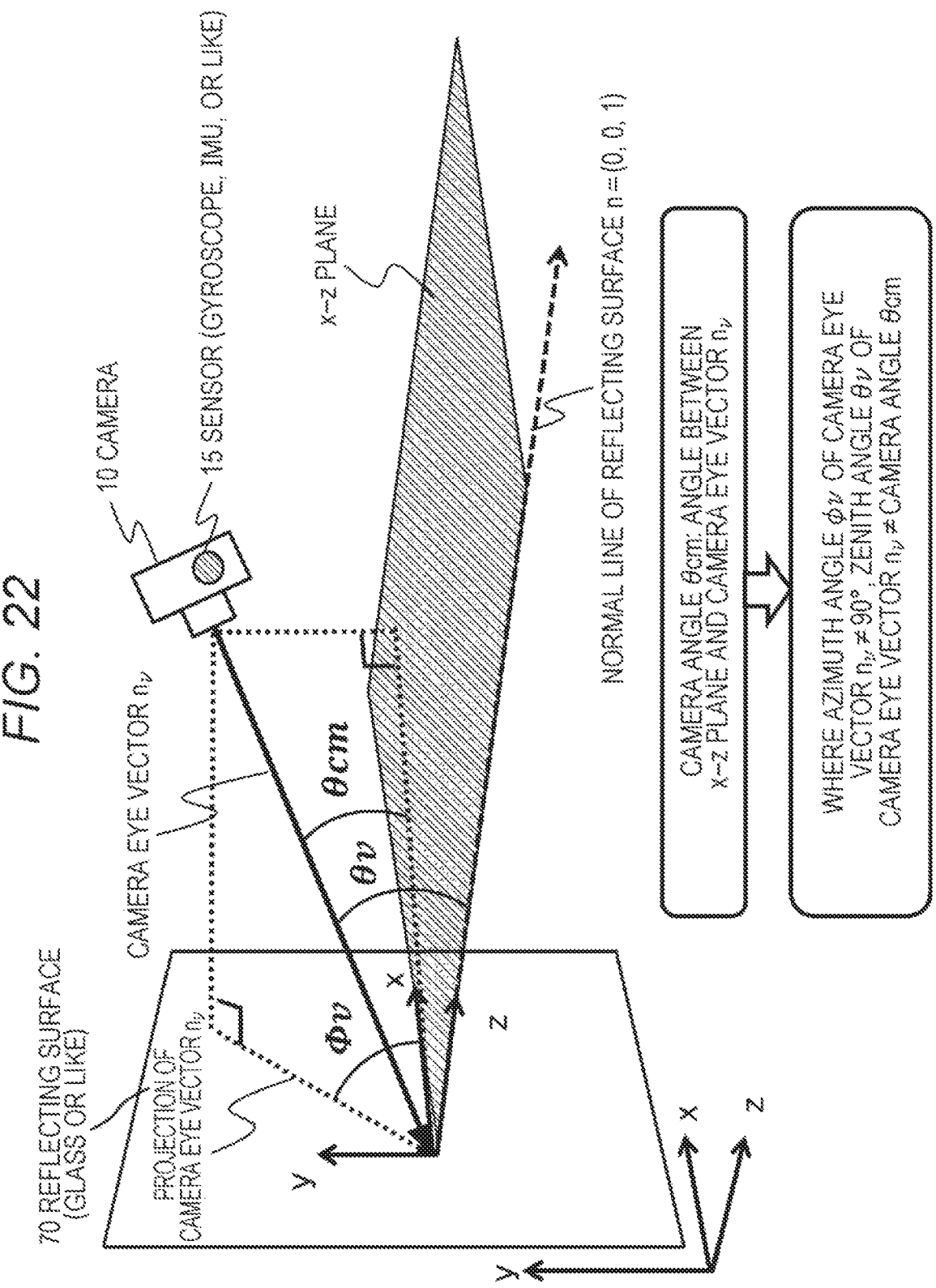
FIG. 22 is a diagram for explaining azimuth angles and zenith angles.
Figure 23:
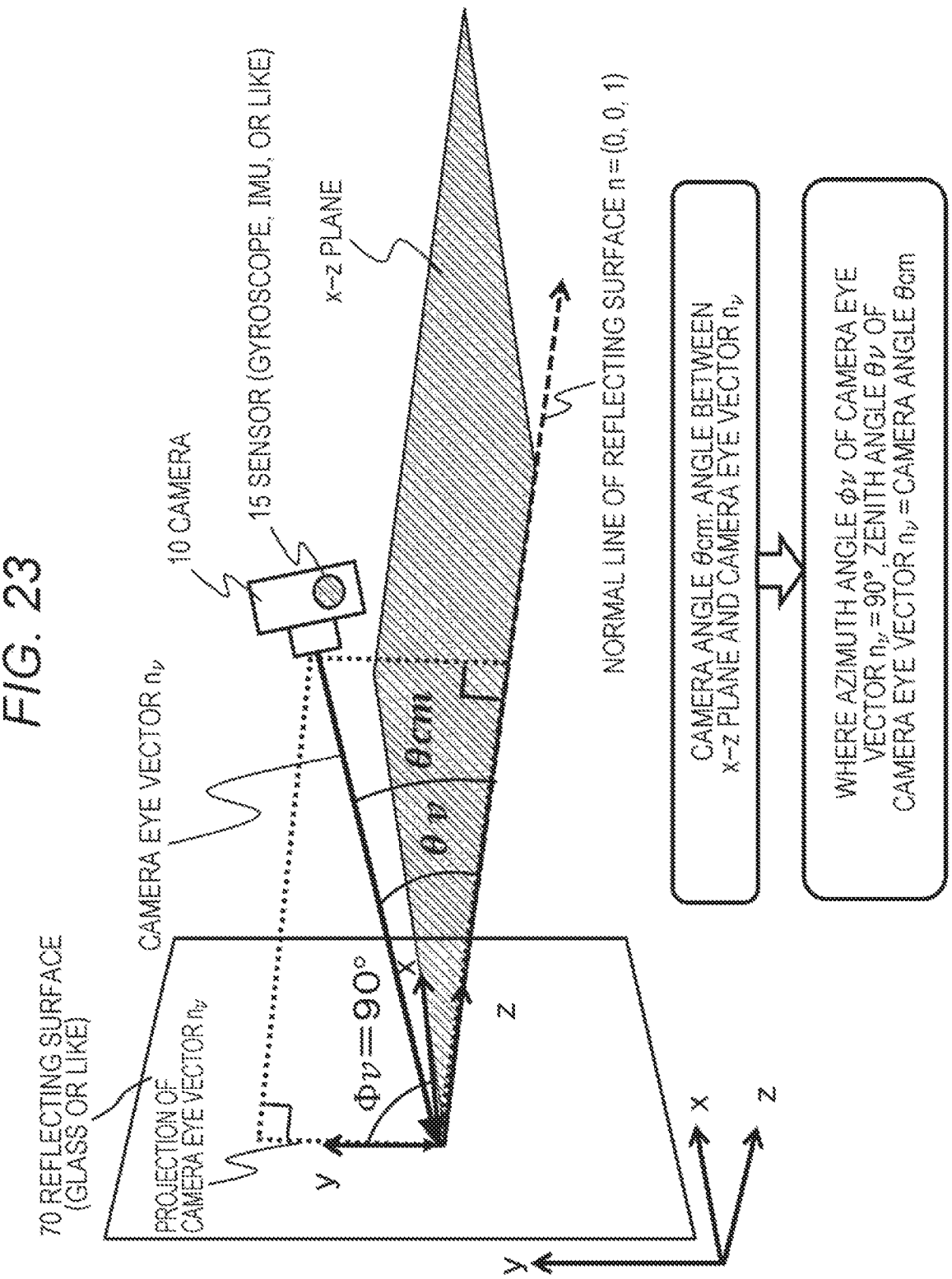
FIG. 23 is a diagram for explaining azimuth angles and zenith angles.

First, referring to FIGS. 22 and 23, the relationship between the zenith angle θv of the camera eye vector nv and a camera angle θcm acquired by the sensor 15 attached to the camera 10 is described.

The camera angle θcm acquired by the sensor 15 is the tilt angle of the camera, and is acquired by a gyroscope, an IMU or the like forming the sensor 15.

The camera posture acquisition unit 722, which is a component of the angle input unit 102 shown in FIG. 20, acquires the camera angle θcm by using information input from the sensor 15, and outputs the acquired camera angle θcm to the zenith angle calculation unit 723.

As shown in FIG. 22, the camera angle θcm is the angle formed by the camera eye vector nv and the x-z plane formed by the x-axis of the plane (x-y plane) of the reflecting surface 70 and the z-axis of the normal direction of the reflecting surface 70. Note that the x-z plane is equivalent to a horizontal plane.

The example shown in FIG. 22 is an example of general camera settings in which the azimuth angle Φv of the camera eye vector nv is not 90 degrees (=the y-axis direction).

In this case, the camera angle θcm and the zenith angle θv of the camera eye vector nv do not coincide with each other.

Next, referring to FIG. 23, an example of camera settings in which the camera angle θcm and the zenith angle θv of the camera eye vector nv coincide with each other is described.

The example shown in FIG. 23 is an example of camera settings in which the azimuth angle Φv of the camera eye vector nv is 90 degrees (=the y-axis direction).

In this case, the camera angle θcm and the zenith angle θv of the camera eye vector nv coincide with each other.

In the case of these settings, the camera angle θcm acquired by the camera posture acquisition unit 722, which is a component of the angle input unit 102 shown in FIG. 20, can be used as the zenith angle θv of the camera eye vector nv without any change.

In most cases, however, the azimuth angle Φv of the camera eye vector nv does not coincide with 90 degrees (=the y-axis direction), as shown in FIG. 22.

In the description below, the processes to be performed in such a case by the angle input unit 102 shown in FIG. 20 are explained.

The zenith angle calculation unit 723 of the angle input unit 102 shown in FIG. 20 calculates the zenith angle θv of the camera eye vector nv, using the azimuth angle Φv calculated by the azimuth angle calculation unit 721 and the camera posture information input from the camera posture acquisition unit 722.

Figure 24:
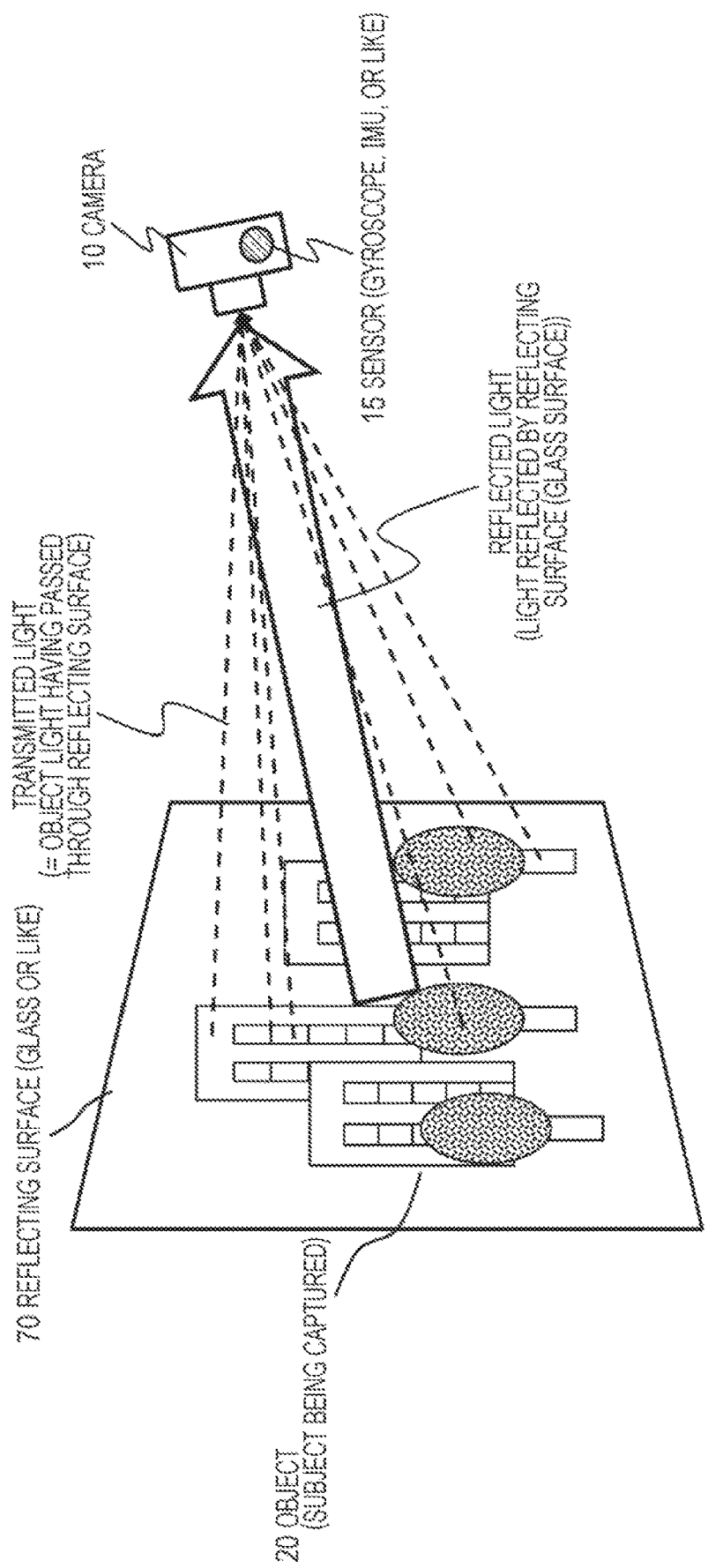
FIG. 24 is a diagram for explaining an example of an azimuth angle calculation process.

First, referring to FIG. 24 and others, the process to be performed by the azimuth angle calculation unit 721 to calculate the azimuth angle Φv of the camera eye vector nv is described.

FIG. 24 is a diagram showing an example in which the camera 10 captures images of the object 20 via the reflecting surface 70 such as glass.

The camera 10 receives a mixture of transmitted light, which is light from the object 20 via the reflecting surface 70, and reflected light, which is light emitted from the side of the camera 10 and reflected by the reflecting surface 70.

The azimuth angle calculation unit 721 of the angle input unit 102 shown in FIG. 20 inputs polarization images from the image input unit 101.

As described earlier, the image input unit 101 inputs three or more kinds of different polarization images captured by the camera described above with reference to FIG. 9, FIG. 10, or FIGS. 11 and 12, for example. The azimuth angle calculation unit 721 of the angle input unit 102 shown in FIG. 20 inputs these polarization images from the image input unit 101.

The azimuth angle calculation unit 721 calculates the azimuth angle Φv by analyzing the polarization images input from the image input unit 101.

As shown in FIG. 24, the camera 10 receives a mixture of transmitted light, which is light from the object 20 via the reflecting surface 70, and reflected light, which is light emitted from the side of the camera 10 and reflected by the reflecting surface 70.

Transmitted light, which is light from the object 20 via the reflecting surface 70, contains light from object in various orientations. In other words, the transmitted light is polarized light in which different light polarization states are mixed.

However, the reflected light, which is the light reflected on the reflecting surface 70, is the light reflected by the reflecting surface 70 formed with one specific plane, and is polarized light containing a large amount of the specific polarization component depending on the direction of the reflecting surface 70.

Accordingly, as the distribution state of the polarizing directions of the polarization images captured by the camera 10 is analyzed, it becomes possible to estimate the direction of the reflecting surface 70 relative to the camera eye vector nv, and thus, the azimuth angle Φv of the camera eye vector nv can be estimated.

As described above, the azimuth angle Φv of the camera eye vector nv is the angle formed by a projection of the camera eye vector nv onto the reflecting surface (x-y plane) and the azimuth-corresponding reference axis (x-axis), and can be uniquely determined from the direction of the reflecting surface 70 relative to the camera eye vector nv.

Figure 25:
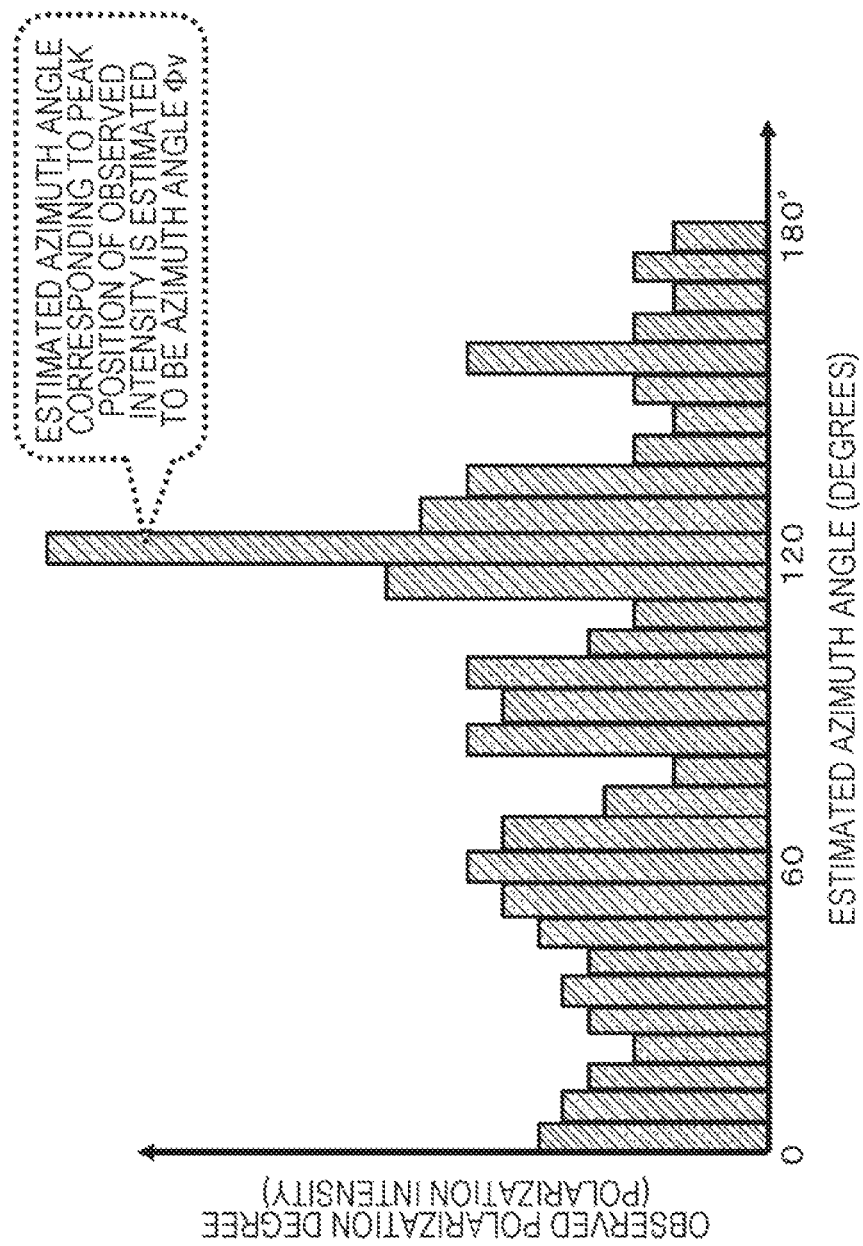
FIG. 25 is a graph for explaining an example of an azimuth angle calculation process.

FIG. 25 is a histogram generated by analyzing the polarization images captured by the camera 10, and the histogram shows the estimated azimuth on the abscissa axis and the degree of polarization (polarization intensity) corresponding to each azimuth angle on the ordinate axis.

The azimuth angle indicating the outstanding degree (polarization intensity) in this histogram can be estimated to be the data corresponding to the polarization based on the light reflected from the reflecting surface 70.

In the example shown in FIG. 25, the intensity at the azimuth angle=120 degrees is prominent, and 120 degrees can be estimated to be the azimuth angle $\Phi v$ of the camera eye vector nv.

As described above, the azimuth angle calculation unit 721 calculates the azimuth angle $\Phi v$ of the camera eye vector nv by analyzing the polarization images input from the image input unit 101.

The azimuth angle $\Phi v$ of the camera eye vector nv calculated by the azimuth angle calculation unit 721 is output to the zenith angle calculation unit 723.

The zenith angle calculation unit 723 receives inputs of the respective pieces of the following data (a) and (b):

(a) the azimuth angle $\Phi v$ of the camera eye vector nv calculated by the azimuth angle calculation unit 721; and (b) the camera angle $\theta cm$ that has been acquired from the sensor 15 by the camera posture acquisition unit 722 and indicates the tilt of the camera.

The zenith angle calculation unit 723 calculates the zenith angle $\theta v$ of the camera eye vector nv, using the respective pieces of the data (a) and (b).

Figure 26:
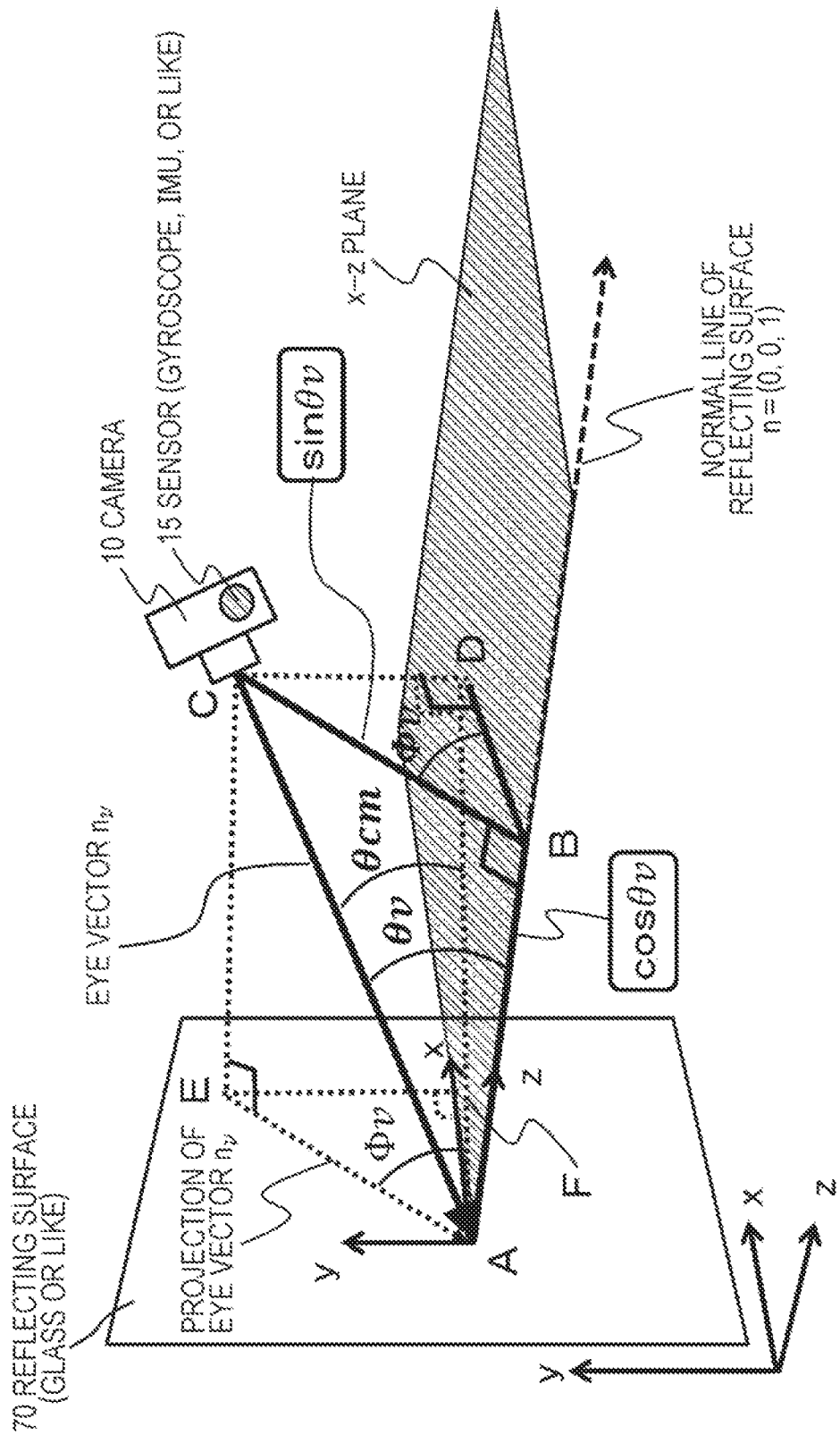
FIG. 26 is a diagram for explaining an example of a zenith angle calculation process.

The process to be performed by the zenith angle calculation unit 723 to calculate the zenith angle $\theta v$ of the camera eye vector nv is now described, with reference to FIG. 26 and other drawings.

FIG. 26 shows the camera 10, the reflecting surface 70 in the x-y plane, the x-z plane, which is the horizontal plane formed by the normal line (z-axis) of the reflecting surface 70 and the x-axis, and the camera eye vector nv.

A point on the reflecting surface 70 that is the end point of the camera eye vector nv is set as a point A, and the position of the camera 10, which is the starting point of the camera eye vector nv, is set as a point C.

A triangle EAF is the right triangle formed by a projection (=EA) of the camera eye vector nv onto the reflecting surface (x-y plane) and the azimuth-corresponding reference axis (x-axis) (=AF). The angle of the vertex A of the triangle EAF is the azimuth angle $\Phi v$ of the camera eye vector nv. Note that the angle of the point F of the triangle EAF is 90 degrees, and the triangle EAF is a right triangle.

Further, the point of intersection between the perpendicular from the camera position C and the x-z plane is set as a point D, and the point of intersection between the z-axis and the plane that includes the line segment CD and is parallel to the reflecting surface 70 is set as a point B.

A triangle CBD is the same triangle as the triangle EAF, and the angle of the vertex B of the triangle CBD is the azimuth angle $\Phi v$ of the camera eye vector nv. Note that the angle of the point D of the triangle CBD is 90 degrees, and the triangle CBD is a right triangle.

In these settings, (1) the camera angle $\theta cm$, (2) the azimuth angle $\Phi v$ of the camera eye vector nv, and (3) the zenith angle $\theta v$ of the camera eye vector nv are the angles shown below.

(1) Camera Angle $\theta Cm$

The camera angle $\theta cm$ is the angle indicating the tilt of the camera 10 relative to the horizontal plane x-z, and is the angle of the vertex A of the triangle CAD shown in the drawing. Note that the angle of the point D of the triangle CAD is 90 degrees, and the triangle CAD is a right triangle.

(2) Azimuth Angle $\Phi v$ of the Camera Eye Vector Nv

The azimuth angle $\Phi v$ of the camera eye vector nv is the angle formed by a projection (=EA) of the camera eye vector nv onto the reflecting surface (x-y plane) and the azimuth-corresponding reference axis (x-axis) (=AF), and is the angle of the vertex A of the triangle EAF shown in the drawing. Note that the angle of the point F of the triangle EAF is 90 degrees, and the triangle EAF is a right triangle.

(3) Zenith Angle $\theta v$ of the Camera Eye Vector Nv (3) The zenith angle $\theta v$ of the camera eye vector nv is the angle formed by the zenith-corresponding reference axis (z-axis) (=AB) and the camera eye vector nv (=CA), and is the angle of the vertex A of a triangle CAB shown in the drawing. Note that the angle of the point B of the triangle CAB is 90 degrees, and the triangle CAB is a right triangle.

Where the size (length) of the camera eye vector nv=1, the camera eye vector nv is the side CA of the right triangle CAB having the zenith angle $\theta v$ as the angle of the vertex A.

Accordingly, as shown in FIG. 26, the length of the side $AB=\cos \theta v$, and the length of the side $BC=\sin \theta v$.

Figure 27:
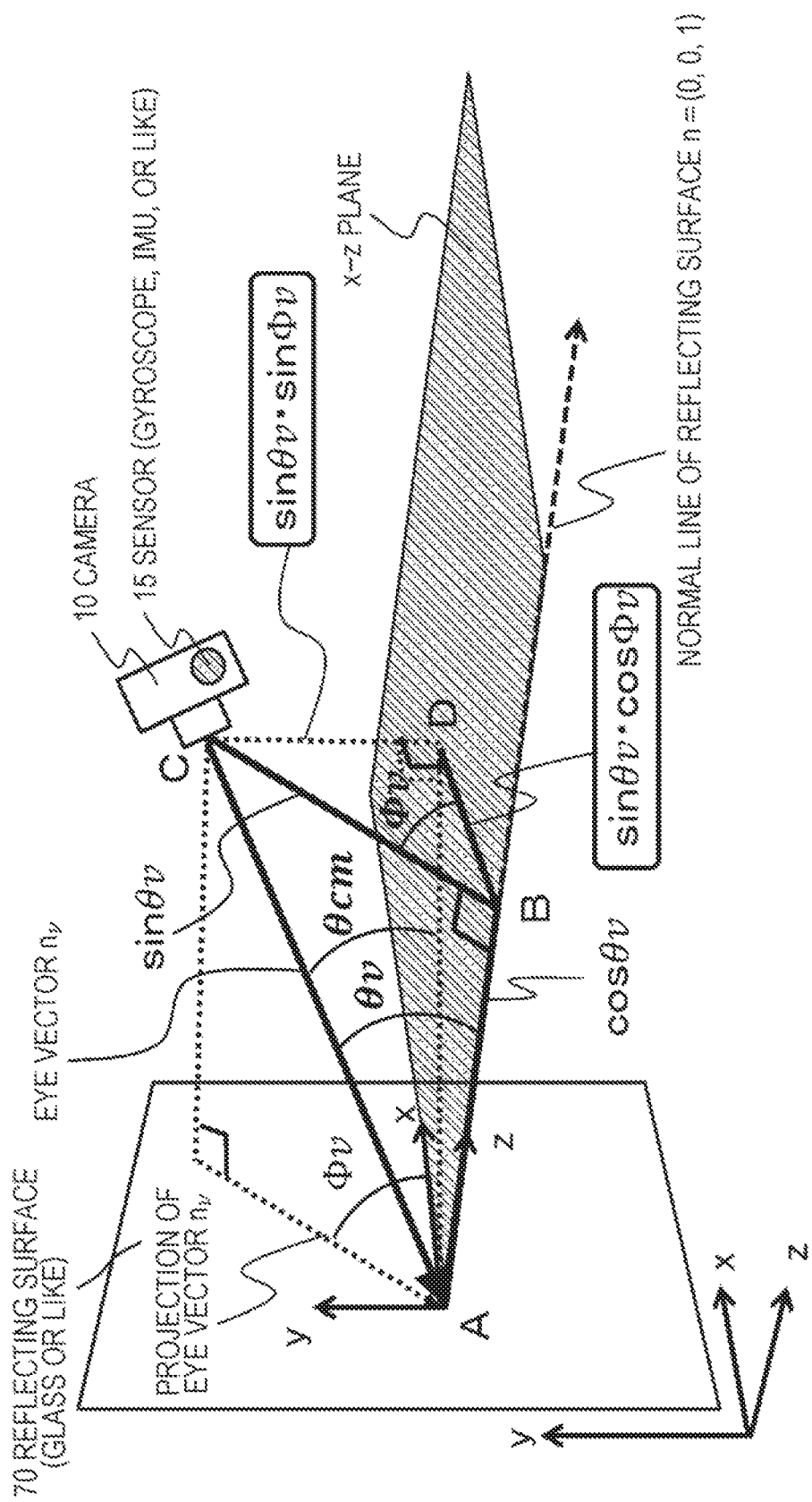
FIG. 27 is a diagram for explaining an example of a zenith angle calculation process.

Next, referring to FIG. 27, the lengths of the sides BD and CD of the right triangle CBD formed with a plane parallel to the reflecting surface 70 are described.

As described above, the angle of the point D of the right triangle CBD is 90 degrees, and the angle of the point B is the azimuth angle $\Phi v$ of the camera eye vector nv. As described above with reference to FIG. 26, the length of the side BC is as follows:

the length of the side $BC=\sin \theta v$.

Accordingly, the lengths of the sides BD and CD of the right triangle CBD are as shown in FIG. 27 and as follows:

the length of the side $BD=\sin \theta v \cdot \cos \Phi v$, and the length of the side $CD=\sin \theta v \cdot \sin \Phi v$.

Figure 28:
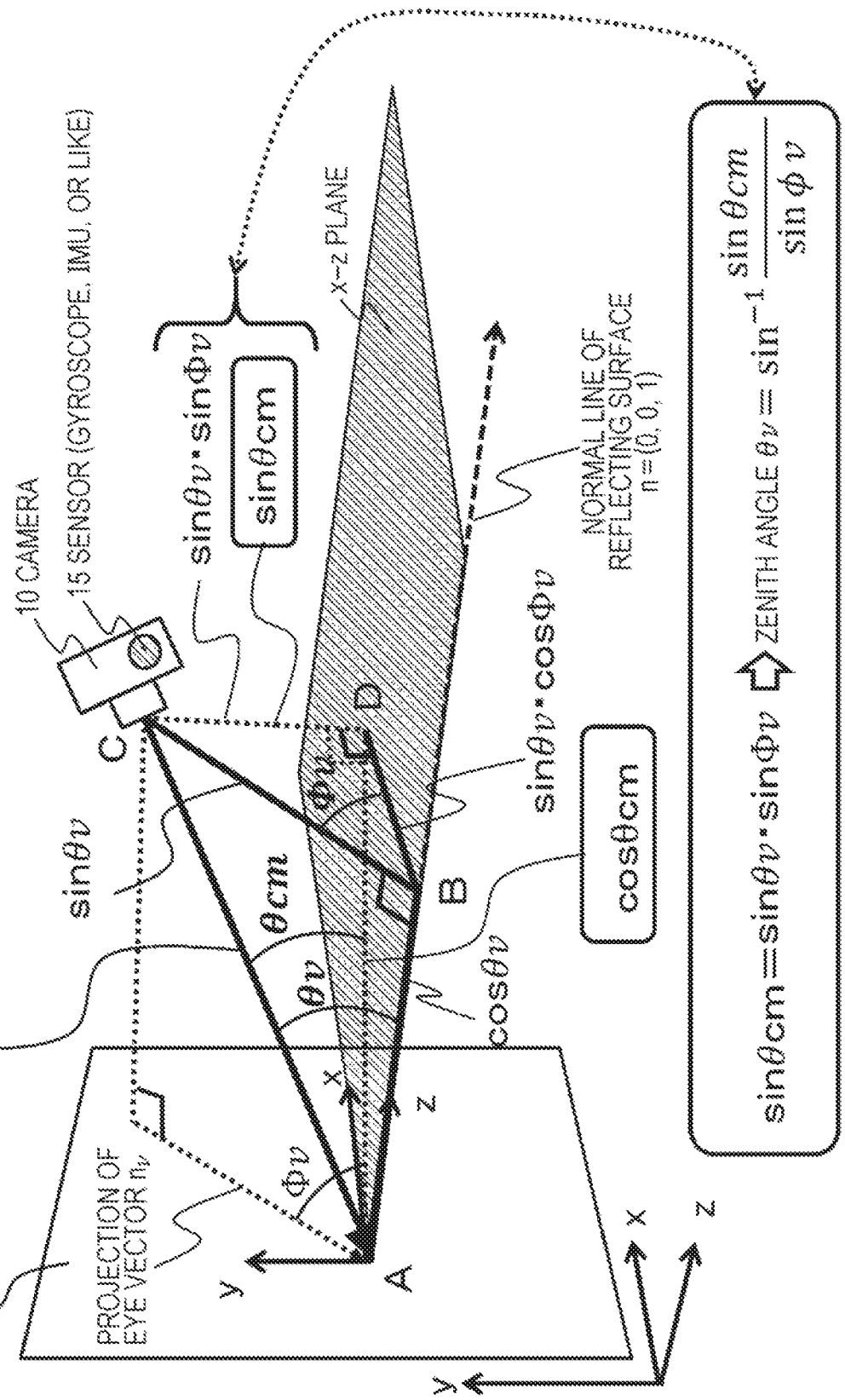
FIG. 28 is a diagram for explaining an example of a zenith angle calculation process.

Next, referring to FIG. 28, the lengths of the sides CD and AD of the triangle CAD including the camera angle $\theta cm$ are described.

As described above, the angle of the point D of the right triangle CAD is 90 degrees, and the angle of the point A is the camera angle $\theta cm$. The side CA is the camera eye vector nv, and its length is 1.

Accordingly, the lengths of the sides CD and AD of the right triangle CAD are as shown in FIG. 28 and as follows:

the length of the side $CD=\sin \theta cm$, and the length of the side $AD=\cos \theta cm$.

Here, as for the length of the side CD, two values based on the two triangles described below are calculated. Specifically, these two values are:

a calculated value based on the triangle CBD described above with reference to FIG. 27, $CD=\sin \theta v \cdot \sin \Phi v$, and a calculated value based on the triangle CAD described above with reference to FIG. 27, $CD=\sin \theta cm$.

These are values indicating the length of the same side CD, and are equal values. That is, the following equation is satisfied:

$$CD = \sin\theta cm = \sin\theta v \cdot \sin\Phi v.$$

On the basis of this equation, the zenith angle θv of the camera eye vector nv is expressed by (Expression 14) shown below.

[Mathematical Formula 14]

$$\theta v = \sin^{-1}\frac{\sin\theta cm}{\sin\phi v} \quad \text{(Formula 14)}$$

The above (Expression 14) is the expression for calculating the zenith angle θv of the camera eye vector nv, using the camera angle θcm and the azimuth angle Φv of the camera eye vector nv.

The zenith angle calculation unit 723 of the angle input unit 102 shown in FIG. 20 inputs the azimuth angle Φv of the camera eye vector nv from the azimuth angle calculation unit 721, and the camera angle θcm from the camera posture acquisition unit 722.

The zenith angle calculation unit 723 calculates the zenith angle θv of the camera eye vector nv according to the above (Expression 14), and inputs the calculated zenith angle θv of the camera eye vector nv to the intensity transmittance/intensity reflectance calculation unit 104.

As described above, and as can be understood from comparison between FIG. 21 and FIG. 1 described earlier, the zenith angle θv of the camera eye vector nv shown in FIG. 21 and the reflection angle α (=the incidence angle α) shown in FIG. 1 described earlier are angles with the same definition.

The intensity transmittance/intensity reflectance calculation unit 104 performs a process using the zenith angles input from the angle input unit 102 as the incidence angles (=the reflection angles) a described in the above embodiments.

Note that, as shown in FIG. 28, the camera eye vector nv can be expressed with the lengths of the sides DB, CD, and BA, and can be expressed as follows:

$$nv = (x, y, z) = (DB, CD, BA)$$
$$= (\sin\Theta v \cdot \cos\Phi v, \sin\Theta v \cdot \sin\Phi v, \cos\Theta v)$$

Figure 29:
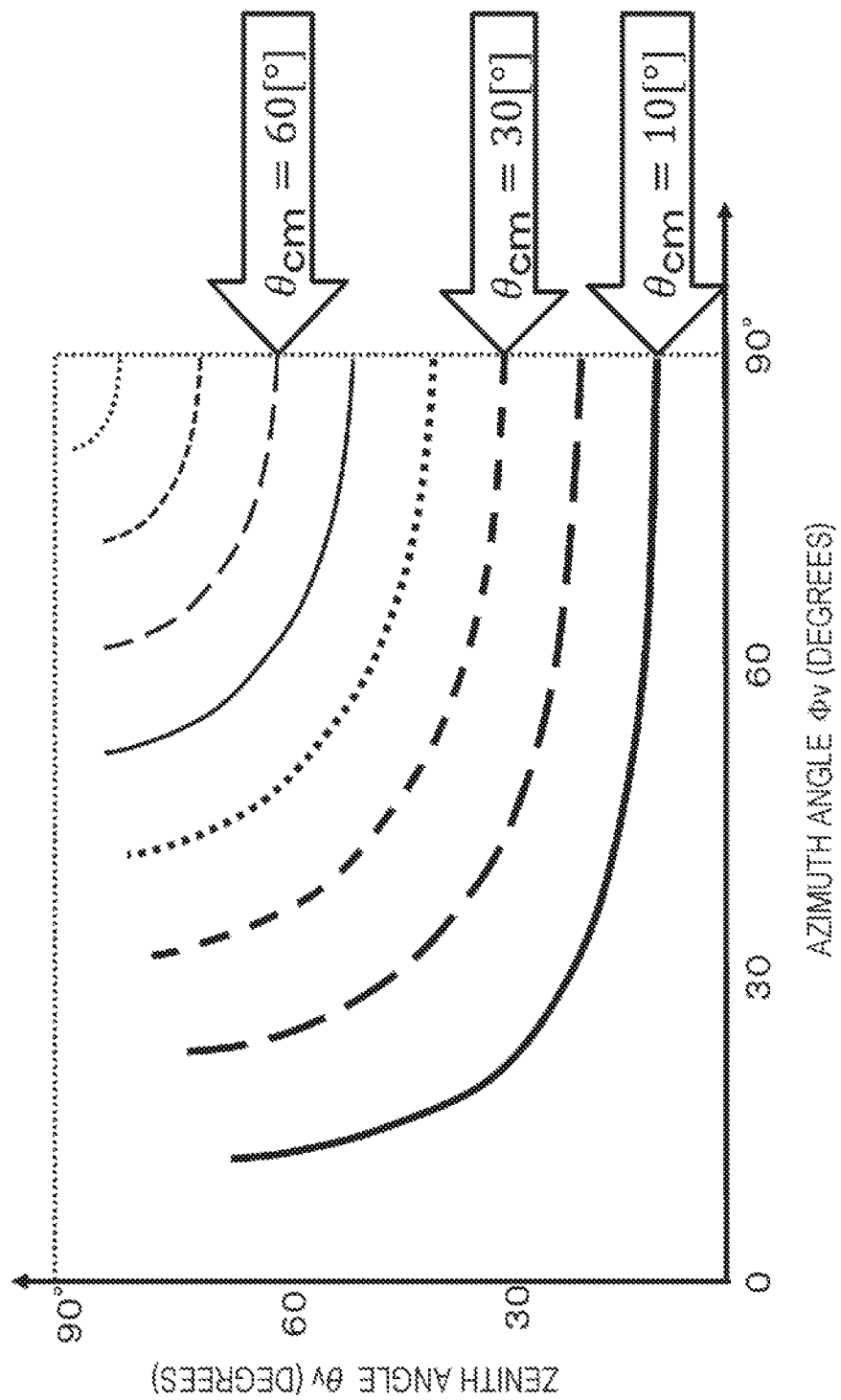
FIG. 29 is a graph for explaining an example of the correspondence relationship among azimuth angle, zenith angle, and camera angle.

Further, the three values shown below have the relationship expressed by the relational expression shown in the above (Expression 14):

(1) the zenith angle θv of the camera eye vector nv,
(2) the azimuth angle Φv of the camera eye vector nv, and
(3) the camera angle θcm.

Where the relationship among these three angles is plotted on a chart, a graph shown in FIG. 29 is obtained.

FIG. 29 is a graph that sets the azimuth angle Φv of the camera eye vector nv on the abscissa axis, and the zenith angle θv of the camera eye vector nv on the ordinate axis, and indicates the curve formed by a plurality of different camera angles θcm.

The zenith angle calculation unit 723 of the angle input unit 102 shown in FIG. 20 may be designed to store the correspondence relationship data of the respective angles similar to the graph shown in FIG. 29, and calculate the zenith angle θv of the camera eye vector nv.

That is, the zenith angle calculation unit 723 may be designed to input the azimuth angle Φv of the camera eye vector nv from the azimuth angle calculation unit 721, and the camera angle θcm from the camera posture acquisition unit 722, and calculate the zenith angle θv of the camera eye vector nv, using the stored correspondence relationship data.

Figure 30:
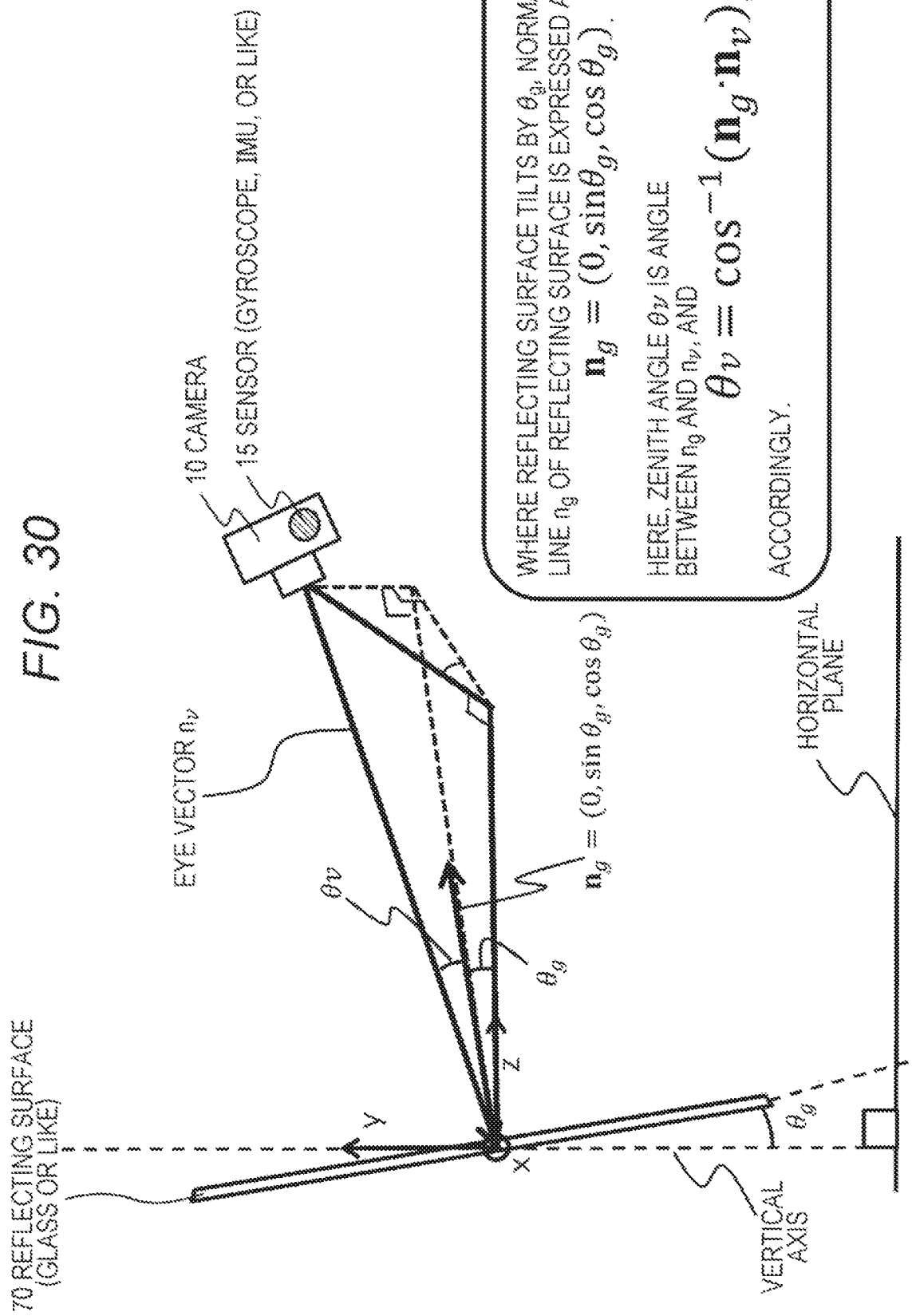
FIG. 30 is a diagram for explaining an example of a zenith angle calculation process.

Next, referring to FIG. 30, an example of a process of calculating the zenith angle θv of the camera eye vector nv is described. This calculation process is performed in a case where the reflecting surface 70 is not perpendicular to the horizontal plane, and is tilted.

FIG. 30 shows a reflecting plate 70 such as glass that is tilted with respect to the axis perpendicular to the horizontal plane. The reflecting surface 70 is tilted at a tilt angle θg with respect to the vertical axis.

In this setting, the normal line ng of the reflecting surface 70 is $$ng = (0, \sin\theta g, \cos\theta g).$$

At this stage, the zenith angle θv of the camera eye vector nv is the angle between the normal line ng of the reflecting surface 70, which is the zenith-corresponding reference axis, and the camera eye vector nv, as shown in the drawing.

Accordingly, the zenith angle θv of the camera eye vector nv can be calculated according to (Expression 15) shown below.

$$\theta v = \cos^{-1}(ng \cdot nv) \quad \text{(Expression 15)}$$

The above (Expression 15) is the expression for calculating the zenith angle θv of the camera eye vector nv from the angle formed by the normal line ng of the reflecting surface 70 and the camera eye vector nv.

As described above, the normal line ng of the reflecting surface 70 is (0, sin θg, cos θg), and the camera eye vector nv is obtained through the process shown below:

$$nv = (\sin(\theta v + \theta g) \cdot \cos\Phi v, \sin(\theta v + \theta g) \cdot \sin\Phi v, \cos(\theta v + \theta g)),$$

which is similar to the above described process.

The zenith angle calculation unit 723 of the angle input unit 102 shown in FIG. 20 calculates the zenith angle θv of the camera eye vector nv according to the above (Expression 15), and inputs the calculated zenith angle θv of the camera eye vector nv to the intensity transmittance/intensity reflectance calculation unit 104.

As described above, and as can be understood from comparison between FIG. 21 and FIG. 1 described earlier, the zenith angle θv of the camera eye vector nv shown in FIG. 21 and the reflection angle α (=the incidence angle α) shown in FIG. 1 described earlier are angles with the same definition.

The intensity transmittance/intensity reflectance calculation unit 104 performs a process using the zenith angles input from the angle input unit 102 as the incidence angles (=the reflection angles) a described in the above embodiments.

Figure 31:
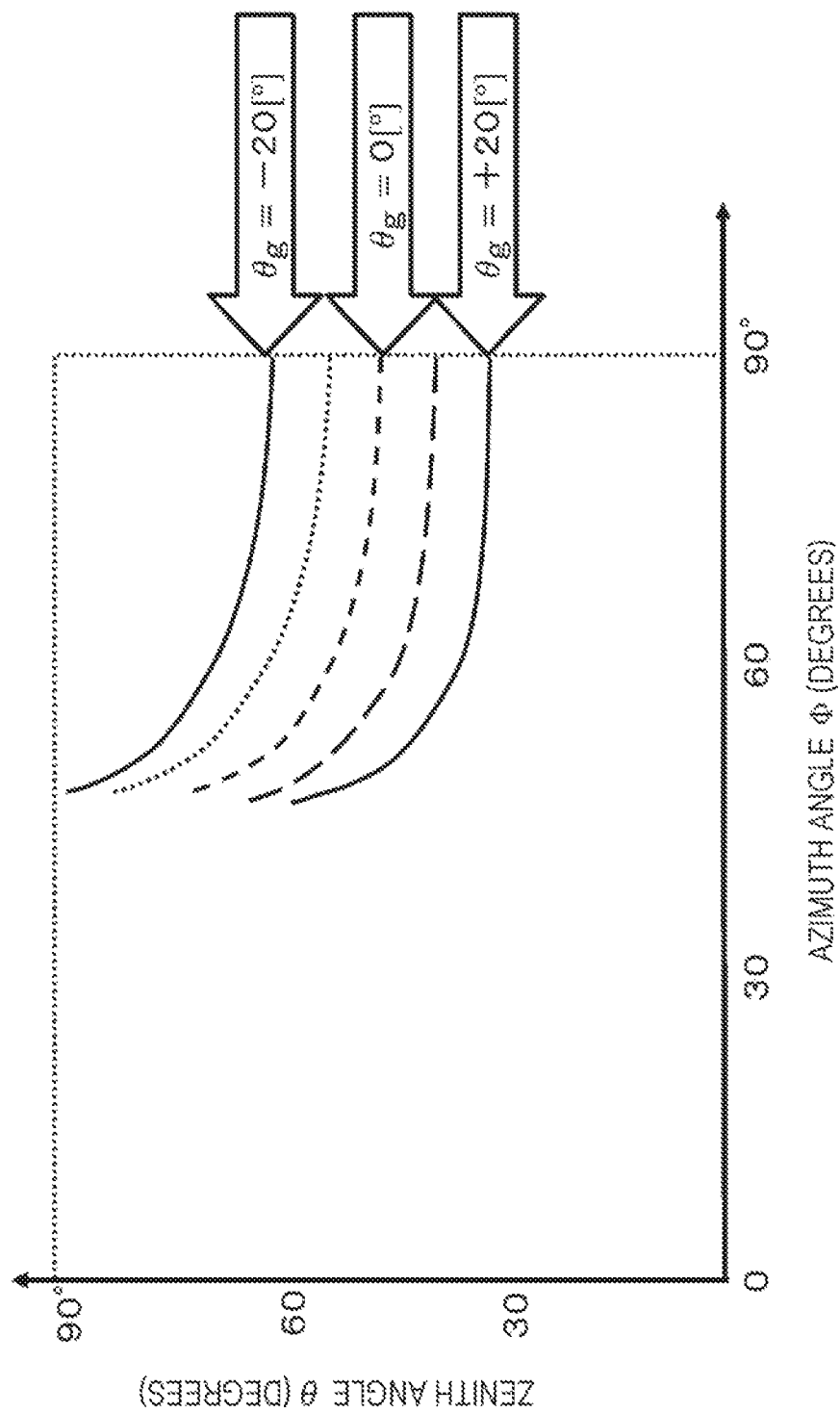
FIG. 31 is a graph for explaining an example of the correspondence relationship among azimuth angle, zenith angle, and reflecting surface tilt angle.

Further, the three values shown below have the relationship expressed by the relational expression shown in the above (Expression 15):

(1) the zenith angle θv of the camera eye vector nv,
(2) the azimuth angle Φv of the camera eye vector nv, and
(3) the tilt angle θg of the reflecting surface.

Where the relationship among these three angles is plotted on a chart, a graph shown in FIG. 31 is obtained.

FIG. 31 is a graph that sets the azimuth angle Φv of the camera eye vector nv on the abscissa axis, and the zenith angle θv of the camera eye vector nv on the ordinate axis, and indicates the curve formed by a plurality of different reflecting surface tilt angles θg.

The zenith angle calculation unit 723 of the angle input unit 102 shown in FIG. 20 may be designed to store the correspondence relationship data of the respective angles similar to the graph shown in FIG. 31, and calculate the zenith angle θv of the camera eye vector nv.

Figure 32:
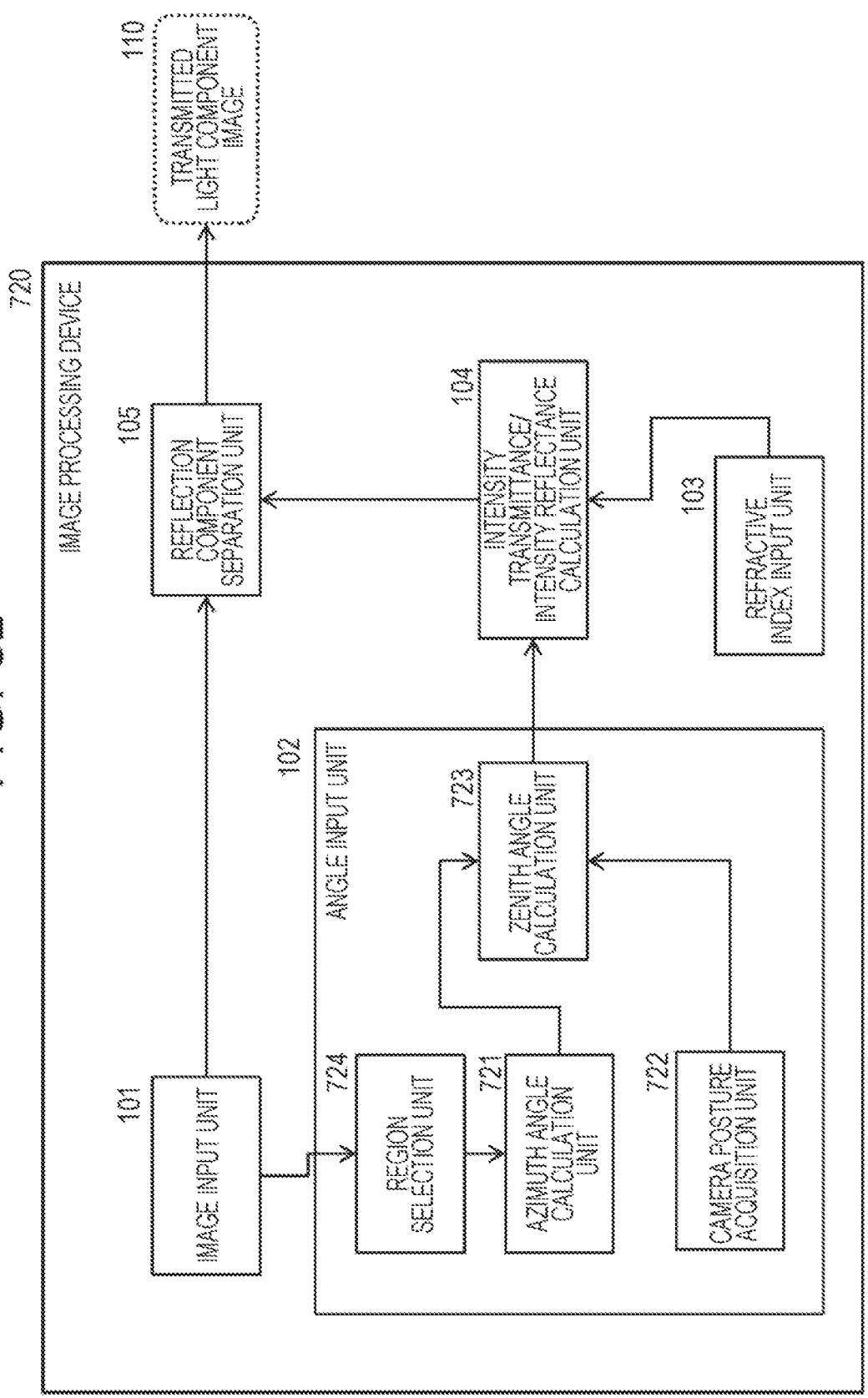
FIG. 32 is a diagram showing the configuration of an embodiment of an image processing device of the present disclosure.

Note that, in the configuration of the angle input unit 102 shown in FIG. 20, processing is performed on an entire image input from the image input unit 101. However, as shown in FIG. 32, for example, a region selection unit 724 may be set in the angle input unit 102, so that only a region to be subjected to reflection removal is selected from an image input from the image input unit 101, and processing is performed only on the selected region.

Specifically, the operator selects the region in which the reflecting surface exists from an image, using an interface such as a mouse or a touch display. The azimuth angle calculation unit 721 calculates the azimuth angle corresponding to the selected region, and the zenith angle calculation unit 723 calculates the zenith angle corresponding to the selected region. The angle input unit 102 outputs the zenith angle corresponding to this selected region, to a processing unit of the subsequent stage. The processing unit of the subsequent stage performs a process of removing reflection components only in the selected region.

Figure 33:
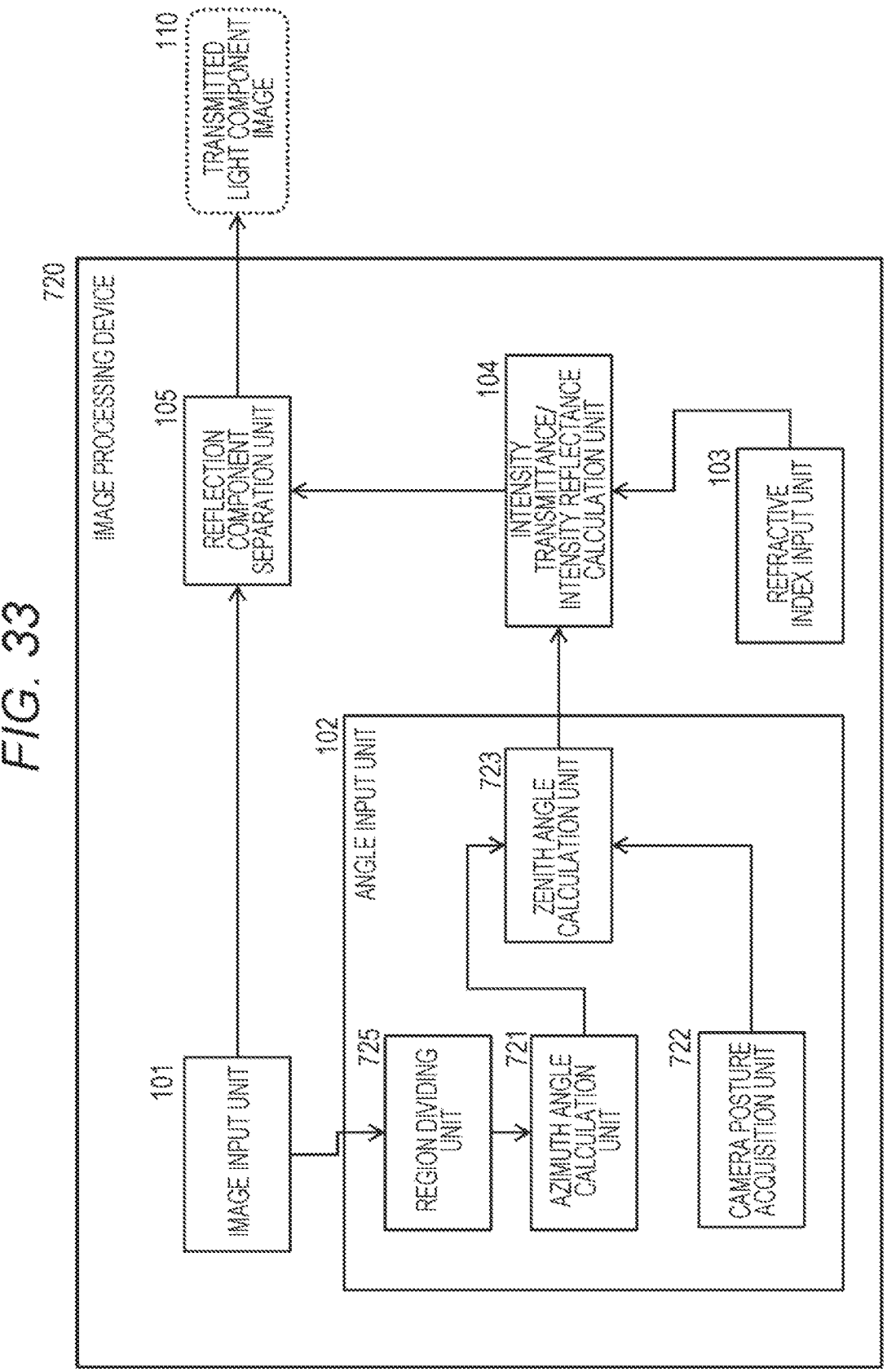
FIG. 33 is a diagram showing the configuration of an embodiment of an image processing device of the present disclosure.

Further, as shown in FIG. 33, a region dividing unit 725 may be set in the angle input unit 102, and processing may be performed for each divided region.

Specifically, the region dividing unit 725 divides an image input from the image input unit 101 into rectangular pixel regions of a preset size, for example. The azimuth angle calculation unit 721 calculates individual azimuth angles corresponding to the respective divided regions. The zenith angle calculation unit 723 calculates the zenith angle for each divided region. The angle input unit 102 outputs the zenith angle for each divided region to a processing unit of the subsequent stage. The processing unit of the subsequent stage performs a process of removing reflection components, using individual zenith angles for the respective divided regions.

6. An Example Hardware Configuration of an Image Processing Device

Figure 34:
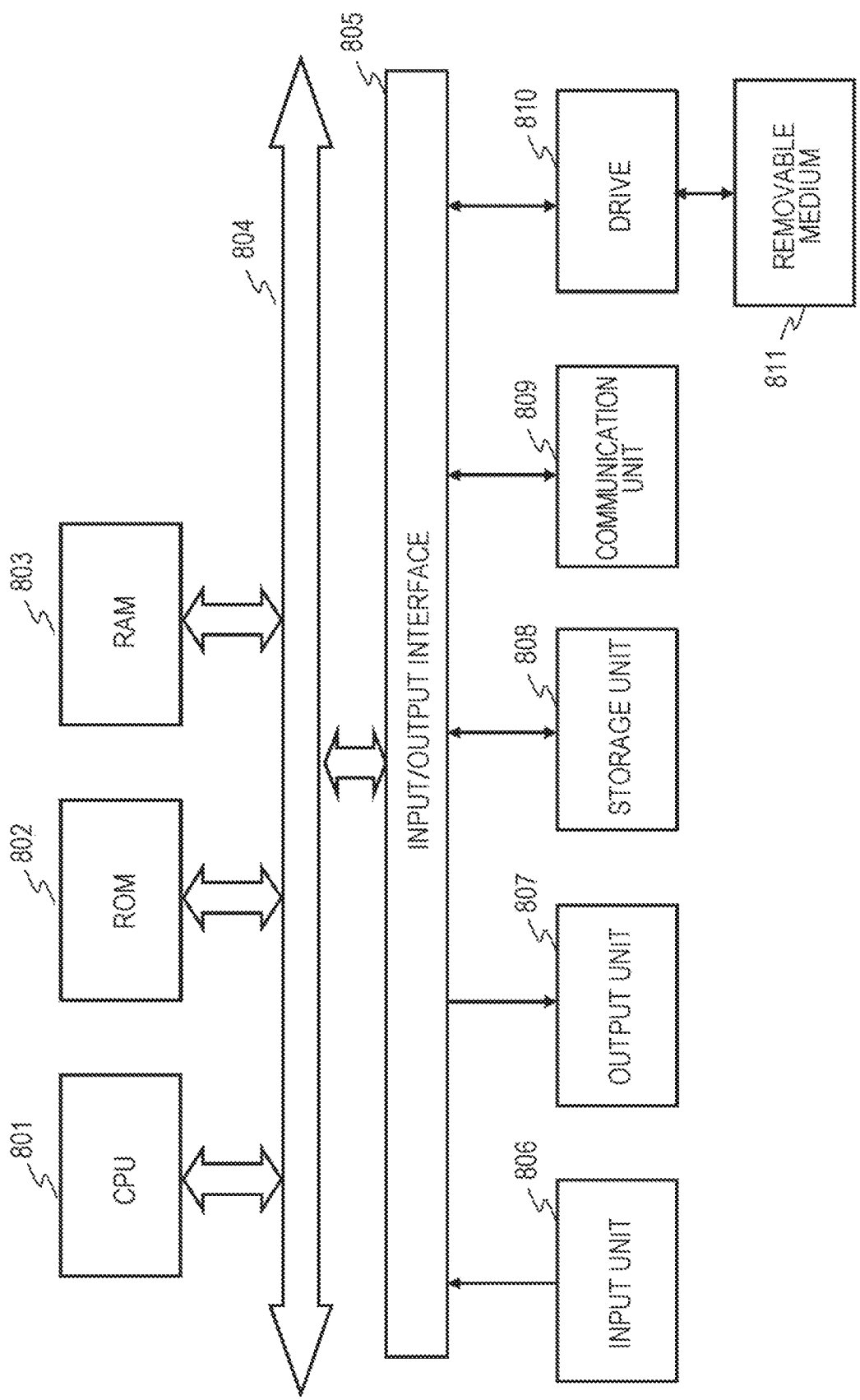
FIG. 34 is a diagram for explaining an example hardware configuration of an image processing device.

Next, referring to FIG. 34, an example hardware configuration of an image processing device is described.

Note that the hardware configuration shown in FIG. 34 is a block diagram showing an example hardware configuration that can be used as one of the image processing devices described in the above embodiments.

A central processing unit (CPU) 801 functions as a data processing unit that performs various kinds of processes in accordance with a program stored in a read only memory (ROM) 802 or a storage unit 808. For example, the processes described in the above embodiments are performed. The program to be executed by the CPU 801, data, and the like are stored in a random access memory (RAM) 803. The CPU 801, the ROM 802, and the RAM 803 are connected to one another by a bus 804.

The CPU 801 is connected to an input/output interface 805 via the bus 804, and an input unit 806 formed with various kinds of switches, a keyboard, a mouse, a microphone, and the like, and an output unit 807 formed with a display, a speaker, and the like are also connected to the input/output interface 805. Note that the input unit 806 may include an image capturing unit, or may include an input unit that inputs an image from an imaging device.

The CPU 801 performs various kinds of processes in accordance with instructions that are input through the input unit 806, and outputs processing results to the output unit 807, for example.

The storage unit 808 connected to the input/output interface 805 is formed with a hard disk or the like, for example, and stores the program to be executed by the CPU 801 and various kinds of data. The communication unit 809 functions as a transmission/reception unit for data communication via a network such as the Internet or a local area network, and further functions as a transmission/reception unit for broadcast waves, to communicate with external devices.

A drive 810 connected to the input/output interface 805 drives a removable medium 811 such as a magnetic disk, an optical disk, a magnetooptical disk, a semiconductor memory like a memory card, and performs recording or reading of data.

7. Example Applications of an Image Processing Device of the Present Disclosure The technology according to the present disclosure can be applied to various products. For example, the technology according to the present disclosure may be embodied as an apparatus mounted on any type of moving object, such as an automobile, an electrical vehicle, a hybrid electrical vehicle, a motorcycle, a bicycle, a personal mobility device, an airplane, a drone, a vessel, a robot, a construction machine, or an agricultural machine (a tractor).

Figure 35:
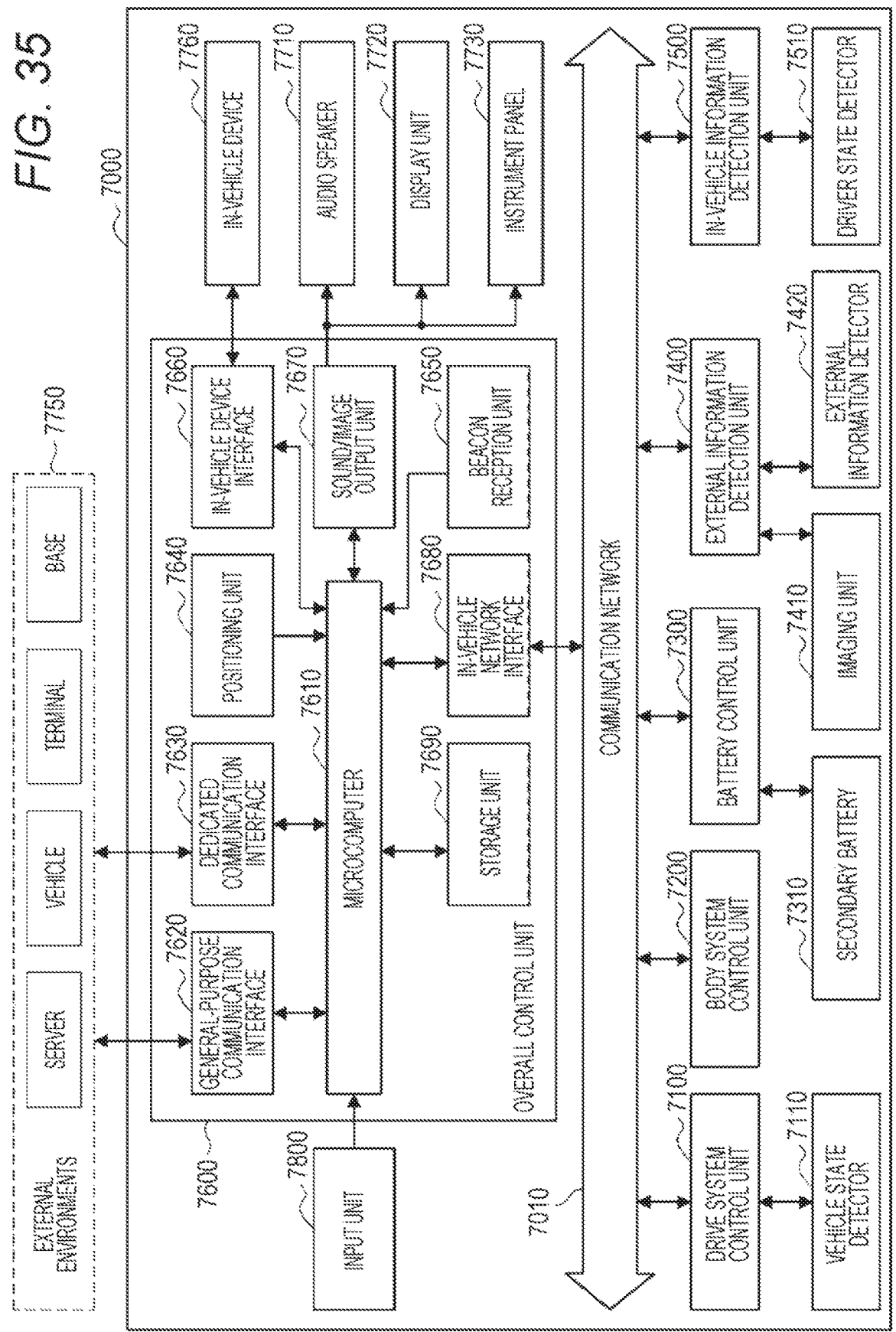
FIG. 35 is a block diagram schematically showing an example configuration of a vehicle control system.

FIG. 35 is a block diagram schematically showing an example configuration of a vehicle control system 7000 that is an example of a moving object control system to which the technology according to the present disclosure can be applied. The vehicle control system 7000 includes a plurality of electronic control units connected via a communication network 7010. In the example shown in FIG. 35, the vehicle control system 7000 includes a drive system control unit 7100, a body system control unit 7200, a battery control unit 7300, an external information detection unit 7400, an in-vehicle information detection unit 7500, and an overall control unit 7600. The communication network 7010 connecting the plurality of control units may be an in-vehicle communication network compliant with an appropriate standard, such as a controller area network (CAN), a local interconnect network (LIN), a local area network (LAN), or FlexRay (registered trademark), for example.

Each of the control units includes: a microcomputer that performs arithmetic processing according to various programs; a storage unit that stores the programs to be executed by the microcomputer, the parameters to be used for various calculations, or the like; and a drive circuit that drives the current device to be subjected to various kinds of control. Each of the control units includes a communication interface for performing communication through wired communication or wireless communication with an external device or a sensor or the like, as well as a network interface for communicating with another control unit via the communication network 7010. In FIG. 35, a microcomputer 7610, a general-purpose communication interface 7620, a dedicated communication interface 7630, a positioning unit 7640, a beacon reception unit 7650, an in-vehicle device interface 7660, a sound/image output unit 7670, an in-vehicle network interface 7680, and a storage unit 7690 are shown as the functional components of the overall control unit 7600.

Likewise, the other control units each include a microcomputer, a communication interface, a storage unit, and the like.

The drive system control unit 7100 controls operations of the devices related to the drive system of the vehicle according to various programs. For example, the drive system control unit 7100 functions as control devices such as a driving force generation device for generating a driving force of the vehicle such as an internal combustion engine or a driving motor, a driving force transmission mechanism for transmitting the driving force to the wheels, a steering mechanism for adjusting the steering angle of the vehicle, and a braking device for generating a braking force of the vehicle. The drive system control unit 7100 may also have functions as a control device such as an antilock brake system (ABS) or an electronic stability controller (ESC).

A vehicle state detector 7110 is connected to the drive system control unit 7100. For example, the vehicle state detector 7110 includes at least one of the following components: a gyroscope sensor that detects an angular velocity of axial rotation motion of the vehicle body; an acceleration sensor that detects an acceleration of the vehicle; and a sensor for detecting an operation amount of the gas pedal, an operation amount of the brake pedal, an steering angle of the steering wheel, an engine rotation speed, a wheel rotation speed, or the like. The drive system control unit 7100 performs arithmetic processing using a signal input from the vehicle state detector 7110, and controls the internal combustion engine, the driving motor, the electrical power steering device, the brake device, or the like.

The body system control unit 7200 controls operations of the various devices mounted on the vehicle body according to various programs. For example, the body system control unit 7200 functions as a keyless entry system, a smart key system, a power window device, or a control device for various lamps such as a headlamp, a backup lamp, a brake lamp, a turn signal lamp, or a fog lamp. In this case, the body system control unit 7200 can receive radio waves transmitted from a portable device that substitutes for a key, or signals from various switches. The body system control unit 7200 receives inputs of these radio waves or signals, and controls the door lock device, the power window device, the lamps, and the like of the vehicle.

The battery control unit 7300 controls a secondary battery 7310 that is a power supply source for the driving motor, according to various programs. For example, the battery control unit 7300 receives information, such as a battery temperature, a battery output voltage, or a remaining capacity of the battery, from a battery device including the secondary battery 7310. The battery control unit 7300 performs arithmetic processing using these signals, to control temperature adjustment of the secondary battery 7310 or to control a cooling device or the like provided in the battery device.

The external information detection unit 7400 detects information outside the vehicle equipped with the vehicle control system 7000. For example, an imaging unit 7410 and/or an external information detector 7420 is connected to the external information detection unit 7400. The imaging unit 7410 includes at least one of the following cameras: a time-of-flight (ToF)) camera, a stereo camera, a monocular camera, an infrared camera, or other cameras. The external information detector 7420 includes an environment sensor for detecting the current weather or meteorological phenomenon, and/or an ambient information detection sensor for detecting another vehicle, an obstacle, a pedestrian, or the like around the vehicle equipped with the vehicle control system 7000, for example.

The environment sensor may be formed with at least one of the following sensors: a raindrop sensor that detects rain, a fog sensor that detects a fog, a solar radiation sensor that detects a degree of solar radiation, or a snow sensor that detects a snowfall, for example. The ambient information detection sensor may be at least one of the following devices: an ultrasonic sensor, a radar device, or a LIDAR (light detection and ranging, laser imaging detection and ranging) device. The imaging unit 7410 and the external information detector 7420 may be provided as an independent device and an independent sensor, respectively, or may be provided as a device in which a plurality of sensors or devices are integrated.

Figure 36:
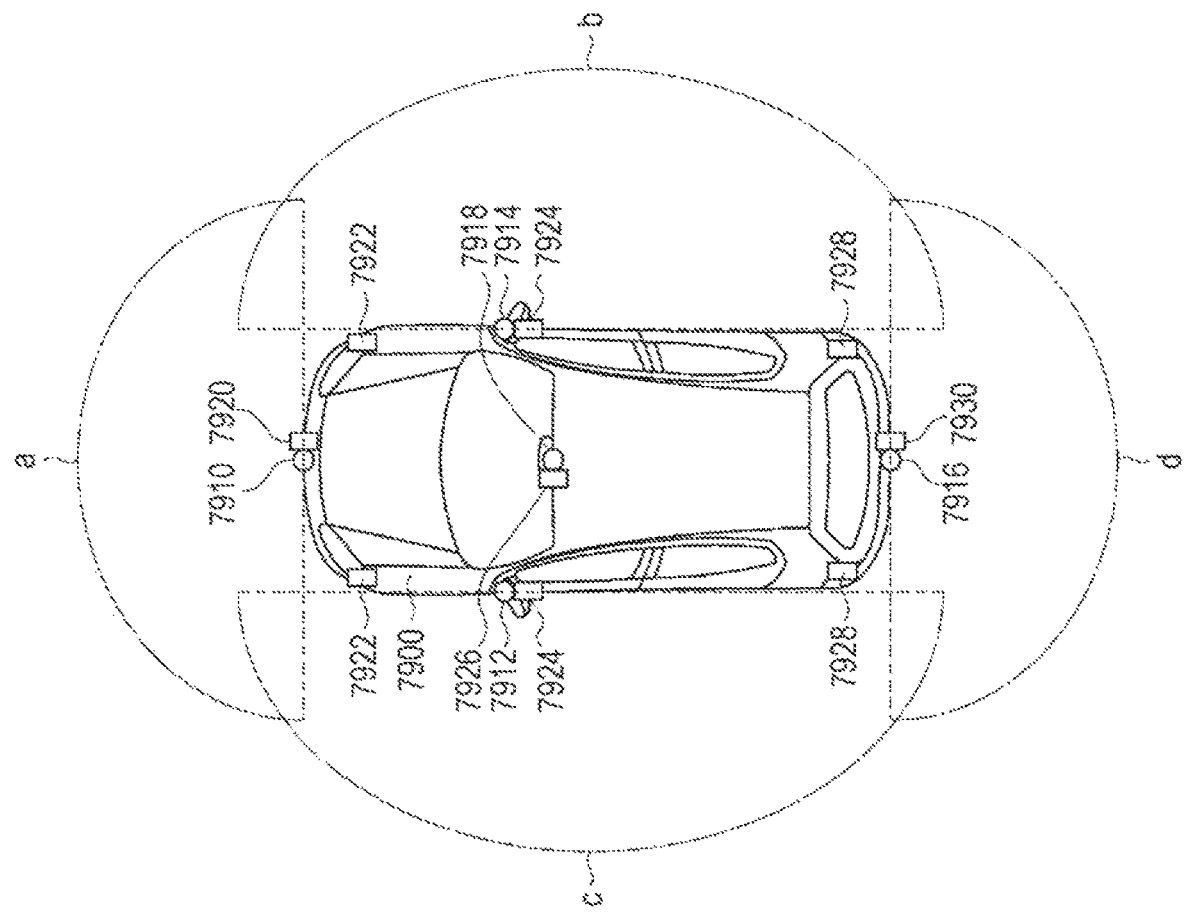
FIG. 36 is an explanatory diagram showing an example of installation positions of external information detectors and imaging units.

Here, FIG. 36 shows an example of installation positions of imaging units 7410 and external information detectors 7420. Imaging units 7910, 7912, 7914, 7916, and 7918 are provided at at least one of the following positions: the front end edge of a vehicle 7900, a side mirror, the rear bumper, a rear door, or an upper portion of the front windshield inside the vehicle, for example. The imaging unit 7910 provided on the front end edge and the imaging unit 7918 provided on the upper portion of the front windshield inside the vehicle mainly capture images ahead of the vehicle 7900. The imaging units 7912 and 7914 provided on the side mirrors mainly capture images on the sides of the vehicle 7900. The imaging unit 7916 provided on the rear bumper or a rear door mainly captures images behind the vehicle 7900. The imaging unit 7918 provided on the upper portion of the front windshield inside the vehicle is mainly used for detection of a vehicle running in front of the vehicle, a pedestrian, an obstacle, a traffic signal, a traffic sign, a lane, or the like.

Note that FIG. 36 shows an example of the imaging range of each of the imaging units 7910, 7912, 7914, and 7916. An imaging range a indicates the imaging range of the imaging unit 7910 provided on the front end edge, imaging ranges b and c indicate the imaging ranges of the imaging units 7912 and 7914 provided on the respective side mirrors, and an imaging range d indicates the imaging range of the imaging unit 7916 provided on the rear bumper or a rear door. For example, image data captured by the imaging units 7910, 7912, 7914, 7916 are superimposed on one another, so that an overhead image of the vehicle 7900 viewed from above is obtained.

External information detectors 7920, 7922, 7924, 7926, 7928, and 7930 provided on the front, the rear, the sides, the corners of the vehicle 7900 and an upper portion of the front windshield inside the vehicle may be ultrasonic sensors or radar devices, for example. The external information detectors 7920, 7926, and 7930 provided on the front end edge of the vehicle 7900, the rear bumper, and the rear doors, and the upper portion of the front windshield inside the vehicle may be LIDAR devices, for example. These external information detectors 7920 through 7930 are mainly used for detecting a vehicle running in front of the vehicle 7900, a pedestrian, an obstacle, or the like.

Referring back to FIG. 35, the explanation is continued. The external information detection unit 7400 causes the imaging unit 7410 to capture an image of the outside of the vehicle, and receives the captured image data. The external information detection unit 7400 also receives detection information from the external information detector 7420 connected thereto. In a case where the external information detector 7420 is an ultrasonic sensor, a radar device, or an LIDAR device, the external information detection unit 7400 causes the external information detector 7420 to transmit ultrasonic waves, or electromagnetic waves, or the like, and receive information about received reflected waves. On the basis of the received information, the external information detection unit 7400 may perform an object detection process for detecting a person, a vehicle, an obstacle, a sign, characters on the road surface, or the like, or perform a distance detection process. On the basis of the received information, the external information detection unit 7400 may also perform an environment recognition process for recognizing a rainfall, a fog, a road surface condition, or the like. On the basis of the received information, the external information detection unit 7400 may also calculate the distance to an object outside the vehicle.

Further, on the basis of the received image data, the external information detection unit 7400 may perform an image recognition process for recognizing a person, a vehicle, an obstacle, a sign, characters on the road surface, or the like, or a distance detection process. The external information detection unit 7400 may also perform processing such as distortion correction or positioning on the received image data, and combine the image data captured by different imaging units 7410, to generate an overhead image or a panoramic image. The external information detection unit 7400 may also perform a viewpoint conversion process using image data captured by different imaging units 7410.

The in-vehicle information detection unit 7500 detects information about the inside of the vehicle. For example, a driver state detector 7510 that detects the state of the driver is connected to the in-vehicle information detection unit 7500. The driver state detector 7510 may include a camera that captures images of the driver, a biometric sensor that detects biological information about the driver, a microphone that collects sounds inside the vehicle, or the like. The biometric sensor is provided on the seating surface or the steering wheel or the like, for example, and detects biological information about a passenger sitting on a seat or the driver holding the steering wheel. On the basis of the detection information input from the driver state detector 7510, the in-vehicle information detection unit 7500 may calculate the degree of fatigue or the degree of concentration of the driver, or determine whether the driver is dozing off. The in-vehicle information detection unit 7500 may also perform a noise cancel process or the like on the collected sound signals.

The overall control unit 7600 controls the entire operation in the vehicle control system 7000 according to various programs. An input unit 7800 is connected to the overall control unit 7600. The input unit 7800 is formed with a device on which a passenger can perform an input operation, such as a touch panel, buttons, a microphone, a switch, or a lever, for example. The overall control unit 7600 may receive data obtained by performing speech recognition on sound input through a microphone. For example, the input unit 7800 may be a remote control device using infrared rays or some other radio waves, or an external connection device such as a portable telephone or a personal digital assistant (PDA) compatible with operations on the vehicle control system 7000. The input unit 7800 may be a camera, for example, and in that case, a passenger can input information by gesture. Alternatively, data obtained by detecting movement of a wearable device worn by a passenger may be input. Further, the input unit 7800 may include an input control circuit or the like that generates an input signal on the basis of information input by a passenger or the like using the above input unit 7800, for example, and outputs the input signal to the overall control unit 7600. By operating this input unit 7800, a passenger or the like inputs various data to the vehicle control system 7000 or issues a processing operation instruction to the vehicle control system 7000.

The storage unit 7690 may include a read only memory (ROM) that stores various programs to be executed by the microcomputer, and a random access memory (RAM) that stores various parameters, calculation results, sensor values, and the like. Also, the storage unit 7690 may be formed with a magnetic storage device such as a hard disk drive (HDD), a semiconductor storage device, an optical storage device, a magneto-optical storage device, or the like.

The general-purpose communication interface 7620 is a general communication interface that mediates communication with various devices existing in external environments 7750. The general-purpose communication interface 7620 may implement a cellular communication protocol such as GSM (registered trademark) (Global System of Mobile communications), WiMAX, LTE (Long Term Evolution), or LTE-A (LTE-Advanced), or some other wireless communication protocol such as wireless LAN (also called Wi-Fi (registered trademark)) or Bluetooth (registered trademark). The general-purpose communication interface 7620 may be connected to a device (an application server or a control server, for example) existing in an external network (the Internet, a cloud network, or a company-specific network, for example) via a base station or an access point. Alternatively, the general-purpose communication interface 7620 may be connected to a terminal (a terminal of a driver, a pedestrian, or a shop, or a machine type communication (MTC) terminal, for example) existing in the vicinity of the vehicle, using the peer-to-peer (P2P) technology.

The dedicated communication interface 7630 is a communication interface that supports a communication protocol formulated for use in a vehicle. The dedicated communication interface 7630 may implement a standard protocol such as Wireless Access in Vehicle Environment (WAVE), which is a combination of IEEE802.11p as the lower layer and IEEE1609 as the upper layer, Dedicated Short Range Communications (DSRC), or a cellular communication protocol, for example. Typically, the dedicated communication interface 7630 conducts V2X (Vehicle to Vehicle) communication, which is a concept including at least one of the following kinds of communication: vehicle-to-vehicle communication, vehicle-to-infrastructure communication, vehicle-to-home communication, and vehicle-to-pedestrian communication.

The positioning unit 7640 receives a GNSS signal (a GPS signal from a global positioning system (GPS) satellite, for example) from a global navigation satellite system (GNSS) satellite, performs positioning, and generates location information including the latitude, the longitude, and the altitude of the vehicle. It should be noted that the positioning unit 7640 may identify the current location by exchanging signals with a wireless access point, or may acquire the location information from a terminal having a positioning function, such as a portable telephone, a PHS, or a smartphone.

The beacon reception unit 7650 receives radio waves or electromagnetic waves transmitted from a radio station or the like installed on a road, for example, and acquires information about the current location, traffic congestion, closing of a road, a required time, or the like. It should be noted that the functions of the beacon reception unit 7650 may be included in the dedicated communication interface 7630 described above.

The in-vehicle device interface 7660 is a communication interface that mediates connection between the microcomputer 7610 and various in-vehicle devices 7760 existing in the vehicle. The in-vehicle device interface 7660 may establish a wireless connection, using a wireless communication protocol such as wireless LAN, Bluetooth (registered trademark), Near Field Communication (NFC), or wireless USB (WUSB). Further, the in-vehicle device interface 7660 may establish a wired connection to a universal serial bus (USB), a high-definition multimedia interface (HDMI), a mobile high-definition link (MHL), or the like via a connecting terminal (not shown) (and a cable, if necessary). The in-vehicle devices 7760 may include a mobile device or a wearable device owned by a passenger, and/or an information device installed in or attached to the vehicle, for example. The in-vehicle devices 7760 may also include a navigation device that searches for a route to a desired destination. The in-vehicle device interface 7660 exchanges control signals or data signals with these in-vehicle devices 7760.

The in-vehicle network interface 7680 is an interface that mediates communication between the microcomputer 7610 and the communication network 7010. The in-vehicle network interface 7680 transmits and receives signals and the like, according to a predetermined protocol supported by the communication network 7010.

The microcomputer 7610 of the overall control unit 7600 controls the vehicle control system 7000 according to various programs, following information acquired via at least one of the following components: the general-purpose communication interface 7620, the dedicated communication interface 7630, the positioning unit 7640, the beacon reception unit 7650, the in-vehicle device interface 7660, and the in-vehicle network interface 7680. For example, on the basis of acquired external and internal information, the microcomputer 7610 may calculate the control target value of the driving force generation device, the steering mechanism, or the braking device, and output a control command to the drive system control unit 7100. For example, the microcomputer 7610 may perform cooperative control to achieve the functions of an advanced driver assistance system (ADAS), including vehicle collision avoidance or impact mitigation, follow-up running based on the distance between vehicles, vehicle speed maintenance running, vehicle collision warning, vehicle lane deviation warning, or the like. The microcomputer 7610 may also perform cooperative control to conduct automatic driving or the like for autonomously running not depending on the operation of the driver, by controlling the driving force generation device, the steering mechanism, the braking device, or the like on the basis of acquired information about the surroundings of the vehicle.

The microcomputer 7610 may generate information about the three-dimensional distance between the vehicle and an object such as a nearby architectural structure or a person, and create local map information including surroundings information about the current location of the vehicle, on the basis of information acquired via at least one of the following components: the general-purpose communication interface 7620, the dedicated communication interface 7630, the positioning unit 7640, the beacon reception unit 7650, the in-vehicle device interface 7660, and the in-vehicle network interface 7680. The microcomputer 7610 may also generate a warning signal by predicting danger such as a collision of the vehicle, an approach of a pedestrian or the like, or entry to a closed road, on the basis of acquired information. The warning signal may be a signal for generating an alarm sound or for turning on a warning lamp, for example.

The sound/image output unit 7670 transmits an audio output signal and/or an image output signal to an output device that is capable of visually or audibly notifying the passenger(s) of the vehicle or the outside of the vehicle of information. In the example shown in FIG. 35, an audio speaker 7710, a display unit 7720, and an instrument panel 7730 are shown as output devices. The display unit 7720 may include an on-board display and/or a head-up display, for example. The display unit 7720 may have an augmented reality (AR) display function. An output device may be some device other than the above devices, such as a wearable device like a headphone or an eyeglass-type display to be worn by a passenger, a projector, or a lamp. In a case where the output device is a display device, the display device visually displays results obtained through various processes performed by the microcomputer 7610, or information received from other control units, in various forms such as text, an image, a table, or a graph. Moreover, in a case where the output device is a sound output device, the sound output device audibly outputs an analog signal by converting reproduced sound data, an audio signal formed with acoustic data, or the like into the analog signal.

Note that, in the example shown in FIG. 35, at least two control units connected via the communication network 7010 may be integrated into one control unit. Alternatively, each control unit may be formed with a plurality of control units. Further, the vehicle control system 7000 may include another control unit that is not shown in the drawing. Also, in the above description, some or all of the functions of one of the control units may be provided by some other control unit. That is, as long as information is transmitted and received via the communication network 7010, predetermined arithmetic processing may be performed by any control unit. Likewise, a sensor or a device connected to any control unit may be connected to another control unit, and a plurality of control units may transmit and receive detection information to and from one another via the communication network 7010.

Note that a computer program for achieving the respective functions of the image processing devices described with reference to FIGS. 8, 13, 34, and others can be implemented in any control unit or the like. It is also possible to provide a computer readable recording medium in which such a computer program is stored. The recording medium is a magnetic disk, an optical disk, a magnetooptical disk, a flash memory, or the like, for example. Further, the above computer program may be delivered via a network, for example, without the use of any recording medium.

In the vehicle control system 7000 described above, an image processing device according to any of the embodiments described with reference to FIGS. 8, 13, 34, and others can be applied to the overall control unit 7600 of the example application shown in FIG. 35. For example, the CPU 801 of the image processing device shown in FIG. 34 is equivalent to the microcomputer 7610 of the overall control unit 7600 shown in FIG. 35, the ROM 802, the RAM 803, and the storage unit 808 of the image processing device shown in FIG. 34 are equivalent to the storage unit 7690 of the overall control unit 7600 shown in FIG. 35, and the communication unit 809 of the image processing device shown in FIG. 34 is equivalent to the in-vehicle network interface 7680 of the overall control unit 7600 shown in FIG. 35.

Further, at least one of the components of any image processing device described with reference to FIGS. 8, 13, and 34 may be formed in a module (an integrated circuit module formed with one die, for example) for the overall control unit 7600 shown in FIG. 35. Alternatively, any image processing device described with reference to FIGS. 8, 13, 34, and others may be formed with the plurality of control units of the vehicle control system 7000 shown in FIG. 35.

8. Summary of the Configuration of the Present Disclosure

Embodiments of the present disclosure have been described so far by way of specific examples. However, it is obvious that those skilled in the art can make modifications to and substitutions of the embodiments without departing from the scope of the present disclosure. That is, the present invention is disclosed in the form of examples, and the above description should not be interpreted in a restrictive manner. The claims should be taken into account in understanding the subject matter of the present disclosure.

Note that, the technology disclosed in this specification may also be embodied in the configurations described below.

(1) An image processing device including:

an image input unit that acquires at least three kinds of images formed with polarization images of different polarizing directions or non-polarization images;

an angle input unit that acquires a reflection angle, the reflection angle being an angle between an image capturing direction of an image acquired by the image input unit and a plane direction corresponding to a normal direction of a reflecting surface; and a reflection component separation unit that removes a reflected light component from an image acquired by the image input unit, on the basis of the at least three kinds of the images acquired by the image input unit and the reflection angle acquired from the angle input unit.

(2) The image processing device according to (1), in which the reflection component separation unit includes an intensity transmittance and intensity reflectance calculation unit that calculates respective intensity transmittances and respective intensity reflectances of S waves and P waves, using the reflection angle, and the reflection component separation unit removes a reflected light component from an image acquired by the image input unit, using the respective intensity transmittances and the respective intensity reflectances of S-waves and P-waves as results of calculation performed by the intensity transmittance and intensity reflectance calculation unit.

(3) The image processing device according to (2), further including a refractive index input unit that outputs relative refractive indexes of two regions separated by the reflecting surface as a boundary, to the intensity transmittance and intensity reflectance calculation unit.

(4) The image processing device according to (3), in which the intensity transmittance and intensity reflectance calculation unit calculates the respective intensity transmittances and the respective intensity reflectances of S waves and P waves, using the reflection angle input from the angle input unit and the relative refractive indexes input from the refractive index input unit.

(5) The image processing device according to any one of (1) to (4), in which the image input unit acquires images captured by three or more imaging units equipped with polarizing plates having different polarization angle settings.

(6) The image processing device according to any one of (1) to (4), in which the image input unit acquires images captured by an imaging unit equipped with a rotatable polarizing plate, and acquires three or more kinds of polarization images captured in a state where the polarizing plate is set at rotation angles of at least three types.

(7) The image processing device according to any one of (1) to (4), in which the image input unit acquires polarization images captured by a polarizer-stacked imaging element in which polarizers of polarization angle settings of at least three different types are stacked on respective pixels of an imaging element.

(8) The image processing device according to any one of (1) to (7), in which the angle input unit acquires detection information from a gyroscope that detects an angle of an imaging unit that captures images to be acquired by the image input unit, and calculates the reflection angle.

(9) The image processing device according to any one of (1) to (8), in which the angle input unit calculates the reflection angle, on the basis of an object model having shape information about an object to be captured in images to be acquired by the image input unit.

(10) The image processing device according to any one of (1) to (9), in which the angle input unit acquires distance information about an object to be captured in images to be acquired by the image input unit, and calculates the reflection angle on the basis of the acquired distance information.

(11) The image processing device according to any one of (1) to (10), further including an image presentation unit that presents a transmitted light component image generated by the reflection component separation unit, a reflected light component having been removed from the transmitted light component image.

(12) The image processing device according to (11), further including an angle operation unit that adjusts, through a user operation, the reflection angle to be output by the angle input unit, in which the angle operation unit is an operation unit that enables adjustment of reflection angle setting during observation of the transmitted light component image presented by the image presentation unit, so that an image with a small reflection component is presented.

(13) The image processing device according to any one of (1) to (12), further including a reflection removal result luminance comparison unit that compares luminances of corresponding pixels of a plurality of reflection removed images generated by the reflection component separation unit in accordance with different reflection angle settings, determines a pixel value with a lower luminance to be a pixel value from which a larger reflected light component has been removed, and selects the pixel value.

(14) The image processing device according to (13), in which the angle input unit updates the reflection angle through a prescribed step, and sequentially outputs updated reflection angle data to the reflection component separation unit, the reflection component separation unit generates a reflection removal result by removing a reflected light component from an image acquired by the image input unit, using the updated reflection angle data, and the reflection removal result luminance comparison unit performs a process of comparing luminances of corresponding pixels of a plurality of reflection removed images generated in accordance with different reflection angle settings generated by the reflection component separation unit.

(15) The image processing device according to (14), in which the reflection component separation unit includes an intensity transmittance and intensity reflectance calculation unit that calculates respective intensity transmittances and respective intensity reflectances of S waves and P waves, using the reflection angle, the intensity transmittance and intensity reflectance calculation unit calculates the respective intensity transmittances and the respective intensity reflectances of S waves and P waves, using the updated reflection angle data sequentially input from the angle input unit, and the reflection component separation unit sequentially generates a reflection removal result by removing a reflected light component from an image acquired by the image input unit, using the respective intensity transmittances and the respective intensity reflectances of S waves and P waves based on the updated reflection angle data.

(16) The image processing device according to any one of (1) to (7), in which the angle input unit includes:

an azimuth angle calculation unit that calculates an azimuth angle, the azimuth angle being an angle between a projection of a camera eye vector indicating an image capturing direction of the camera onto the reflecting surface and an azimuth-corresponding reference axis;

a camera posture acquisition unit that acquires camera posture information indicating a posture of the camera that captures images to be acquired by the image input unit; and a zenith angle calculation unit that calculates a zenith angle, the zenith angle being an angle formed by the camera eye vector and a zenith-corresponding reference axis, in which the zenith angle calculation unit calculates the zenith angle equivalent to the reflection angle, by inputting the azimuth angle and the camera posture information.

(17) The image processing device according to (16), in which the angle input unit further includes a region selection unit that selects a partial image region from an image acquired by the image input unit, the partial image region being subjected to reflected light component removal, and the zenith angle calculation unit calculates the zenith angle corresponding to the image region selected by the region selection unit.

(18) The image processing device according to (16), in which the angle input unit further includes a region dividing unit that performs region dividing on an image acquired by the image input unit, and the zenith angle calculation unit calculates a zenith angle for each divided region formed by the region dividing unit.

(19) An image processing method implemented in an image processing device, the image processing method including:

an image input step of an image input unit acquiring at least three kinds of images formed with polarization images of different polarizing directions or non-polarization images;

an angle input step of an angle input unit outputting a reflection angle to a reflection component separation unit, the reflection angle being an angle between an image capturing direction of an image acquired in the image input step and a plane direction corresponding to a normal direction of a reflecting surface; and a reflection component separation step of a reflection component separation unit removing a reflected light component from an image acquired by the image input unit, on the basis of the at least three kinds of the images acquired by the image input unit and the reflection angle acquired from the angle input unit.

(20) A program causing an image processing device to perform image processing, the image processing including:

an image input step of causing an image input unit to acquire at least three kinds of images formed with polarization images of different polarizing directions or non-polarization images;

an angle input step of causing an angle input unit to output a reflection angle to a reflection component separation unit, the reflection angle being an angle between an image capturing direction of an image acquired in the image input step and a plane direction corresponding to a normal direction of a reflecting surface; and a reflection component separation step of causing a reflection component separation unit to remove a reflected light component from an image acquired by the image input unit, on the basis of the at least three kinds of the images acquired by the image input unit and the reflection angle acquired from the angle input unit.

Also, the series of processes described in this specification can be performed by hardware, software, or a combination of hardware and software. In a case where processes are performed by software, a program in which the process sequences are recorded may be installed into a memory incorporated into special-purpose hardware in a computer, or may be installed into a general-purpose computer that can perform various kinds of processes. For example, the program can be recorded beforehand into a recording medium. The program can be installed from the recording medium into a computer, or can be received via a network such as a LAN (Local Area Network) or the Internet and be installed into a recording medium such as an internal hard disk.

Note that the respective processes described in this specification may not be performed in chronological order according to the description, but may be performed in parallel or independently of one another depending on the configuration/capability of the apparatus performing the processes or as necessary. Also, in this specification, a system is a logical assembly of a plurality of devices, and does not necessarily mean devices with different configurations incorporated into one housing.

INDUSTRIAL APPLICABILITY

As described above, a configuration according to an embodiment of the present disclosure embodies an image processing device and a method that enable removal of reflection component light from images captured from various directions.

Specifically, the image processing device includes: an image input unit that acquires at least three types of images formed with polarization images of different polarizing directions or non-polarization images; an angle input unit that outputs reflection angles that are the angles between the image capturing directions of the acquired images and the plane direction corresponding to the normal direction of the reflecting surface, to an intensity transmittance and intensity reflectance calculation unit; a calculation unit that calculates the respective intensity transmittances and the respective intensity reflectances of S waves and P waves, using the reflection angles; and a reflection component separation unit that removes the reflected light component from the images acquired by the image input unit, using the respective intensity transmittances and the respective intensity reflectances of the S waves and P waves, for example. These processes enable removal of reflected light components from captured images having various reflection angles.

This configuration embodies an image processing device and a method that enable removal of reflection component light from images captured from various directions.

REFERENCE SIGNS LIST

10 Camera
15 Sensor

20 Object
30 Light source
51 Reflecting surface
52 Incidence plane
100 Image processing device
101 Image input unit
102 Angle input unit
103 Refractive index input unit
104 Intensity transmittance/intensity reflectance calculation unit
105 Reflection component separation unit
110 Transmitted light component image
120, 130, 140 Camera
121, 131, 141 Polarizing filter
122, 132, 142 Imaging element
150 Camera
151 Rotatable polarizing filter
152 Imaging element
160 Polarization image capturing camera
162 Polarizer-stacked imaging element
200 Image processing device
300 Camera
600 Image processing device
601 Image input unit
602 Angle input unit
604 Intensity transmittance/intensity reflectance calculation unit
605 Reflection component separation unit
606 Reflection removal result presentation unit
610 Angle operation unit
700 Image processing device
701 Image input unit
702 Angle input unit
704 Intensity transmittance/intensity reflectance calculation unit
705 Reflection component separation unit
706 Reflection removal result storage memory
707 Reflection removal result comparison unit
721 Azimuth angle calculation unit
722 Camera posture acquisition unit
723 Zenith angle calculation unit
724 Region selection unit
725 Region dividing unit
801 CPU
802 ROM
803 RAM
804 Bus
805 Input/output interface
806 Input unit
807 Output unit
808 Storage unit
809 Communication unit
810 Drive
811 Removable medium

The invention claimed is:

1. An image processing device comprising:
circuitry configured to:
acquire at least three kinds of images formed with one of a plurality of polarization images of different polarizing directions or a plurality of non-polarization images;
acquire a reflection angle that is an angle between an image capturing direction of an image of at least three kinds of images and a plane direction corresponding to a normal direction of a reflecting surface; and
remove a reflected light component from the image based on the at least three kinds of the images and the reflection angle, wherein the reflected light component is further removed based on respective intensity transmittances and respective intensity reflectances of S waves and P waves.

2. The image processing device according to claim 1, wherein
the circuitry is further configured to:
calculate the respective intensity transmittances and the respective intensity reflectances of the S waves and the P waves, based on the reflection angle.

3. The image processing device according to claim 2, wherein the circuitry is further configured to output relative refractive indexes of two regions separated by the reflecting surface as a boundary, to the respective intensity transmittances and the circuitry.

4. The image processing device according to claim 3, wherein the circuitry is further configured to calculate the respective intensity transmittances and the respective intensity reflectances of the S waves and the P waves based on the reflection angle and the relative refractive indexes.

5. The image processing device according to claim 1, wherein the circuitry is further configured to acquire the images captured by three or more imaging devices equipped with polarizing plates having different polarization angle settings.

6. The image processing device according to claim 1, wherein the circuitry is further configured to:
acquire images captured by an imaging device equipped with a rotatable polarizing plate; and
acquire three or more kinds of polarization images captured in a state where a polarizing plate is set at rotation angles of at least three types.

7. The image processing device according to claim 1, wherein the circuitry is further configured to acquire polarization images captured by a polarizer-stacked imaging element in which polarizers of polarization angle settings of at least three different types are stacked on respective pixels of an imaging element.

8. The image processing device according to claim 1, wherein the circuitry is further configured to:
acquire detection information from a gyroscope that detects an angle of an imaging device that captures the images; and
calculate the reflection angle based on the detection information.

9. The image processing device according to claim 1, wherein the circuitry is further configured to calculate the reflection angle based on an object model, wherein the object model has shape information about an object to be captured in the images.

10. The image processing device according to claim 1, wherein the circuitry is further configured to:
acquire distance information about an object to be captured in the images; and
calculate the reflection angle based on the acquired distance information.

11. The image processing device according to claim 1, wherein the circuitry is further configured to present a transmitted light component image, wherein the reflected light component is removed from the transmitted light component image.

12. The image processing device according to claim 11, further comprising an angle operation device that is configured to adjust, through a user operation, the reflection angle, wherein the angle operation device is an operation unit that is configured to enable adjustment of reflection angle setting during observation of the transmitted light component image, such that an image with a small reflection component is presented.

13. The image processing device according to claim 1, wherein the circuitry is further configured to:
compare luminances of corresponding pixels of a plurality of reflection removed images based on different reflection angle settings;
determine a pixel value with a lower luminance to be a pixel value from which a larger reflected light component has been removed; and
select the pixel value.

14. The image processing device according to claim 13, wherein the circuitry is further configured to:
update the reflection angle through a prescribed step;
sequentially output updated reflection angle data;
generate a reflection removal result by removal of the reflected light component from an image based on the updated reflection angle data; and
compare the luminances of corresponding pixels of the plurality of reflection removed images.

15. The image processing device according to claim 14, wherein the circuitry is further configured to:
calculate respective intensity transmittances and respective intensity reflectances of the S waves and the P waves based on the reflection angle; and
sequentially generate the reflection removal result by removal of the reflected light component from the image, using the respective intensity transmittances and the respective intensity reflectances of the S waves and the P waves based on the updated reflection angle data.

16. The image processing device according to claim 1, wherein the circuitry is further configured to:
calculate an azimuth angle that is a first angle between a projection of a camera eye vector and an azimuth-corresponding reference axis, wherein the camera eye vector indicates the image capturing direction of a camera onto the reflecting surface;
acquire camera posture information that indicates a posture of the camera that captures the images;
calculate a zenith angle that is a second angle formed by the camera eye vector and a zenith-corresponding reference axis; and
calculate the zenith angle equivalent to the reflection angle based on input of the azimuth angle and the camera posture information.

17. The image processing device according to claim 16, wherein the circuitry is further configured to:
select a partial image region from the image, wherein the partial image region is subjected to reflected light component removal; and
calculate the zenith angle corresponding to the partial image region.

18. The image processing device according to claim 16, wherein the circuitry is further configured to:
divide a region on the image; and
calculate the zenith angle for each divided region.

19. An image processing method, comprising:
in an image processing device:
acquiring at least three kinds of images formed with one of a plurality of polarization images of different polarizing directions or a plurality of non-polarization images;
outputting a reflection angle that is an angle between an image capturing direction of an image of at least three kinds of images and a plane direction corresponding to a normal direction of a reflecting surface; and
removing a reflected light component from the image based on the at least three kinds of the images and the reflection angle, wherein the reflected light component is further removed based on respective intensity transmittances and respective intensity reflectances of S waves and P waves.

20. A non-transitory computer-readable medium having stored thereon, computer-executable instructions, which when executed by an image processing device, cause the image processing device to execute operations, the operations comprising:
acquiring at least three kinds of images formed with one of a plurality of polarization images of different polarizing directions or a plurality of non-polarization images;
outputting a reflection angle that is an angle between an image capturing direction of an image of the at least three kinds of images and a plane direction corresponding to a normal direction of a reflecting surface; and
removing a reflected light component from the image based on the at least three kinds of the images and the reflection angle, wherein the reflected light component is further removed based on respective intensity transmittances and respective intensity reflectances of S waves and P waves.

* * * * *